(12) United States Patent
Miranda et al.

(10) Patent No.: US 11,386,629 B2
(45) Date of Patent: *Jul. 12, 2022

(54) CROSS REALITY SYSTEM

(71) Applicant: Magic Leap, Inc., Plantation, FL (US)

(72) Inventors: Jeremy Dwayne Miranda, Miramar, FL (US); Rafael Domingos Torres, Boca Raton, FL (US); Daniel Olshansky, Mountain View, CA (US); Anush Mohan, Mountain View, CA (US); Robert Blake Taylor, Porter Ranch, CA (US); Samuel A. Miller, Hollywood, FL (US); Jehangir Tajik, Fort Lauderdale, FL (US); Ashwin Swaminathan, Dublin, CA (US); Lomesh Agarwal, Fremont, CA (US); Ali Shahrokni, San Jose, CA (US); Prateek Singhal, Mountain View, CA (US); Joel David Holder, Austin, TX (US); Xuan Zhao, San Jose, CA (US); Siddharth Choudhary, San Jose, CA (US); Helder Toshiro Suzuki, Mountain View, CA (US); Hirai Honar Barot, Plantation, FL (US); Eran Guendelman, Tel Aviv (IL); Michael Harold Liebenow, Loxahatchee, FL (US); Christian Ivan Robert Moore, Cupertino, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,844

(22) Filed: Mar. 22, 2021

(65) Prior Publication Data
US 2021/0209859 A1 Jul. 8, 2021

Related U.S. Application Data

(63) Continuation of application No. 16/538,759, filed on Aug. 12, 2019, now Pat. No. 10,957,112.
(Continued)

(51) Int. Cl.
*G06T 19/00* (2011.01)
*G02B 27/00* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
CPC ....... G06T 19/006; G06T 19/20; G06T 15/20; G06T 7/33; G06T 17/05; G02B 27/0093;
(Continued)

(56) References Cited

U.S. PATENT DOCUMENTS 8,243,102 B1 8/2012 Cornell
8,849,957 B1 9/2014 Boodman et al.
(Continued)

FOREIGN PATENT DOCUMENTS

EP 2808842 B1 8/2017
WO WO 2015/192117 A1 12/2015
WO WO 2019/046774 A1 3/2019

OTHER PUBLICATIONS

International Preliminary Report on Patentability for International Application No. PCT/US2019/046240, dated Feb. 25, 2021.
(Continued)

*Primary Examiner* — Jeffery A Brier
(74) *Attorney, Agent, or Firm* — Wolf, Greenfield & Sacks, P.C.

(57) ABSTRACT

An augmented reality viewing system is described. A local coordinate frame of local content is transformed to a world
(Continued)

coordinate frame. A further transformation is made to a head coordinate frame and a further transformation is made to a camera coordinate frame that includes all pupil positions of an eye. One or more users may interact in separate sessions with a viewing system. If a canonical map is available, the earlier map is downloaded onto a viewing device of a user. The viewing device then generates another map and localizes the subsequent map to the canonical map.

20 Claims, 58 Drawing Sheets

Related U.S. Application Data

(60) Provisional application No. 62/884,109, filed on Aug. 7, 2019, provisional application No. 62/870,954, filed on Jul. 5, 2019, provisional application No. 62/868,786, filed on Jun. 28, 2019, provisional application No. 62/815,955, filed on Mar. 8, 2019, provisional application No. 62/812,935, filed on Mar. 1, 2019, provisional application No. 62/742,237, filed on Oct. 5, 2018, provisional application No. 62/718,357, filed on Aug. 13, 2018.

(51) Int. Cl.
  *G02B 27/01* (2006.01)
  *G06F 3/01* (2006.01)
  *G06T 19/20* (2011.01)
  *G06V 20/20* (2022.01)

(52) U.S. Cl.
  CPC .............. *G06F 3/011* (2013.01); *G06T 19/20* (2013.01); *G06V 20/20* (2022.01)

(58) Field of Classification Search
  CPC .......... G02B 27/017; G02B 2027/0134; G02B 2027/014; G06F 3/011; G06F 3/012; G06V 20/20; G06K 9/00671
  See application file for complete search history.

(56) References Cited

U.S. PATENT DOCUMENTS

| | | |
|---|---|---|
| 9,467,718 B1 | 10/2016 | Newell et al. |
| 10,748,302 B1 | 8/2020 | Dine et al. |
| 10,852,828 B1 | 12/2020 | Gatson et al. |
| 10,854,012 B1 | 12/2020 | Iyer et al. |
| 10,957,112 B2 * | 3/2021 | Miranda ............ G06K 9/00671 |
| 11,227,435 B2 | 1/2022 | Mohan et al. |
| 11,257,294 B2 | 2/2022 | Zhao et al. |
| 2004/0017372 A1 | 1/2004 | Park et al. |
| 2005/0228849 A1 | 10/2005 | Zhang |
| 2006/0078214 A1 | 4/2006 | Gallagher |
| 2007/0298866 A1 | 12/2007 | Gaudiano et al. |
| 2008/0090659 A1 | 4/2008 | Aguilar et al. |
| 2008/0284889 A1 | 11/2008 | Kinoshita |
| 2008/0303787 A1 | 12/2008 | Zheng |
| 2009/0256903 A1 | 10/2009 | Spooner et al. |
| 2010/0208033 A1 | 8/2010 | Edge et al. |
| 2010/0287485 A1 | 11/2010 | Bertolami et al. |
| 2011/0083101 A1 | 4/2011 | Sharon et al. |
| 2011/0208817 A1 | 8/2011 | Toledano et al. |
| 2011/0254950 A1 | 10/2011 | Bibby et al. |
| 2011/0299736 A1 | 12/2011 | Choi et al. |
| 2012/0130632 A1 | 5/2012 | Bandyopadhyay et al. |
| 2012/0169887 A1 | 7/2012 | Zhu et al. |
| 2012/0188237 A1 | 7/2012 | Han et al. |
| 2012/0249741 A1 | 10/2012 | Maciocci et al. |
| 2012/0294231 A1 | 11/2012 | Finlow-Bates et al. |
| 2013/0002815 A1 | 1/2013 | Smoot et al. |
| 2013/0044128 A1 | 2/2013 | Liu et al. |
| 2013/0141419 A1 | 6/2013 | Mount et al. |
| 2013/0176430 A1 | 7/2013 | Zhu et al. |
| 2013/0201185 A1 | 8/2013 | Kochi |
| 2013/0215264 A1 | 8/2013 | Soatto et al. |
| 2013/0222555 A1 | 8/2013 | Nagasaka et al. |
| 2013/0257858 A1 | 10/2013 | Na et al. |
| 2013/0257907 A1 | 10/2013 | Matsui |
| 2013/0293468 A1 | 11/2013 | Perez et al. |
| 2013/0321402 A1 | 12/2013 | Moore et al. |
| 2013/0342671 A1 | 12/2013 | Hummel et al. |
| 2014/0002607 A1 | 1/2014 | Shotton et al. |
| 2014/0003762 A1 | 1/2014 | Macnamara |
| 2014/0097329 A1 | 4/2014 | Wadsworth |
| 2014/0254936 A1 | 9/2014 | Sun et al. |
| 2014/0267234 A1 | 9/2014 | Hook et al. |
| 2014/0282162 A1 | 9/2014 | Fein et al. |
| 2014/0306866 A1 | 10/2014 | Miller et al. |
| 2014/0315570 A1 | 10/2014 | Yun et al. |
| 2014/0368645 A1 | 12/2014 | Ahuja et al. |
| 2014/0372957 A1 | 12/2014 | Keane et al. |
| 2014/0375688 A1 | 12/2014 | Redmann et al. |
| 2015/0016777 A1 | 1/2015 | Abovitz et al. |
| 2015/0049004 A1 | 2/2015 | Deering et al. |
| 2015/0071524 A1 | 3/2015 | Lee |
| 2015/0161476 A1 | 6/2015 | Kurz et al. |
| 2015/0178939 A1 | 6/2015 | Bradski et al. |
| 2015/0186745 A1 | 7/2015 | Martini |
| 2015/0205126 A1 | 7/2015 | Schowengerdt |
| 2015/0279081 A1 | 10/2015 | Monk et al. |
| 2015/0302642 A1 | 10/2015 | Miller |
| 2015/0302652 A1 | 10/2015 | Miller et al. |
| 2015/0302656 A1 | 10/2015 | Miller et al. |
| 2015/0302664 A1 | 10/2015 | Miller |
| 2015/0302665 A1 | 10/2015 | Miller |
| 2015/0321103 A1 | 11/2015 | Barnett et al. |
| 2016/0005229 A1 | 1/2016 | Lee et al. |
| 2016/0012643 A1 | 1/2016 | Kezele et al. |
| 2016/0026253 A1 | 1/2016 | Bradski et al. |
| 2016/0071278 A1 | 3/2016 | Leonard et al. |
| 2016/0148433 A1 | 5/2016 | Petrovskaya et al. |
| 2016/0180593 A1 | 6/2016 | Yang |
| 2016/0180602 A1 | 6/2016 | Fuchs |
| 2016/0196692 A1 | 7/2016 | Kjallstrom et al. |
| 2016/0217614 A1 | 7/2016 | Kraver et al. |
| 2016/0219408 A1 | 7/2016 | Yang et al. |
| 2016/0300389 A1 | 10/2016 | Glenn, III et al. |
| 2016/0343165 A1 | 11/2016 | Park et al. |
| 2016/0370971 A1 | 12/2016 | Hackett et al. |
| 2016/0381118 A1 | 12/2016 | Andrews et al. |
| 2017/0031160 A1 | 2/2017 | Popovich et al. |
| 2017/0061696 A1 | 3/2017 | Li et al. |
| 2017/0076408 A1 | 3/2017 | D'Souza et al. |
| 2017/0091996 A1 | 3/2017 | Wei et al. |
| 2017/0094227 A1 | 3/2017 | Williams et al. |
| 2017/0134909 A1 | 5/2017 | Gu et al. |
| 2017/0185823 A1 | 6/2017 | Gold et al. |
| 2017/0192515 A1 | 7/2017 | Menadeva et al. |
| 2017/0195564 A1 | 7/2017 | Appia et al. |
| 2017/0236037 A1 | 8/2017 | Rhoads et al. |
| 2017/0237789 A1 | 8/2017 | Harner et al. |
| 2017/0243352 A1 | 8/2017 | Kutliroff et al. |
| 2017/0270713 A1 | 9/2017 | Dooley et al. |
| 2017/0336511 A1 | 11/2017 | Nerurkar et al. |
| 2017/0345215 A1 | 11/2017 | Khedkar et al. |
| 2017/0352192 A1 | 12/2017 | Petrovskaya et al. |
| 2017/0371024 A1 | 12/2017 | Ivanov et al. |
| 2018/0000547 A1 | 1/2018 | Kang et al. |
| 2018/0045963 A1 | 2/2018 | Hoover et al. |
| 2018/0053284 A1 | 2/2018 | Rodriguez et al. |
| 2018/0082156 A1 | 3/2018 | Jin et al. |
| 2018/0122143 A1 | 5/2018 | Ellwood, Jr. |
| 2018/0189556 A1 | 7/2018 | Shamir et al. |
| 2018/0213359 A1 | 7/2018 | Reinhardt et al. |
| 2018/0245927 A1 | 8/2018 | Frish et al. |
| 2018/0261012 A1 | 9/2018 | Mullins et al. |
| 2018/0268237 A1 | 9/2018 | Stanimirovic et al. |
| 2018/0268582 A1 | 9/2018 | Schneider et al. |
| 2018/0268611 A1 | 9/2018 | Nourai et al. |
| 2018/0284802 A1 | 10/2018 | Tsai et al. |

(56) References Cited

U.S. PATENT DOCUMENTS

| | | |
|---|---|---|
| 2018/0286116 A1 | 10/2018 | Babu J D |
| 2018/0293771 A1 | 10/2018 | Piemonte et al. |
| 2018/0304153 A1 | 10/2018 | Hohjoh et al. |
| 2018/0308377 A1 | 10/2018 | Pena-Rios et al. |
| 2018/0315248 A1 | 11/2018 | Bastov et al. |
| 2019/0005725 A1 | 1/2019 | Oonishi |
| 2019/0027267 A1 | 1/2019 | Hayashi et al. |
| 2019/0065814 A1 | 2/2019 | Morein et al. |
| 2019/0080467 A1 | 3/2019 | Hirzer et al. |
| 2019/0114798 A1 | 4/2019 | Afrouzi et al. |
| 2019/0114802 A1 | 4/2019 | Lazarow |
| 2019/0147341 A1 | 5/2019 | Rabinovich et al. |
| 2019/0188474 A1 | 6/2019 | Zahnert et al. |
| 2019/0197785 A1 | 6/2019 | Tate-Gans et al. |
| 2019/0287311 A1 | 9/2019 | Bhatnagar et al. |
| 2019/0301873 A1 | 10/2019 | Prasser et al. |
| 2019/0310761 A1 | 10/2019 | Agarawala et al. |
| 2019/0340831 A1 | 11/2019 | Scarfone et al. |
| 2019/0355169 A1 | 11/2019 | Sapienza et al. |
| 2019/0384379 A1 | 12/2019 | Huh |
| 2019/0385370 A1 | 12/2019 | Boyapalle et al. |
| 2020/0033463 A1 | 1/2020 | Lee et al. |
| 2020/0034624 A1 | 1/2020 | Sharma et al. |
| 2020/0051328 A1 | 2/2020 | Mohan et al. |
| 2020/0090407 A1 | 3/2020 | Miranda et al. |
| 2020/0111255 A1 | 4/2020 | Brodsky et al. |
| 2020/0134366 A1 | 4/2020 | Xu et al. |
| 2020/0175766 A1 | 6/2020 | Gawrys et al. |
| 2020/0211290 A1 | 7/2020 | Choi et al. |
| 2020/0252233 A1 | 8/2020 | O'Keeffe |
| 2020/0342670 A1 | 10/2020 | Nattinger et al. |
| 2020/0364901 A1 | 11/2020 | Choudhuri et al. |
| 2020/0364937 A1 | 11/2020 | Selbrede |
| 2020/0372672 A1 | 11/2020 | Schonberger et al. |
| 2020/0380263 A1 | 12/2020 | Yang et al. |
| 2020/0380769 A1 | 12/2020 | Liu et al. |
| 2020/0394012 A1 | 12/2020 | Wright, Jr. et al. |
| 2021/0049360 A1 | 2/2021 | Yildiz et al. |
| 2021/0065455 A1 | 3/2021 | Beith et al. |
| 2021/0074072 A1 | 3/2021 | Desai et al. |
| 2021/0110614 A1 | 4/2021 | Shahrokni et al. |
| 2021/0110615 A1 | 4/2021 | Zhao et al. |
| 2021/0112427 A1 | 4/2021 | Shveki et al. |
| 2021/0134064 A1 | 5/2021 | Shahrokni et al. |
| 2021/0142580 A1 | 5/2021 | Caswell et al. |
| 2021/0174596 A1 | 6/2021 | Zhang et al. |
| 2021/0256755 A1 | 8/2021 | Joseph et al. |
| 2021/0256766 A1 | 8/2021 | Muhlethaler et al. |
| 2021/0256767 A1 | 8/2021 | Velasquez et al. |
| 2021/0256768 A1 | 8/2021 | Zhao et al. |
| 2021/0264685 A1 | 8/2021 | Velasquez et al. |
| 2021/0315464 A1 | 10/2021 | Sol I Caros et al. |
| 2021/0343087 A1 | 11/2021 | Gomez Gonzalez et al. |
| 2021/0358150 A1 | 11/2021 | Lin et al. |

OTHER PUBLICATIONS

Invitation to Pay Additional Fees for International Application No. PCT/US2019/046240 dated Oct. 18, 2019.
Invitation to Pay Additional Fees for International Application No. PCT/US2019/054819 dated Dec. 4, 2019.
International Search Report and Written Opinion for International Application No. PCT/US2019/054819 dated Feb. 11, 2020.
International Preliminary Report on Patentability for International Application No. PCT/US2019/054819, dated Apr. 15, 2021.
International Search Report and Written Opinion for International Application No. PCT/US2019/054836 dated Dec. 31, 2019.
International Preliminary Report on Patentability for International Application No. PCT/US2019/054836, dated Apr. 15, 2021.
Invitation to Pay Additional Fees for International Application No. PCT/US2020/055773 dated Dec. 30, 2020.
International Search Report and Written Opinion for International Application No. PCT/US2020/055773, dated Mar. 11, 2021.
Invitation to Pay Additional Fees for International Application No. PCT/US2020/055780 dated Dec. 17, 2020.
International Search Report and Written Opinion for International Application No. PCT/US2020/055780, dated Feb. 24, 2021.
Invitation to Pay Additional Fees for International Application No. PCT/US2020/055784 dated Dec. 17, 2020.
International Search Report and Written Opinion for International Application No. PCT/US2020/055784, dated Mar. 10, 2021.
International Search Report and Written Opinion for International Application No. PCT/US2020/057887, dated Jan. 27, 2021.
International Search Report and Written Opinion for International Application No. PCT/US2020/059975, dated Feb. 4, 2021.
International Search Report and Written Opinion for International Application No. PCT/US2020/0637194, dated Mar. 2, 2021.
Invitation to Pay Additional Fees for International Application No. PCT/US2021/017607, dated Mar. 30, 2021.
International Search Report and Written Opinion for International Application No. PCT/US2021/017607, dated Jun. 14, 2021.
Invitation to Pay Additional Fees for International Application No. PCT/US2021/017616, dated Mar. 30, 2021.
International Search Report and Written Opinion for International Application No. PCT/US2021/017616, dated Jun. 24, 2021.
International Search Report and Written Opinion for International Application No. PCT/US2021/017624, dated Apr. 30, 2021.
International Search Report and Written Opinion for International Application No. PCT/US2021/017630, dated Apr. 28, 2021.
International Search Report and Written Opinion for International Application No. PCT/US2021/019575, dated May 6, 2021.
International Search Report and Written Opinion for International Application No. PCT/US2021/029585, dated Jul. 13, 2021.
[No Author Listed], Axis-angle representation—Wikipedia. 6 pages. Last edited on Feb. 2, 2022. URL:https://en.wikipedia.org/wiki/Axis%E2%80%93angle_representation [retrieved on Feb. 28, 2022].
[No Author Listed], Code release for "learning to find good correspondences" CVPR 2018. GitHub. Sep. 30, 2020. 4 pages. URL:https://github.com/vcg-uvic/learned-correspondence-release [retrieved on Feb. 22, 2022].
[No Author Listed], Combain Location API—API Reference. 14 pages. URL:https://combain.com/api/#combain-location-api [retrieved on Feb. 24, 2021].
[No Author Listed], Content Persistence Fundamentals. Magic Leap, Inc. Oct. 23, 2019. URL:https://developer.magicleap.com/en-us/learn/guides/content-persistence-fundamentals [retrieved on Dec. 31, 2020]. 5 pages.
[No Author Listed], Course (navigation)—Wikipedia. 3 pages. Last edited on Nov. 4, 2021. URL:https://en.wikipedia.org/wiki/Course_(navigation) [retrieved on Feb. 24, 2022].
[No Author Listed], Geohash a Ing/at coordinate using hibert space filling curves. GitHub. Apr. 1, 2020. 9 pages. URL:https://github.com/tammoippen/geohash-hilbert [retrieved on Feb. 24, 2022].
[No Author Listed], GitHub—gmplot/gmplot: Plot data on Google Maps, the easy way. Oct. 14, 2021. 2 pages. URL:https://github.com/vgm64/gmplot [retrieved on Feb. 28, 2022].
[No Author Listed], Haversine formula—Wikipedia. 5 pages. Last edited on Jan. 11, 2022. URL:https://en.wikipedia.org/wiki/Haversine_formula [retrieved on Feb. 24, 2022].
[No Author Listed], Kismet (software). Wikipedia. Last edited on Jan. 27, 2021. 3 pages. URL:https://en.wikipedia.org/wiki/Kismet_(software) [retrieved on Feb. 24, 2021].
[No Author Listed], Points of the Compass—Wikipedia. Last edited on Dec. 4, 2021. 16 pages. URL:https://en.wikipedia.org/wiki/Points_of_the_compass [retrieved on Feb. 24, 2022].
[No Author Listed], Progressive Web Apps. Google Developers. 2022, 5 pages. URL:https://web.dev/progressive-web-apps [retrieved on Feb. 24, 2022].
[No Author Listed], S2 Geometry. 3 pages. URL:http://s2geometry.io/ [retrieved on Feb. 24, 2022].
[No Author Listed], Skid (aerodynamics)—Wikipedia. 2 pages. Last edited on Jun. 17, 2020. URL:https://en.wikipedia.org/wiki/Skid_(aerodynamic) [retrieved on Feb. 24, 2022].
[No Author Listed], sklearn.neighbors.BallTree. 2022. 4 pages. URL:https://scikit-learn.org/stable/modules/generated/sklearn.neighbors.BallTree.html [retrieved on Feb. 24, 2022].

(56) References Cited

OTHER PUBLICATIONS

[No Author Listed], Slip (aerodynamics)—Wikipedia. 5 pages. Last edited on Aug. 22, 2021. URL:https://en.wikipedia.org/wiki/Slip_(aerodynamic) [retrieved on Feb. 24, 2022].

[No Author Listed], The difference between virtual reality, Augmented Reality and Mixed Reality. Forbes. Feb. 2, 2018. 5 pages. URL:https://www.forbes.com/sites/quora/2018/02/02/the-difference-between-virtual-reality-augmented-reality-and-mixed-reality/#634116762d07 [retrieved on Dec. 5, 2019].

[No Author Listed], Wi-Fi Location-Based Services 4.1 Design Guide. Jan. 30, 2014. 11 pages. URL:https://www.cisco.com/c/en/us/td/docs/solutions/Enterprise/Mobility/WiFiLBS-DG/wifich2.html.

[No Author Listed], WiGLE: Wireless Network Mapping. 2021. 2 pages. URL:https://wigle.net [retrieved on Feb. 24, 2021].

[No Author Listed], Wind Triangle—Wikipedia. 2 pages. Last edited on Nov. 16, 2021. URL:https://en.wikipedia.org/wiki/Wind_triangle [retrieved on Feb. 24, 2022].

Balntas et al., HPatches: A benchmark and evaluation of handcrafted and learned local descriptors. Proceedings of the IEEE Conference on Computer Vision and Pattern Recognition 2017. pp. 5173-5182.

Brachmann et al., Neural-Guided RANSAC: Learning Where to Sample Model Hypotheses. arXiv:1905.04132v2. Jul. 31, 2019. 17 pages.

Brief, Mobile Image Blur Detection with Machine Learning. May 17, 2019. 14 pages. URL:https://medium.com/snapaddy-tech-blog/mobile-image-blur-detection-with-machine-learning-c0b703eab7de.

Brodsky et al., Rendering Location Specific Virtual Content in Any Location, U.S. Appl. No. 17/547,773, filed Dec. 10, 2021.

Cadena et al., Past, Present, and Future of Simultaneous Localization and Mapping: Toward the Robust-Perception Age. IEEE Transactions on Robotics. Dec. 2016;32(6):1309-1332.

Chatterjee, How to Leverage Geolocation Capabilities to Deliver a Top Notch Mobile App. Jul. 19, 2017. 5 pages. URL:https://www.fingent.com/blog/how-to-leverage-geo-location-capabilities-to-deliver-a-top-notch-mobile-app.

Chen, Quicktime VR: An image-based approach to virtual environment navigation. Proceedings of the 22nd annual conference on Computer graphics and interactive techniques. Sep. 1995, pp. 29-38.

Dang et al., Eigendecomposition-free training of deep networks with zero eigenvalue-based losses. arXiv:1803.08071. Mar. 26, 2018. 25 pages.

Ferris et al., WiFi-SLAM Using Gaussian Process Latent Variable Models. IJCAI 2007. 6 pages.

Gidaris et al, Unsupervised representation learning by predicting image rotations. arXiv:1803.07728. Mar. 21, 2018. 16 pages.

Henniges, Current approaches of Wifi Positioning. Service-Centric Networking Seminar. WS2011/2012. 8 pages.

Henry et al., RGB-D mapping: Using Kinect-style depth cameras for dense 30 modeling of indoor environments. The International Journal of Robotics Research. Feb. 10, 2012. 26 pages. URL:http://citeseerx.ist.psu.edu/viewdoc/download?doi=10.1.1.480.160&rep=rep1&type=pdf [retrieved on Jan. 26, 2020].

Huang et al., Efficient, Generalized Indoor WiFi GraphSLAM. IEEE International Conference on Robotics and Automation. 2011. 3 pages, doi: 10.1109/ICRA.2011.5979643.

Ito et al., W-RGB-D: Floor-Plan-Based Indoor Global Localization Using a Depth Camera and WiFi. 2014 IEEE international conference on robotics and automation (ICRA). May 2014, pp. 417-422.

Kurz et al., Representative feature descriptor sets for robust handheld camera localization. 2012 IEEE International Symposium on Mixed and Augmented Reality (ISMAR). Nov. 5, 2012. pp. 65-70.

Larsson et al., Fine-grained segmentation networks: Self-supervised segmentation for improved long-term visual localization. arXiv:1908.06387v1. Aug. 18, 2019. 13 pages.

Lynen et al., Get Out of My Lab: Large-scale, Real-Time Visual-Inertial Localization. Robotics: Science and Systems. Jul. 2015. 10 pages.

Lynen et al., Large-scale, real-time visual-inertial localization revisited. arXiv preprint arXiv:1907.00338v1. Jun. 30, 2019. 21 pages.

Mirowski et al., Depth camera SLAM on a low-cost WiFi mapping robot. Apr. 2012. 7 pages. doi:10.1109/TePRA.2012.6215673.

Mohan et al., Cross Reality System, U.S. Appl. No. 17/542,306, filed Dec. 3, 2021.

Mohanna et al., Optimization of MUSIC algorithm for angle of arrival estimation in wireless communications. NRIAG Journal of Astronomy and Geophysics. 2013:2:116-124.

Mueller, Fast In-memory spatial radius queries with Python. Aug. 9, 2017. 8 pages. URL:https://medium.com/@alexander.mueller/experiments-with-in-memory-spatial-radius-queries-in-python-e40c9e66cf63 [retrieved on Feb. 24, 2022].

Newman et al., Pure range-only sub-sea SLAM. 2003 IEEE International Conference on Robotics and Automation (Cat. No. 03CH37422). Sep. 2003. 7 pages.

Panzarino, What exactly WiFiSLAM is, and why Apple acquired it. Mar. 25, 2013. URL:https://thenextweb.com/apple/2013/03/26/what-exactly-wifislam-is-and-why-apple-acquired-it [retrieved Feb. 24, 2021].

Pech-Pacheco et al., Diatom autofocusing in brightfield microscopy: a comparative study. Proceedings 15th International Conference on Pattern Recognition. ICPR-2000. Sep. 2000;3:314-317.

Pertuz et al., Analysis of focus measure operators for shape-from-focus. Pattern Recognition. May 2013;46:1415-32.

Qi et al., Pointnet: Deep learning on point sets for 3d classification and segmentation. arXiv:1612.00593. Apr. 10, 2017. 19 pages.

Rabinovich et al., Lumin OS & Lumin SDK: past, present and future. Magic Leap, Inc. Apr. 2, 2019. URL:https://www.magicleap.com/en-us/news/product-updates/lumin-os-and-lumin-sdk-update [retrieved on Dec. 31, 2020]. 9 pages.

Snavely et al., Skeletal graphs for efficient structure from motion. IEEE Conference on Computer Vision and Pattern Recognition. Jun. 23, 2008. 11 pages. URL:http://www.cs.cornell.edu/~snavely/projects/skeletalset.

Sturari et al., Robust and affordable retail customer profiling by vision and radio beacon sensor fusion. Pattern Recognition Letters. Oct. 1, 2016;81:30-40.

Sweeney et al., Efficient computation of absolute pose for gravity-aware augmented reality. 2015 IEEE International Symposium on Mixed and Augmented Reality (ISMAR). Sep. 29, 2015, pp. 19-24.

Taira et al., InLoc: Indoor visual localization with dense matching and view synthesis. Proceedings of the IEEE Conference on Computer Vision and Pattern Recognition. 2018. pp. 7199-7209.

Tang, Applying Deep Learning to Detect Blurry Images. Dec. 12, 2017. 6 pages. URL:https://tangming2008.github.io/neural network/tensor flow/classification/Applying-Deep-Learning-to-Detect-Blurry-Images/.

Tong et al., Blur detection for digital images using wavelet transform. 2004 IEEE international conference on multimedia and expo (ICME). Jun. 2004;1:17-20.

Vogt, Real-Time Augmented Reality for Image-Guided Interventions. Doctoral dissertation, Friedrich-Alexander-Universität Erlangen-Nürnberg (FAU). Feb. 18, 2009. 48 pages. URL:https://opus4.kobv.de/opus4-fau/files/1235/sebastianVogtDissertation.pdf.

Willaredt, WiFi and Cell-ID based positioning—Protocols, Standards and Solutions. SNET Project WT. Jan. 26, 2011. 10 pages.

Xiong et al., A Diversified Generative Latent Variable Model for WiFi-SLAM. Proceedings of the Thirty-First AAAI Conference on Artificial Intelligence (AAAI-17). Feb. 2017;31:3841-3847.

Yi et al., Learning to find good correspondences. arXiv:1711.05971. May 21, 2018. 13 pages.

Zhao et al., Cross Reality System Supporting Multiple Device Types, U.S. Appl. No. 17/571,172, filed Jan. 1, 2022.

* cited by examiner

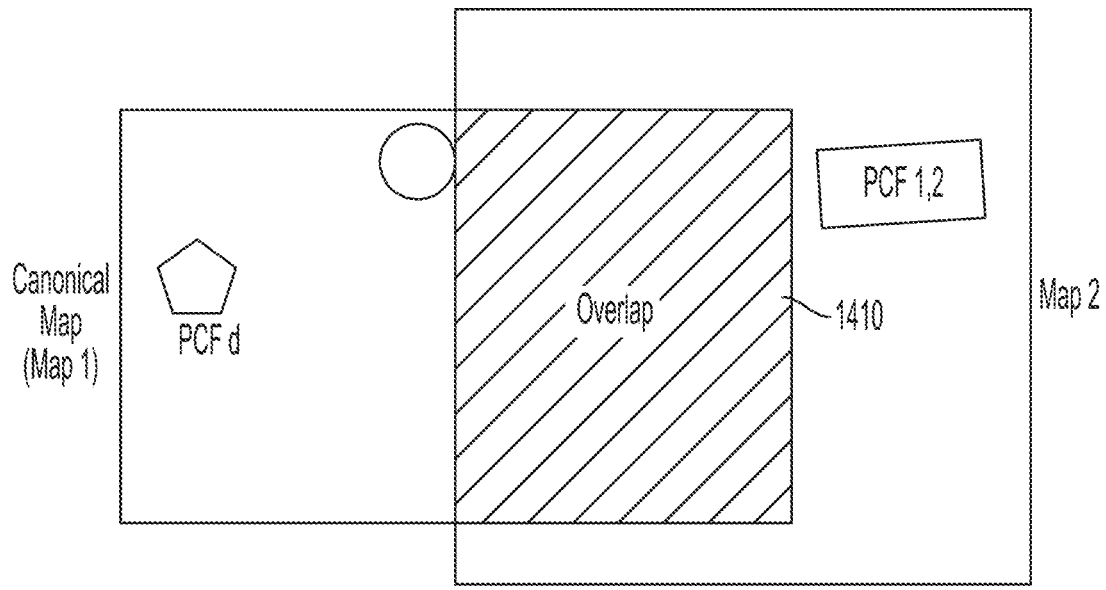
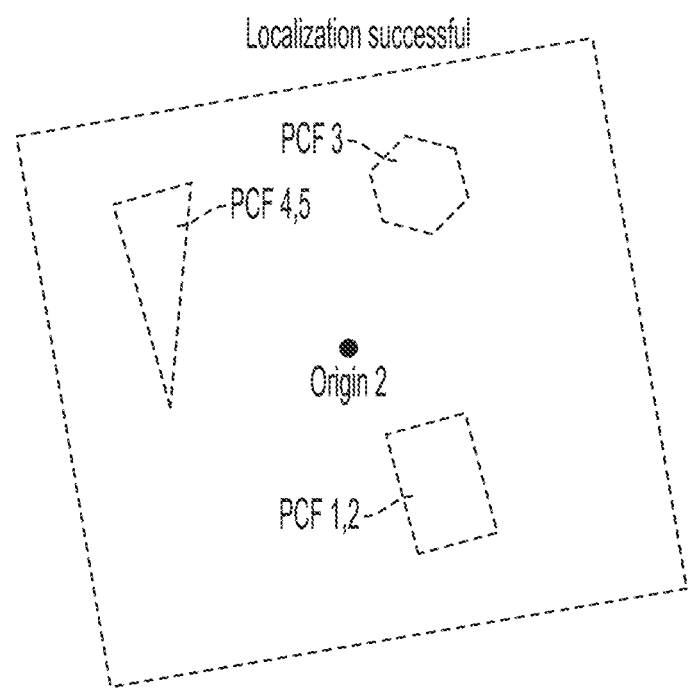
FIG. 14B

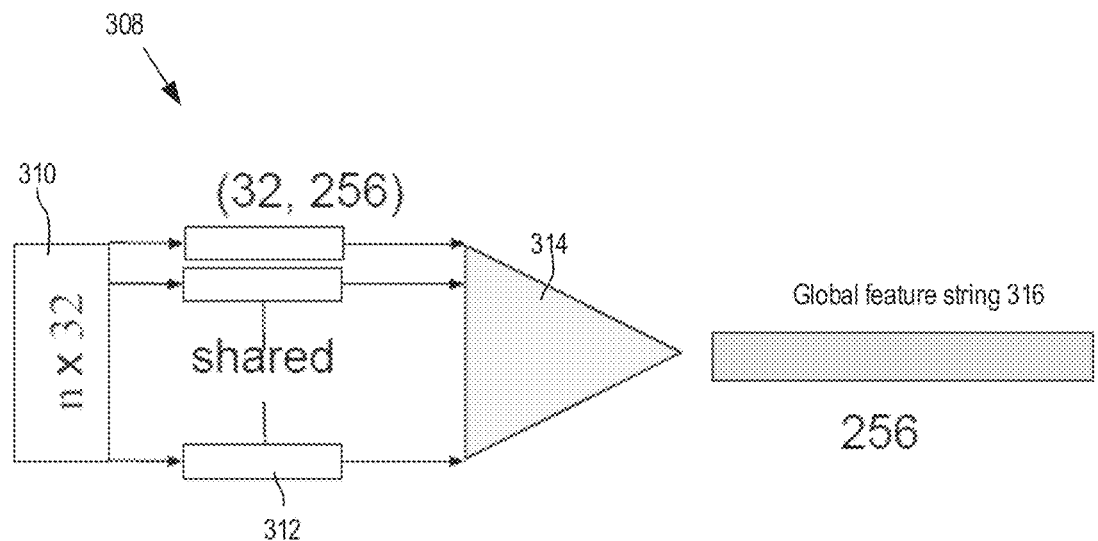
FIG. 29A
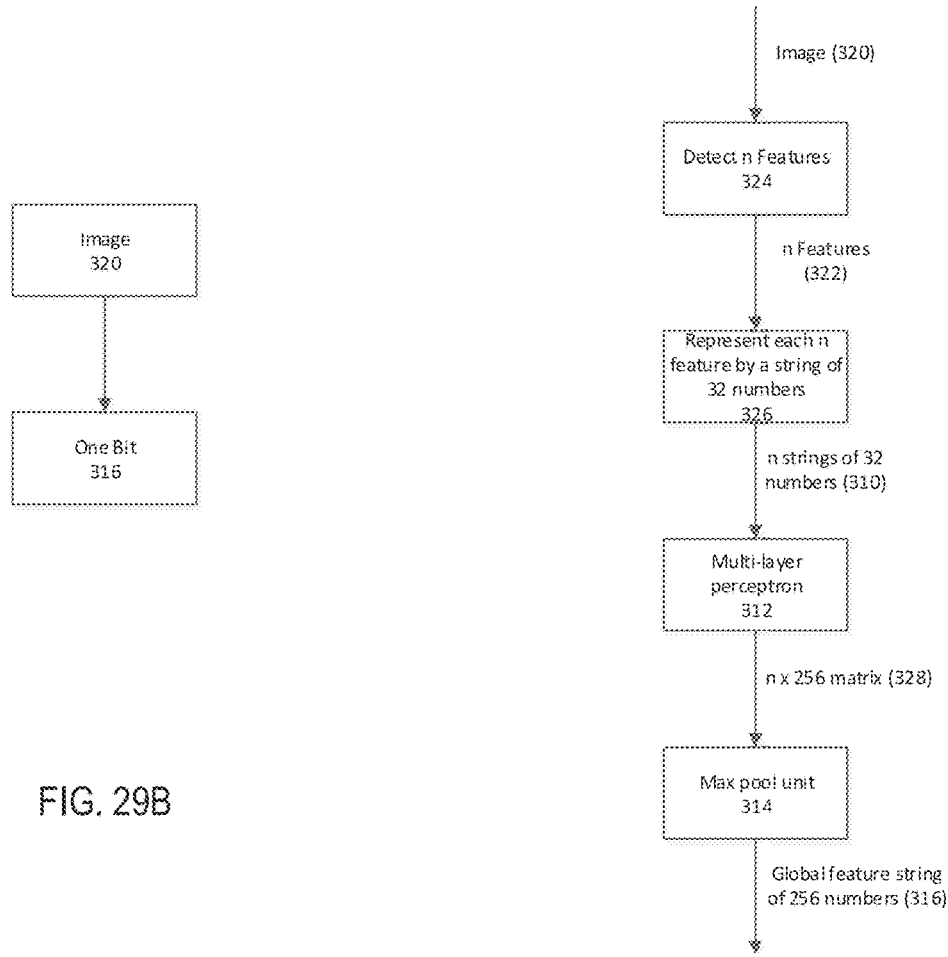
FIG. 29B
FIG. 29C

CROSS REALITY SYSTEM

CROSS-REFERENCE TO RELATED APPLICATIONS

This application is a continuation of U.S. patent application Ser. No. 16/538,759, filed Aug. 12, 2019 and entitled "CROSS REALITY SYSTEM," which is hereby incorporated herein by reference in its entirety. U.S. patent application Ser. No. 16/538,759 claims priority to and the benefit of U.S. Provisional Patent Application No. 62/718,357, filed on Aug. 13, 2018 and entitled "VIEWING DEVICE OR VIEWING DEVICES HAVING ONE OR MORE COORDINATE FRAME TRANSFORMERS," which is hereby incorporated herein by reference in its entirety. U.S. patent application Ser. No. 16/538,759 also claims priority to and the benefit of U.S. Provisional Patent Application No. 62/742,237, filed on Oct. 5, 2018 and entitled "COORDINATE FRAME PROCESSING AUGMENTED REALITY," which is hereby incorporated herein by reference in its entirety. U.S. patent application Ser. No. 16/538,759 also claims priority to and the benefit of U.S. Provisional Patent Application No. 62/812,935, filed on Mar. 1, 2019 and entitled "MERGING A PLURALITY OF INDIVIDUALLY MAPPED ENVIRONMENTS," which is hereby incorporated herein by reference in its entirety. U.S. patent application Ser. No. 16/538,759 also claims priority to and the benefit of U.S. Provisional Patent Application No. 62/815,955, filed on Mar. 8, 2019 and entitled "VIEWING DEVICE OR VIEWING DEVICES HAVING ONE OR MORE COORDINATE FRAME TRANSFORMERS," which is hereby incorporated herein by reference in its entirety. U.S. patent application Ser. No. 16/538,759 also claims priority to and the benefit of U.S. Provisional Patent Application No. 62/868,786, filed on Jun. 28, 2019 and entitled "RANKING AND MERGING A PLURALITY OF ENVIRONMENT MAPS," which is hereby incorporated herein by reference in its entirety. U.S. patent application Ser. No. 16/538,759 also claims priority to and the benefit of U.S. Provisional Patent Application No. 62/870,954, filed on Jul. 5, 2019 and entitled "RANKING AND MERGING A PLURALITY OF ENVIRONMENT MAPS," which is hereby incorporated herein by reference in its entirety. U.S. patent application Ser. No. 16/538,759 also claims priority to and benefit of U.S. Provisional Patent Application No. 62/884,109, filed on Aug. 7, 2019 and entitled "A VIEWING SYSTEM," which is hereby incorporated herein by reference in its entirety.

TECHNICAL FIELD

This application relates generally to a cross reality system.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users' sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

An XR system may represent the physical world around a user of the system as a "mesh." A mesh may be represented by multiple, interconnected triangles. Each triangle has edges joining points on a surface of an object within the physical world, such that each triangle represents a portion of the surface. Information about the portion of the surface, such as color, texture or other properties may be stored in associate within the triangle. In operation, an XR system may process image information to detect points that and surfaces so as to create or update the mesh.

BRIEF SUMMARY

Aspects of the present application relate to methods and apparatus for providing X reality (cross reality or XR) scenes. Techniques as described herein may be used together, separately, or in any suitable combination.

Some embodiments relate to an XR system including a first XR device that includes a first processor, a first computer-readable medium connected to the first processor, a first origin coordinate frame stored on the first computer-readable medium, a first destination coordinate frame stored on the computer-readable medium, a first data channel to receive data representing local content, a first coordinate frame transformer executable by the first processor to transform a positioning of the local content from the first origin coordinate frame to the first destination coordinate frame, and a first display system adapted to display the local content to a first user after transforming the positioning of the local content from the first origin coordinate frame to the first destination coordinate frame.

Some embodiments relate to a viewing method including storing a first origin coordinate frame, storing a first destination coordinate frame, receiving data representing local content, transforming a positioning of local content from the first origin coordinate frame to the first destination coordinate frame, and displaying the local content to a first user after transforming the positioning of the local content from the first origin coordinate frame to the first destination coordinate frame.

Some embodiments relate to an XR system including a map storing routine to store a first map, being a canonical map, having a plurality of anchors, each anchor of the first map having a set of coordinates, a real object detection device positioned to detect locations of real objects, an anchor identification system connected to the real object detection device to detect, based on the locations of the real objects, anchors of a second map, each anchor of the second map having a set of coordinates and a localization module connected to the canonical map and the second map and executable to localize the second map to the canonical map by matching a first anchor of the second map to a first anchor of the canonical map and matching a second anchor of the second map to a second anchor of the canonical map.

Some embodiments relate to a viewing method including storing a first map, being a canonical map, having a plurality of anchors, each anchor of the canonical map having a set of coordinates, detecting locations of real objects, detecting, based on the locations of the real objects, anchors of a second map, each anchor of the second map having a set of coordinates and localizing the second map to the canonical map by matching a first anchor of the second map to a first anchor of the first map and matching a second anchor of the second map to a second anchor of the canonical map.

Some embodiments relate to an XR system including a server that may have a processor, a computer-readable medium connected to the processor, a plurality of canonical maps on the computer-readable medium, a respective canonical map identifier on the computer-readable medium associated with each respective canonical map, the canonical map identifiers differing from one another to uniquely identify the canonical maps, a position detector on the computer-readable medium and executable by the processor to receive and store a position identifier from an XR device, a first filter on the computer-readable medium and executable by the processor to compare the position identifier with the canonical map identifiers to determine one or more canonical maps that form a first filtered selection, and a map transmitter on the computer-readable medium and executable by the processor to transmit one or more of the canonical maps to the XR device based on the first filtered selection.

Some embodiments relate to a viewing method including storing a plurality of canonical maps on a computer-readable medium, each canonical map having a respective canonical map identifier associated with the respective canonical map, the canonical map identifiers differing from one another to uniquely identify the canonical maps, receiving and storing, with a processor connected to the computer-readable medium, a position identifier from an XR device, comparing, with the processor, the position identifier with the canonical map identifiers to determine one or more canonical maps that form a first filtered selection, and transmitting, with the processor, a plurality of the canonical maps to the XR device based on the first filtered selection.

Some embodiments relate to an XR system including a processor, a computer readable medium connected to the processor, a multilayer perception unit, on the computer readable medium and, executable by the processor, that receives a plurality of features of an image and converts each feature to a respective string of numbers, and a max pool unit, on the computer-readable medium and executable by the processor, that combines a maximum value of each string of numbers into a global feature string representing the image.

Some embodiments relate to a viewing method, including receiving, with a processor, a plurality of features of an image, converting, with the processor, each feature to a respective string of numbers, and combining, with the processor, a maximum value of each string of numbers into a global feature string representing the image.

Some embodiments relate to a method of operating a computing system to identify one or more environment maps stored in a database to merge with a tracking map computed based on sensor data collected by a device worn by a user, wherein the device received signals of access points to computer networks while computing the tracking map, the method including determining at least one area attribute of the tracking map based on characteristics of communications with the access points, determining a geographic location of the tracking map based on the at least one area attribute, identifying a set of environment maps stored in the database corresponding to the determined geographic location, filtering the set of environment maps based on similarity of one or more identifiers of network access points associated with the tracking map and the environment maps of the set of environment maps, filtering the set of environment maps based on similarity of metrics representing contents of the tracking map and the environment maps of the set of environment maps, and filtering the set of environment maps based on degree of match between a portion of the tracking map and portions of the environment maps of the set of environment maps.

Some embodiments relate to a cloud computing environment for an augmented reality system configured for communication with a plurality of user devices comprising sensors, including a user database storing area identities indicating areas that the plurality of user devices were used in, the area identities comprising parameters of wireless networks detected by the user devices when in use, a map database storing a plurality of environment maps constructed from data supplied by the plurality of user devices and associated metadata, the associated metadata comprising area identities derived from area identities of the plurality of user devices that supplied data from which the maps were constructed, the area identities comprising parameters of wireless networks detected by the user devices that supplied data from which the maps were constructed, non-transitory computer storage media storing computer-executable instructions that, when executed by at least one processor in the cloud computing environment, receives messages from the plurality of user devices comprising parameters of wireless networks detected by the user devices, computes area identifiers for the user devices and updates the user database based on the received parameters and/or the computed area identifiers, and receives requests for environment maps from the plurality of user devices, determines area identifiers associated with the user devices requesting environment maps, identifies sets of environment maps from the map database based, at least in part, on the area identifiers, filters the sets of environment maps, and transmits the filtered sets of environment maps to the user devices, wherein filtering a set of environment maps is based on similarity of parameters of wireless networks detected by a user device from which the request for environment maps originated to parameters of wireless networks in the map database for the environment maps in the set of environment maps.

Some embodiments relate to an XR system including a real object detection device to detect a plurality of surfaces of real-world objects, an anchor identification system connected to the real object detection device to generate a map based on the real-world objects, a persistent coordinate frame (PCF) generation system to generate a first PCF based on the map and associate the first PCF with the map, first and second storage mediums on first and second XR devices, respectively, and at least first and second processors of the first and second XR devices, to store the first PCF in first and second storage mediums of the first and second XR devices respectively.

Some embodiments relate to a viewing method including detecting, with at least one detection device a plurality of surfaces of real-world objects, generating, with at least one processor, a map based on the real-world objects, generating, with at least one processor, a first PCF based on the map, associating, with the at least one processor, the first PCF with the map, and storing, with at least first and second processors of first and second XR devices, the first PCF in first and second storage mediums of the first and second XR devices respectively.

Some embodiments relate to an XR system including a first XR device that may include a first XR device processor, a first XR device storage device connected to the first XR device processor, a set of instructions on the first XR device processor, including a download system, executable by the first XR device processor, to download persistent poses from a server, a PCF retriever, executable by the first XR device processor, to retrieve PCF's from the first storage device of the first XR device based on the persistent poses, and a coordinate frame calculator, executable by the first XR device processor, to calculate a coordinate frame based on the PCF's retrieved from the first storage device.

Some embodiments relate to a viewing method including downloading, with a first XR device processor of a first XR device, persistent poses from a server, retrieving, with the first XR device processor, PCF's from the first storage device of the first XR device based on the persistent poses, and calculating, with the first XR device processor, a coordinate frame based on the PCF's retrieved from the first storage device.

Some embodiments relate to a viewing method including a server that may include a server processor, a server storage device connected to the server processor, a map storing routine storing, executable with a server processor of the server, to store the first PCF in association with a map on the server storage device of the server, and a map transmitter, with the server processor, executable with a server processor, to transmit the map and the first PCF to a first XR device. The invention also provides a viewing method including storing, with a server processor of the server, the first PCF in association with a map on a server storage device of the server, and transmitting, with the server processor of the server, the map and the first PCF to a first XR device.

Some embodiments relate to a viewing method including entering, by a processer of a XR device, tracking of head pose by capturing surfaces of an environment with a capture device on a head-mounted frame secured to a head of a user and determining an orientation of the head-mounted frame relative to the surfaces, determining, by the processor, whether head pose is lost due to an inability to determine the orientation of the head-mounted frame relative to the surfaces, and if head pose is lost, then, by the processor, entering pose recovery mode to establish the head pose by determining an orientation of the head-mounted frame relative to the surfaces.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 14A-14B are a schematic diagram illustrating a successful localization of Map 2 of FIG. 13 to the canonical map, according to some embodiments;

FIGS. 29A-29C are block diagrams illustrating a system for generating global feature strings of images and/or maps, according to some embodiments;

DETAILED DESCRIPTION

Figure 1:
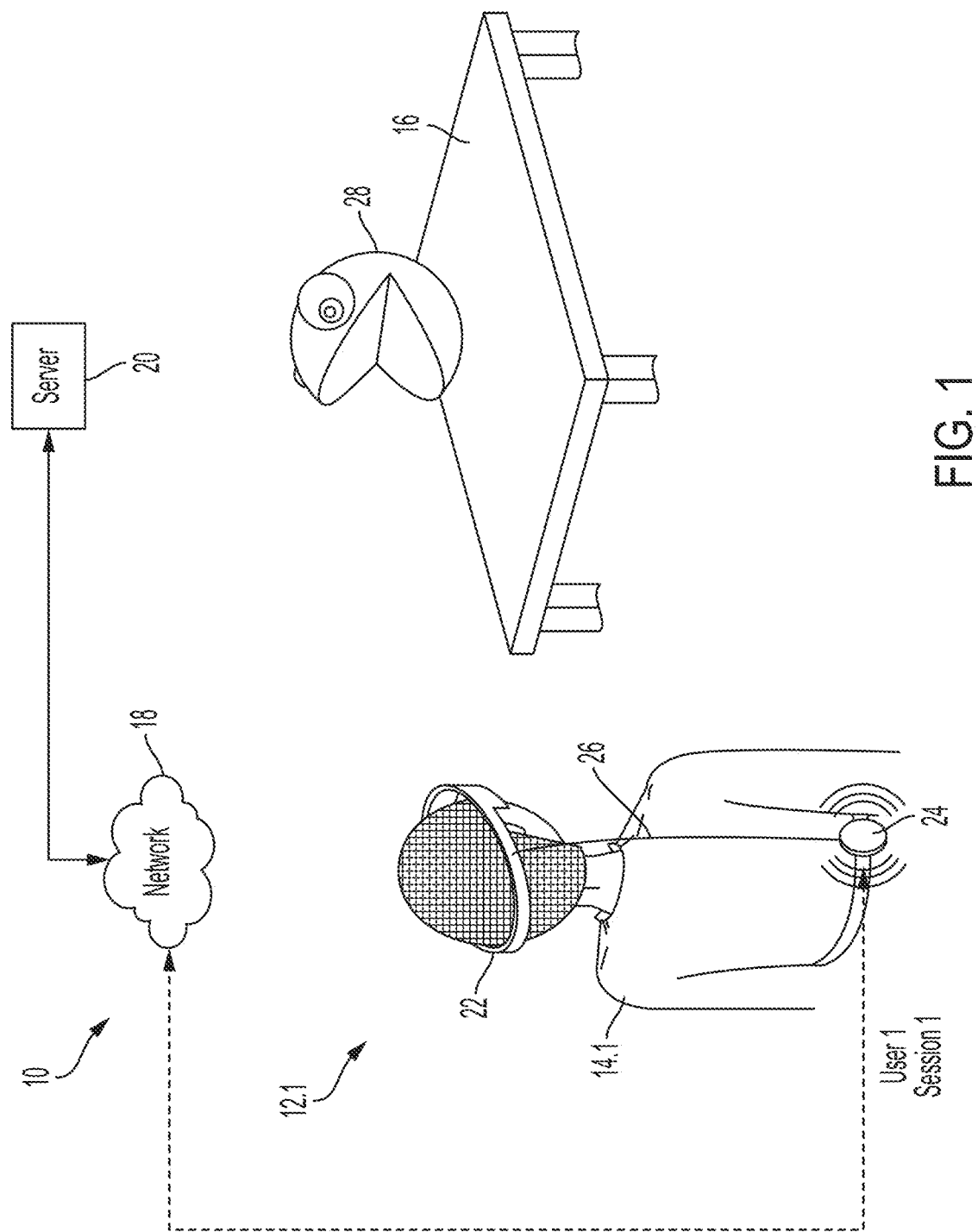
FIG. 1 is a schematic diagram illustrating a cross reality (XR) system, according to some embodiments.

Described herein are methods and apparatus for providing X reality (XR or cross reality) scenes. To provide realistic XR experiences to multiple users, an XR system must know the users' physical surroundings in order to correctly correlate locations of virtual objects in relation to real objects. An XR system may build an environment map of a scene, which may be created from image and depth information collected with sensors that are part of XR devices worn by users of the XR system.

The inventors have realized and appreciated techniques for operating XR systems to provide XR scenes for a more immersive user experience by enabling persistent environment maps to be created, stored and retrieved by any of multiple users of an XR system. Such persistent environment maps may enable one or more functions that enhance an XR experience. For example, the wearable device worn by a user, after being turned on, may retrieve from persistent storage, such as from cloud storage, an appropriate environment map that was previously created and stored. That previously stored map may have been based on data about the environment collected with sensors on the user's wearable device a prior time or times that the user was present. Retrieving a persistent map may enable use of the wearable device without a scan of the physical world with the sensors on the wearable device. Alternatively or additionally, the user upon entering a new region of the physical world may similarly retrieve an appropriate environment map.

In a multiuser XR system, the persistent environment map accessed by one user may have been created and stored by another user and/or may have been constructed by aggregating data about the physical world collected by sensors on wearable devices worn by multiple users who were previously present in at least a portion of the physical world represented by the persistent environment map.

Further, sharing data about the physical world among multiple users may enable shared user experiences of virtual content. Two XR devices that have access to the same persistent environment map, for example, may both localize with respect to the persistent environment map. Once localized, a user device may render virtual content that has a location specified by reference to the persistent environment map by translating that location to a frame or reference maintained by the user device. The user device may use this local frame of reference to control the display of the user device to render the virtual content in the specified location.

To support these, and other possible functions, the XR system may include components that, based on data about the physical world collected with sensors on user devices, develop, maintain, and use one or more persistent environment maps. These components may be distributed across the XR system, with some operating, for example, on a head mounted portion of a user device. Other components may operate on a computer, associated with the user coupled to the head mounted portion over a local or personal area network. Yet others may operate at a remote location, such as at one or more servers accessible over a wide area network.

These components, for example, may include components that can identify from information about the physical world collected by one or more user devices information that is of sufficient quality to be stored as a persistent environment map. An example of such a component, described in greater detail below is PCF integration unit 1300 in FIG. 6.

As another example, these components may include components that may aid in determining an appropriate persistent environment map that may be retrieved and used by a user device. An example of such a component, described in greater detail below is a map rank component. Such a component, for example, may receive inputs from a user device and identify one or more persistent environment maps that are likely to represent the region of the physical world in which that device is operating. A map rank component, for example, may aid in selecting a persistent environment map to be used by that local device as it renders virtual content, gathers data about the environment, or performs other actions. A map rank component, alternatively or additionally, may aid in identifying persistent environment maps to be updated as additional information about the physical world is collected by one or more user devices.

Other components may be application programming interfaces (API's). A platform that builds and maintains persistent environment maps may provide one or more API's to enable separately created applications to obtain information about the physical world.

Yet other components may be transformations that transform information captured or described in relation to one reference frame to be translated into another reference frame. For example, sensors may be attached to a head mounted display such that the data read from that sensor indicates locations of objects in the physical world with respect to the head pose of the wearer. One or more transformations may be applied to relate that location information to the coordinate frame associated with a persistent environment map. Similarly, data indicating where a virtual object is to be rendered when expressed in a coordinate frame of a persistent environment map may be put through one or more transformations to be in a frame of reference of the display on the user's head. As described in greater detail below, there may be multiple such transformations. These transformations may be partitioned across the components of an XR system such that they may be efficiently updated and or applied in a distributed system.

In some embodiments, map information may be represented in a way that may be readily shared among users and among the distributed components, including applications. Information about the physical world, for example, may be represented as a coordinate frame with one or more anchors, representing features recognized in the physical world. Such maps may be sparse, providing less than all of the available information about the physical world, such that they may be efficiently processed and transferred.

In some embodiments, the persistent environment maps may be constructed from information collected by multiple user devices. The XR devices may construct separate tracking maps (TM) with information collected by sensors of the XR devices worn by the user of the system at various locations and times. Each TM may include points, each of which may be associated with a real object in the environment. In addition to potentially supplying input to create and maintain persistent environment maps, the TMs may be used to track users' motions in a scene, enabling an XR system to estimate respective users' head poses based on a TM.

This co-dependence between the creation of an environment map and the estimation of head poses constitutes significant challenges. Substantial processing may be required to create the environment map and estimate head poses simultaneously. The processing must be accomplished quickly as objects move in the scene (e.g., moving a cup on a table) and as users move in the scene because latency makes XR experiences less immersive for users. On the other hand, an XR device can provide limited computational resources because the weight of an XR device should be light for a user to wear comfortably. Thus, lack of computational resources cannot be compensated for with more sensors. Further, more sensors and more computational resources lead to heat, which may cause deformation of an XR device.

The inventors have realized and appreciated techniques for operating XR systems to provide XR scenes for a more immersive user experience such as estimating head poses at a frequency of 1 kHz, with low usage of computational resources such as four video graphic array (VGA) cameras operating at 30 Hz, one inertial measurement unit (IMU) operating at 1 kHz, compute power of a single advanced RISC machine (ARM) core, memory less than 1 GB, and network bandwidth less than 100 Mbp. These techniques relate to reducing processing required to generate and maintain environment maps and estimate head poses as well as to providing and consuming data with low computational overhead.

These techniques may include hybrid tracking such that an XR system can leverage both (1) patch-based tracking of distinguishable points between successive images (frame-to-frame tracking) of the environment, and (2) matching of points of interest of a current image with a descriptor-based map of known real-world locations of corresponding points of interest (map-to-frame tracking). In frame-to-frame tracking, the XR system can track particular points of interest (salient points), such as corners, between captured images of the real-world environment. For example, the display system can identify locations of visual points of interest in a current image, which were included in (e.g., located in) a previous image. This identification may be accomplished using, e.g., photometric error minimization processes. In map-to-frame tracking, the XR system can access map information indicating real-world locations of points of interest (e.g., three-dimensional coordinates), and match points of interest included in a current image to the points of interest indicated in the map information. Information regarding the points of interest is stored as descriptors in the map database. The XR system can then calculate its pose based on the matched visual features. U.S. patent application Ser. No. 16/221,065 describes hybrid tracking and is hereby incorporated herein by reference in its entirety.

These techniques may include reducing the amount of data that is processed when constructing maps, such as by constructing sparse maps with a collection of mapped points and keyframes and/or dividing the maps into blocks to enable updates by blocks. A mapped point may be associated with a three-dimensional (3D) world reconstruction of a real object in the environment. A keyframe may include selected information from camera-captured data. U.S. patent application Ser. No. 16/520,582 describes determining and/or evaluating localization maps and is hereby incorporated herein by reference in its entirety.

These techniques may include creating dynamic maps based on one or more coordinate systems in real space across one or more sessions, generating persistent coordinate frames (PCF) over the sparse maps, which may be exposed to XR applications via, for example, an application programming interface (API), ranking and mapping multiple maps created by one or more XR devices, using deep key frame analysis in some embodiments, and recovering and reseting head poses.

Techniques as described herein may be used together or separately with many types of devices and for many types of scenes, including wearable or portable devices with limited computational resources that provide an augmented reality scene.

Coordinate Frames

Described herein are methods and apparatus for providing virtual contents using an XR system, independent of locations of eyes viewing the virtual content. Conventionally, a virtual content is re-rendered upon any motion of the displaying system. For example, if a user wearing a display system views a virtual representation of a three-dimensional (3D) object on the display and walks around the area where the 3D object appears, the 3D object should be re-rendered for each viewpoint such that the user has the perception that he or she is walking around an object that occupies real space. However, the re-rendering consumes significant computational resources of a system and causes artifacts due to latency.

The inventors have recognized and appreciated that head pose (e.g., the location and orientation of a user wearing an XR system) may be used to render a virtual content independent of eye rotations within a head of the user. In some embodiments, dynamic maps of a scene may be generated based on multiple coordinate frames in real space across one or more sessions such that virtual contents interacting with the dynamic maps may be rendered robustly, independent of eye rotations within the head of the user and/or independent of sensor deformations caused by, for example, heat generated during high-speed, computation-intensive operation. In some embodiments, the configuration of multiple coordinate frames may enable a first XR device worn by a first user and a second XR device worn by a second user to recognize a common location in a scene. In some embodiments, the configuration of multiple coordinate frames may enables the first and second users wearing the first and second XR devices to view a virtual content in a same location of a scene.

In some embodiments, a tracking map may be built in a world coordinate frame, which may have a world origin. The world origin may be the first pose of an XR device when the XR device is powered on. The world origin may be aligned to gravity such that a developer of an XR application can get gravity alignment without extra work. Different tracking maps may be built in different world coordinate frames because the tracking maps may be captured by a same XR device at different sessions and/or different XR devices worn by different users. In some embodiments, a session of an XR device may start from powering on to powering off the device. In some embodiments, an XR device may have a head coordinate frame, which may have a head origin. The head origin may be the current pose of an XR device when an image is taken. The difference between head pose of a world coordinate frame and of a head coordinate frame may be used to estimate a tracking route.

In some embodiments, an XR device may have a camera coordinate frame, which may have a camera origin. The camera origin may be the current pose of one or more sensors of an XR device. The inventors have recognized and appreciated that the configuration of a camera coordinate frame enables robust displaying virtual contents independent of eye rotation within a head of a user. This configuration also enables robust displaying of virtual contents independent of sensor deformation due to, for example, heat generated during operation.

In some embodiments, an XR device may have a head unit with a head-mountable frame that a user can secure to their head and may include two waveguides, one in front of each eye of the user. The waveguides may be transparent so that ambient light from real-world objects can transmit through the waveguides and the user can see the real-world objects. Each waveguide may transmit projected light from a projector to a respective eye of the user. The projected light may form an image on the retina of the eye. The retina of the eye thus receives the ambient light and the projected light. The user may simultaneously see real-world objects and one or more virtual objects that are created by the projected light. In some embodiments, XR devices may have sensors that detect real-world objects around a user. These sensors may, for example, be cameras that capture images that may be processed to identify the locations of real-world objects.

In some embodiments, an XR system may assign a local coordinate frame to a virtual content, as opposed to attaching the virtual content in a world coordinate frame. Such configuration enables a virtual content to be attached to a more persistent frame position such as a persistent coordinate frame (PCF). In some embodiments, when a head pose session ends, a local coordinate frame may be converted to a world coordinate frame. In some embodiments, a world coordinate frame may be the origin of a previous session's map that has been localized relative to the current local coordinate frame. When the locations of the objects change, the XR device may detect the changes in the environment map and determine movement of the head unit worn by the user relative to real-world objects.

FIG. 1 illustrates an XR system 10, according to some embodiments. The XR system may include a first XR device 12.1 that is worn by a first user 14.1, a real object in the form of a table 16, a network 18 and a server 20.

In the illustrated example, the first XR device 12.1 includes a head unit 22, a belt pack 24 and a cable connection 26. The first user 14.1 secures the head unit 22 to their head and the belt pack 24 remotely from the head unit 22 on their waist. The cable connection 26 connects the head unit 22 to the belt pack 24. The head unit 22 includes technologies that are used to display a virtual object or objects to the first user 14.1 while the first user 14.1 is permitted to see real objects such as the table 16. The belt pack 24 includes primarily processing and communications capabilities of the first XR device 12.1. In some embodiments, the processing and communication capabilities may reside entirely or partially in the head unit 22 such that the belt pack 24 may be removed or may be located in another device such as a backpack.

In the illustrated example, the belt pack 24 is connected via a wireless connection to the network 18. The server 20 is connected to the network 18 and holds data representative of local content. The belt pack 24 downloads the data representing the local content from the server 20 via the network 18. The belt pack 24 provides the data via the cable connection 26 to the head unit 22. The head unit 22 may include a display that has a light source, for example, a laser light source or a light emitting diode (LED) light source, and a waveguide that guides the light.

In some embodiments, the first user 14.1 may mount the head unit 22 to their head and the belt pack 24 to their waist. The belt pack 24 may download image data over the network 18 from the server 20. The first user 14.1 may see the table 16 through a display of the head unit 22. A projector forming part of the head unit 22 may receive the image data from the belt pack 24 and generate light based on the image data. The light may travel through one or more of the waveguides forming part of the display of the head unit 22. The light may then leave the waveguide and propagates onto a retina of an eye of the first user 14.1. The projector may generate the light in a pattern that is replicated on a retina of the eye of the first user 14.1. The light that falls on the retina of the eye of the first user 14.1 may have a selected field of depth so that the first user 14.1 perceives an image at a preselected depth behind the waveguide. In addition, both eyes of the first user 14.1 may receive slightly different images so that a brain of the first user 14.1 perceives a three-dimensional image or images at selected distances from the head unit 22. In the illustrated example, the first user 14.1 perceives a virtual content 28 above the table 16. The proportions of the virtual content 28 and its location and distance from the first user 14.1 are determined by the data representing the virtual content 28 and various coordinate frames that are used to display the virtual content 28 to the first user 14.1.

In the illustrated example, the virtual content 28 is not visible from the perspective of the drawing and is visible to the first user 14.1 through using the first XR device 12.1. The virtual content 28 may initially resides as data structures within vision data and algorithms in the belt pack 24. The data structures may then manifest themselves as light when the projectors of the head unit 22 generate light based on the data structures. It should be appreciated that although the virtual content 28 has no existence in three-dimensional space in front of the first user 14.1, the virtual content 28 is still represented in FIG. 1 in three-dimensional space for illustration purpose. The visualization of computer data in three-dimensional space may be used in this description to illustrate how the data structures that facilitate the renderings are perceived by one or more users relate to one another within the data structures in the belt pack 24.

Figure 2:
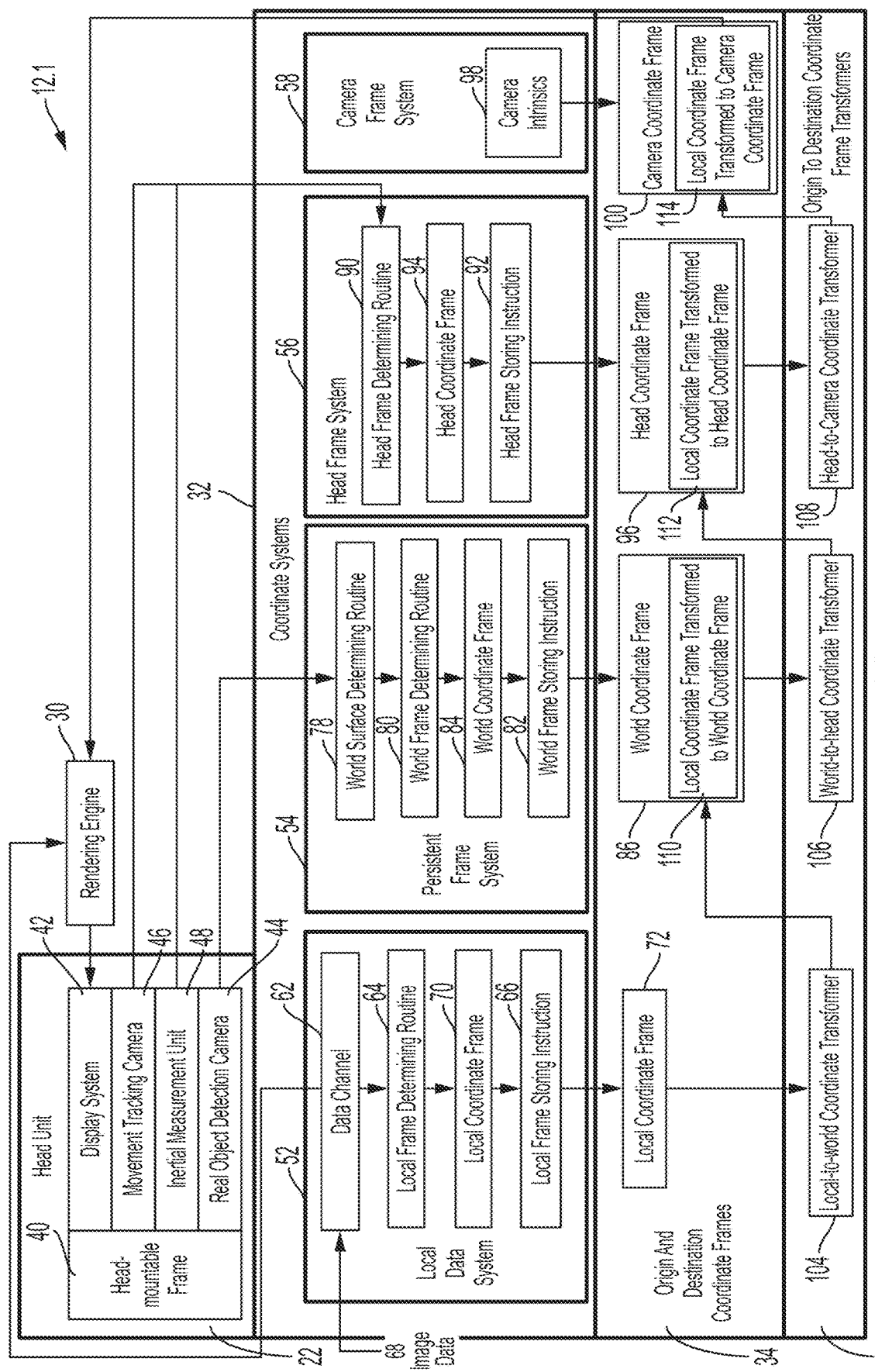
FIG. 2 is a block diagram of a first XR device of the XR system of FIG. 1, according to some embodiments.

FIG. 2 illustrates components of the first XR device 12.1, according to some embodiments. The first XR device 12.1 may include the head unit 22, and various components forming part of the vision data and algorithms including, for example, a rendering engine 30, various coordinate systems 32, various origin and destination coordinate frames 34, and various origin to destination coordinate frame transformers 36.

The head unit 22 may include a head-mountable frame 40, a display system 42, a real object detection camera 44, a movement tracking camera 46, and an inertial measurement unit 48.

The head-mountable frame 40 may have a shape that is securable to the head of the first user 14.1 in FIG. 1. The display system 42, real object detection camera 44, movement tracking camera 46, and inertial measurement unit 48 may be mounted to the head-mountable frame 40 and therefore move together with the head-mountable frame 40.

The coordinate systems 32 may include a local data system 52, a world frame system 54, a head frame system 56, and a camera frame system 58.

The local data system 52 may include a data channel 62, a local frame determining routine 64 and a local frame storing instruction 66. The data channel 62 may be an internal software routine, a hardware component such as an external cable or a radio frequency receiver, or a hybrid component such as a port that is opened up. The data channel 62 may be configured to receive image data 68 representing a virtual content.

The local frame determining routine 64 may be connected to the data channel 62. The local frame determining routine 64 may be configured to determine a local coordinate frame 70. In some embodiments, the local frame determining routine may determine the local coordinate frame based on real world objects or real world locations. In some embodiments, the local coordinate frame may be based on the origin at the initialization of the head pose session. In some embodiments, the local coordinate frame may be located where the device was booted up, or could be somewhere new if head pose was lost during the boot session. In some embodiments, the local coordinate frame may be the origin at the start of a head pose session. In some embodiments, the virtual content may also have an associated content coordinate frame. In some embodiments, the content coordinate frame may be based on a top edge relative to a bottom edge of a browser window, head or feet of a character, a node on an outer surface of a prism or bounding box that encloses the virtual content, or any other suitable location to place a coordinate frame that defines a facing direction of a virtual content and a location (e.g. a node, such as a placement node or anchor node) with which to place the virtual content, etc.

The local frame storing instruction 66 may be connected to the local frame determining routine 64. One skilled in the art will understand that software modules and routines are "connected" to one another through subroutines, calls, etc. The local frame storing instruction 66 may store the local coordinate frame 70 as a local coordinate frame 72 within the origin and destination coordinate frames 34. In some embodiments, the origin and destination coordinate frames 34 may be one or more coordinate frames that may be manipulated or transformed in order for a virtual content to persist between sessions. In some embodiments, a session may be the period of time between a boot-up and shut-down of an XR device. Two sessions may be two start-up and shut-down periods for a single XR device, or may be a start-up and shut-down for two different XR devices.

In some embodiments, the origin and destination coordinate frames 34 may be the coordinate frames involved in one or more transformations required in order for a first user's XR device and a second user's XR device to recognize a common location. In some embodiments, the destination coordinate frame may be the output of a series of computations and transformations applied to the target coordinate frame in order for a first and second user to view a virtual content in the same location.

The rendering engine 30 may be connected to the data channel 62. The rendering engine 30 may receive the image data 68 from the data channel 62 such that the rendering engine 30 may render virtual content based, at least in part, on the image data 68.

The display system 42 may be connected to the rendering engine 30. The display system 42 may include components that transform the image data 68 into visible light. The visible light may form two patterns, one for each eye. The visible light may enter eyes of the first user 14.1 in FIG. 1 and may be detected on retinas of the eyes of the first user 14.1.

The real object detection camera 44 may include one or more cameras that may capture images from different sides of the head-mountable frame 40. The movement tracking camera 46 may include one or more cameras that capture images on sides of the head-mountable frame 40. One set of one or more cameras may be used instead of the two sets of one or more cameras representing the real object detection camera(s) 44 and the movement tracking camera(s) 46. In some embodiments, the cameras 44, 46 may capture images.

Figure 11A:
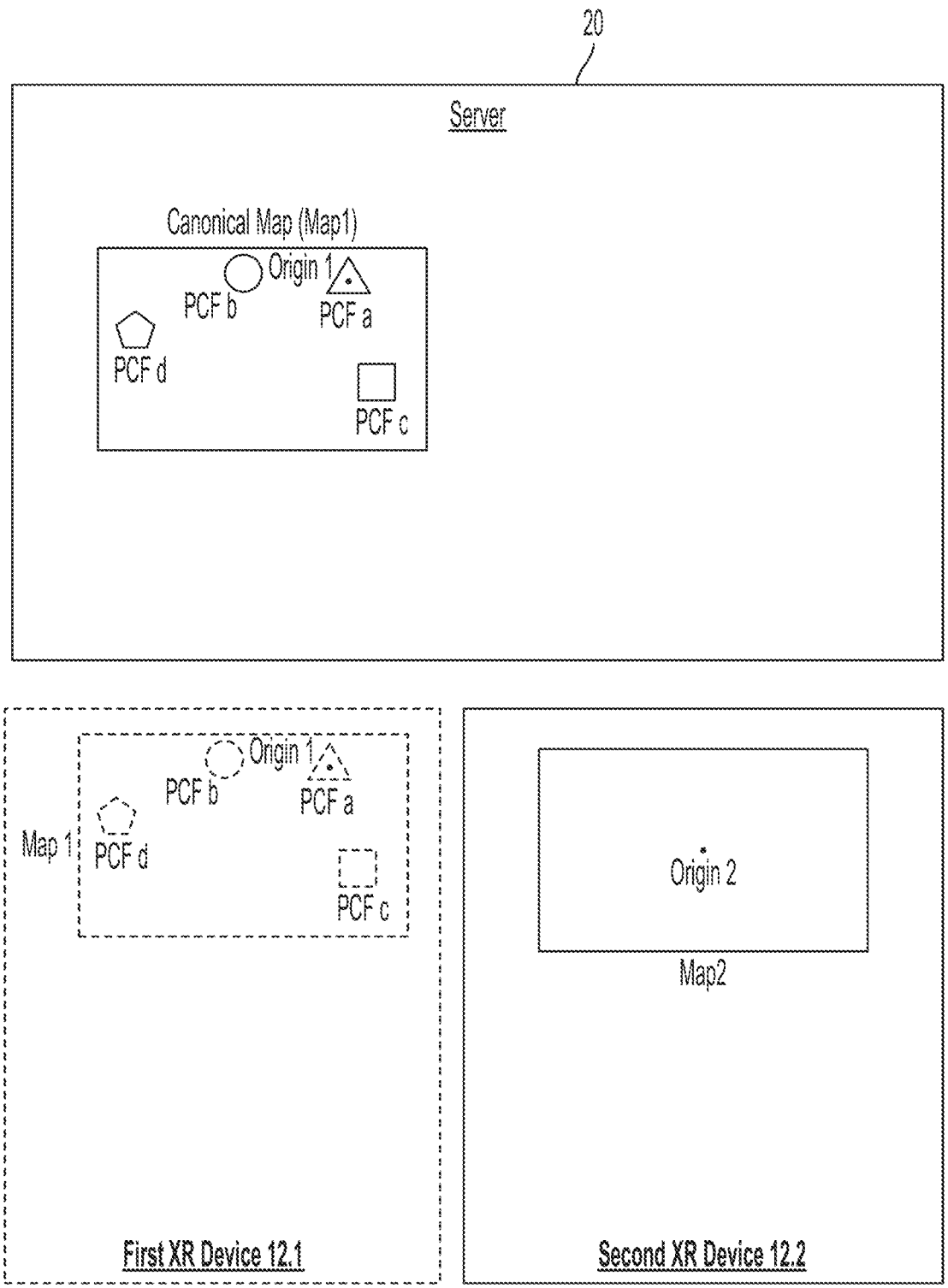
FIG. 11A is a block diagram illustrating a new session for the second XR device of FIG. 10, according to some embodiments.
Figure 11B:
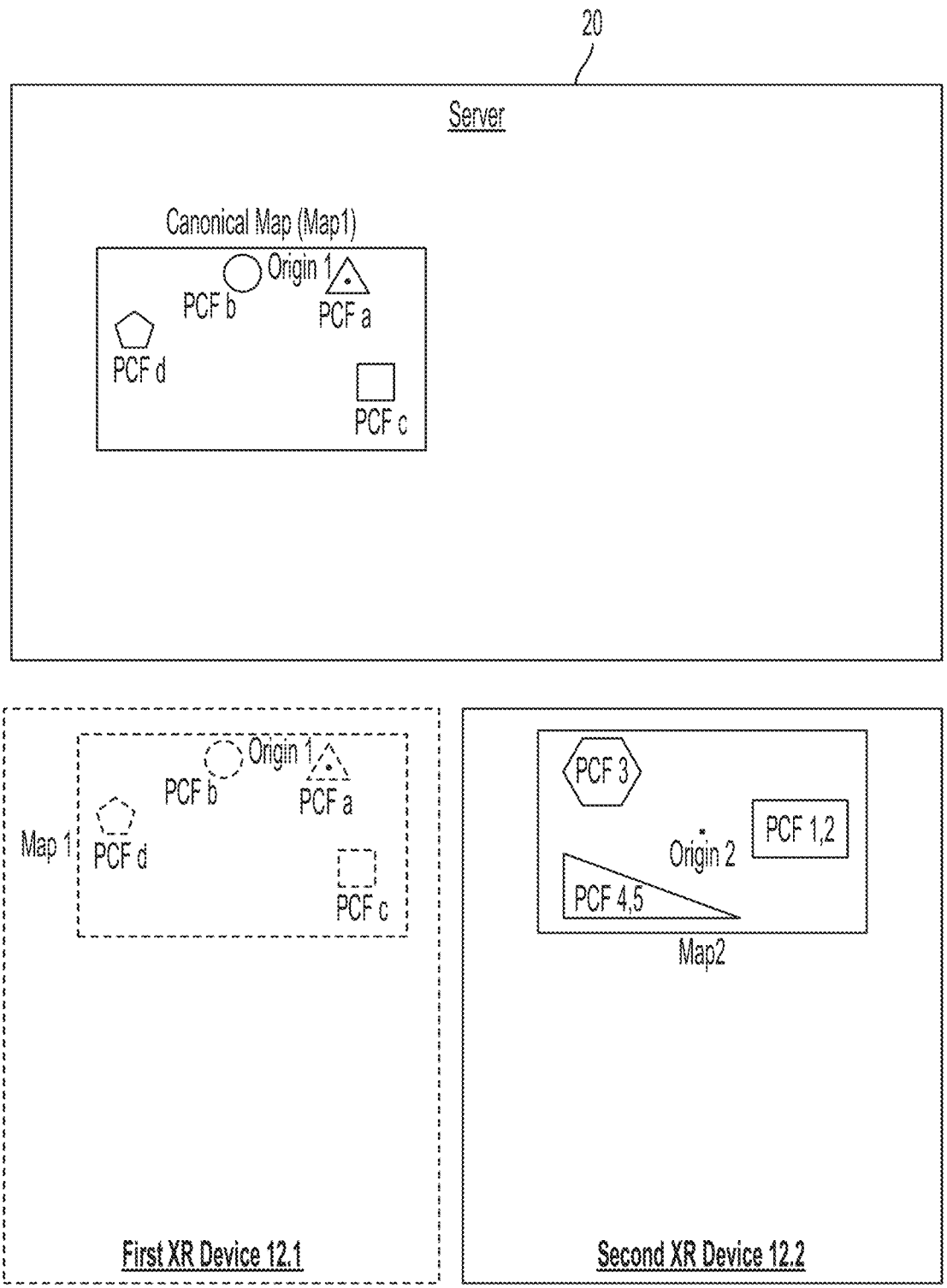
FIG. 11B is a block diagram illustrating the creation of a tracking map for the second XR device of FIG. 10, according to some embodiments.
Figure 11C:
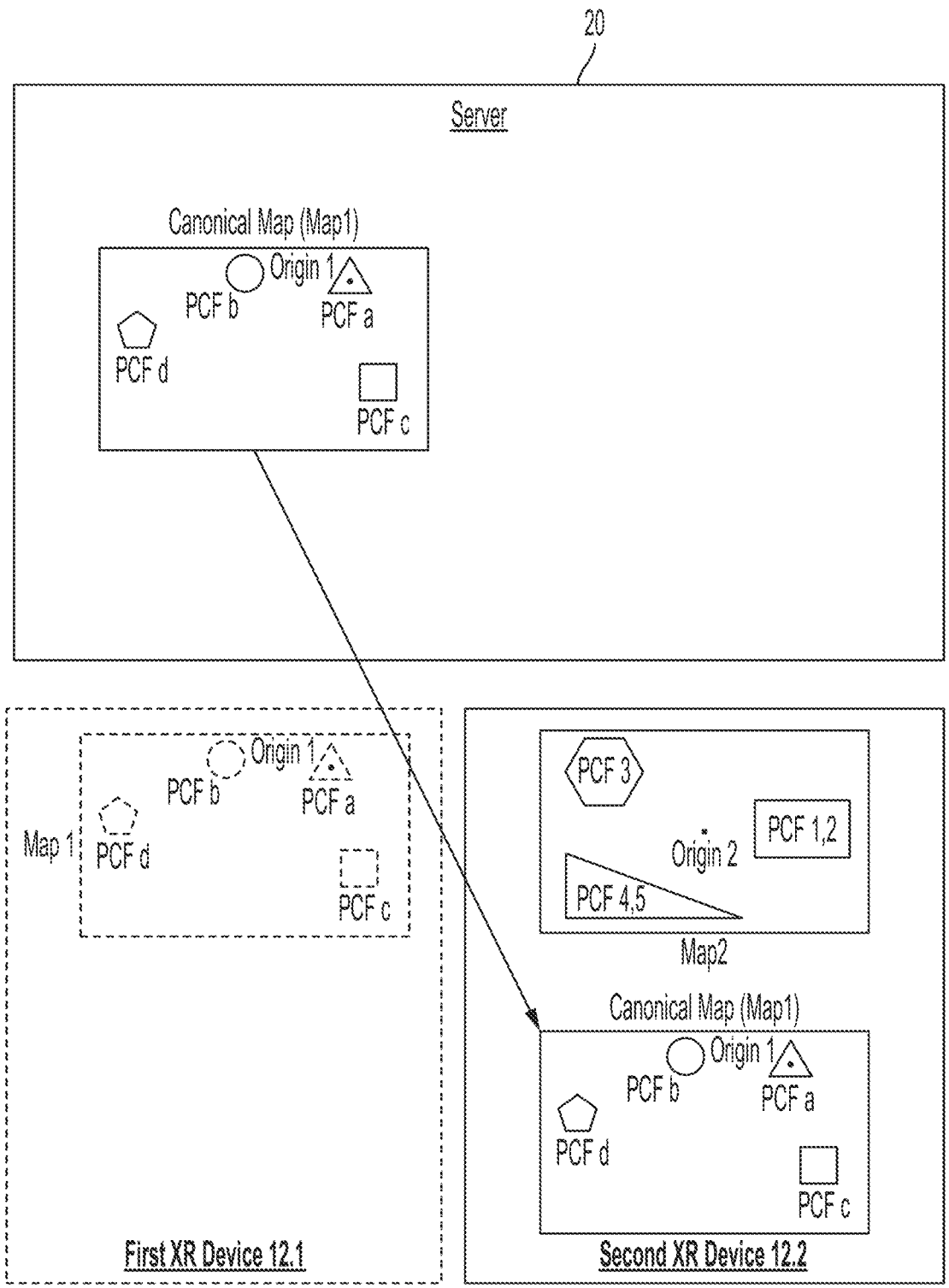
FIG. 11C is a block diagram illustrating downloading a canonical map from the server to the second XR device of FIG. 10, according to some embodiments.
Figure 11D:
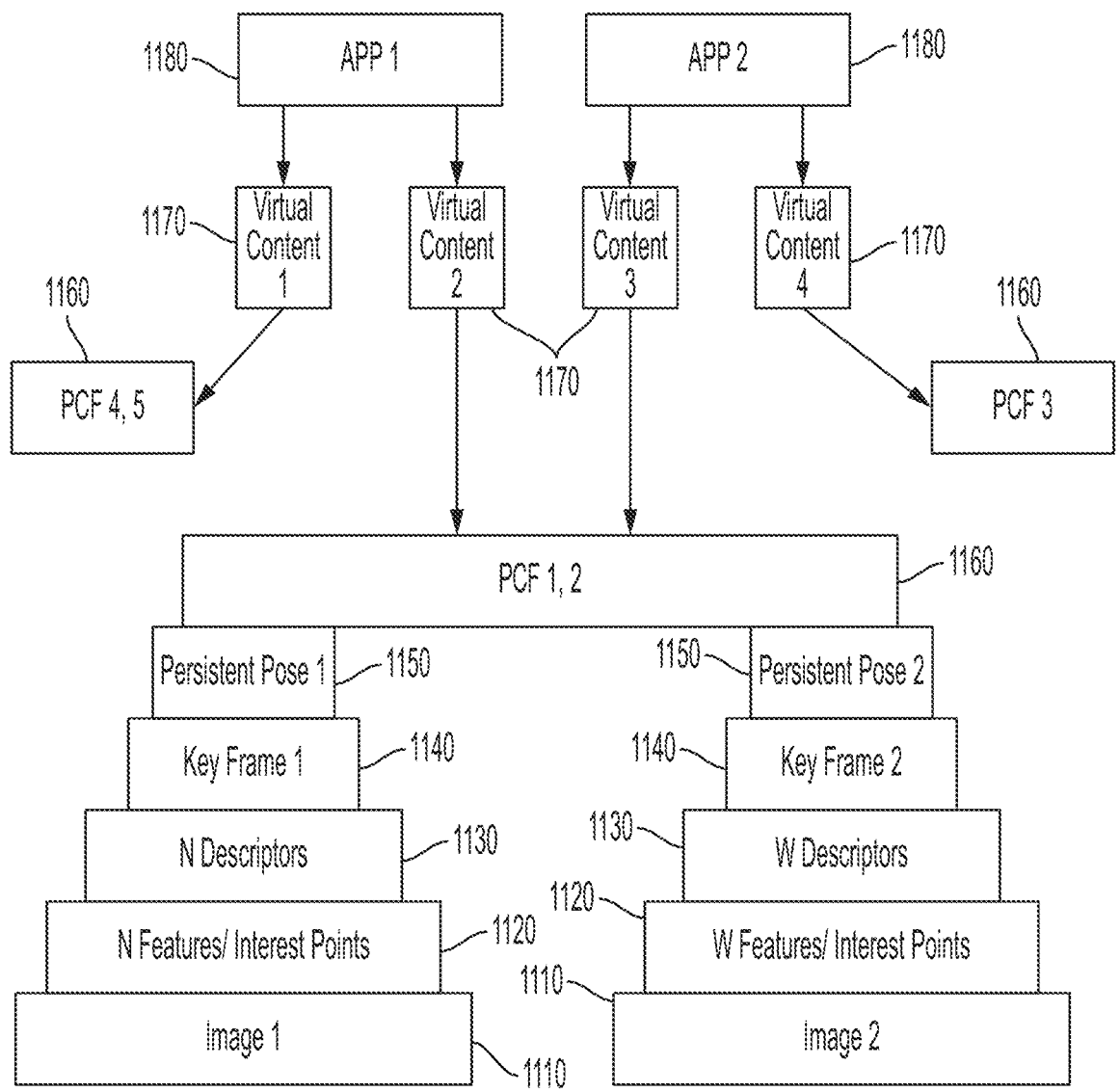
FIG. 11D is a block diagram illustrating the creation of a persistent coordinate frame (PCF) and XR content attached to the PCF, according to some embodiments.

In some embodiments, images captured by the cameras 44, 46 may be computed into one or more key frames (e.g., key frames 1, 2 in FIG. 11D). A key frame may correspond to a camera pose. A key frame may include one or more camera images captured at the camera pose. In some embodiments, an XR system may determine a portion of the camera images captured at the camera pose as not useful and thus not include the portion in a key frame. Therefore, using key frames to align new images with earlier knowledge of a scene reduces the use of computational resource of the XR system. In some embodiments, a key frame may be an image, or image data, at a location with a direction/angle. In some embodiments, a key frame may be a location and a direction from which one or more map point may be observed. In some embodiments, a key frame may be a coordinate frame with an ID. U.S. patent application Ser. No. 15/877,359 describes key frames and is hereby incorporated by reference in its entirety.

The inertial measurement unit 48 may include a number of devices that are used to detect movement of the head unit 22. The inertial measurement unit 48 may include a gravitation sensor, one or more accelerometers and one or more gyroscopes. The sensors of the inertial measurement unit 48, in combination, track movement of the head unit 22 in at least three orthogonal directions and about at least three orthogonal axes.

In the illustrated example, the world frame system 54 includes a world surface determining routine 78, a world frame determining routine 80, and a world frame storing instruction 82. The world surface determining routine 78 is connected to the real object detection camera 44. The world surface determining routine 78 receives images and/or key frames based on the images that are captured by the real object detection camera 44 and processes the images to identify surfaces in the images. A depth sensor (not shown) may determine distances to the surfaces. The surfaces are thus represented by data in three dimensions including their sizes, shapes, and distances from the real object detection camera.

In some embodiments, world surface determining routine 78 may convert one or more key frames to a persistent pose (e.g., Persistent Pose 1, 2 in FIG. 11D). A persistent pose may be the output of routine 78. In some embodiments, a persistent pose may be a coordinate location and/or direction that has one or more associated key frames. In some embodiments, a persistent pose may be automatically created after the user has traveled a certain distance, e.g. three meters. In some embodiments, the persistent poses may act as reference points during localization. In some embodiments, the data determined by the world surface determining routine 78 may be stored in a passable world (e.g., a digital representation of the real objects in the physical world that can be stored and updated with changes to the real objects in the physical world).

In some embodiments, a passable world may comprise or be created from one or more canonical maps, each of which may include a corresponding world coordinate frame. A canonical map may be originated as a tracking map (TM) (e.g., TM 1102 in FIG. 40A), which may be converted to a canonical map after the TM's session ended. In some embodiments, a TM may be a headpose sparse map of an XR device. In some embodiments, XR devices may send one or more TMs to cloud for merging with additional TMs captured by the XR device at a different time or by other XR devices.

In some embodiments, the persistent frame determining routine 80 may be connected to the world surface determining routine 78 and may determine a persistent coordinate frame (PCF) 84. The PCF may include multiple PCF anchors (e.g., PCF anchors 1-5 in FIG. 11D). A new PCF anchor may be determined based on a pre-defined distance allowed between different PCF anchors. The world surface determining routine 78 may store in the passable world the PCF anchors, which may constitute the PCF. In some embodiments, the world frame determining routine 80 may convert one or more persistent poses into a PCF anchor when the user travels a pre-determined distance, e.g. five meters. In some embodiments, PCF anchors may be associated with one or more world coordinate frames 86, e.g., in the passable world. In some embodiments, the world coordinate frame 86 may be stored within the origin and destination coordinate frames 34.

In some embodiments, a virtual content's own content coordinate frame (i.e. a coordinate frame attached to the virtual content independent of its real world location) may be associated with one or more PCF anchors. The inventors have recognized and appreciated that associating virtual content with PCF anchors, as opposed to being measured directly to the world coordinate frame, may give the virtual content a more persistent frame position. For example, if a virtual lamp is placed on a table, there could be a plurality of data points on the table to provide placement input for relative positioning of the virtual lamp that does not substantially change over time. By contrast, if a world map is created as a function of a certain orientation and position, and the user changes position or orientation, thus necessitating a new world coordinate frame, the virtual lamp may continue to utilize the same local coordinate frame rather than adjust to a new world frame which may introduce jitter or positional shifts in the appearance of the lamp.

In some embodiments, the persistent frame storing instruction 82 may be connected to the persistent frame determining routine 80 to receive the persistent coordinate frame 84 from the persistent frame determining routine 80. In some embodiments, the persistent frame storing instruction 82 may store the persistent coordinate frame 84 in a database locally and/or in the cloud (e.g. may depend on security settings).

The head frame system 56 may include a head frame determining routine 90 and a head frame storing instruction 92. The head frame determining routine 90 may be connected to the movement tracking camera 46 and the inertial measurement unit 48. The head frame determining routine 90 may use data from the movement tracking camera 46 and the inertial measurement unit 48 to calculate a head coordinate frame 94. For example, the inertial measurement unit 48 may have a gravitation sensor that determines the direction of gravitational force relative to the head unit 22. The movement tracking camera 46 may continually capture images that are used by the head frame determining routine 90 to refine the head coordinate frame 94. The head unit 22 moves when the first user 14.1 in FIG. 1 moves their head. The movement tracking camera 46 and the inertial measurement unit 48 may continuously provide data to the head frame determining routine 90 so that the head frame determining routine 90 can update the head coordinate frame 94.

The head frame storing instruction 92 may be connected to the head frame determining routine 90 to receive the head coordinate frame 94 from the head frame determining routine 90. The head frame storing instruction 92 may store the head coordinate frame 94 as a head coordinate frame 96 among the origin and destination coordinate frames 34. The head frame storing instruction 92 may repeatedly store the updated head coordinate frame 94 as the head coordinate frame 96 when the head frame determining routine 90 recalculates the head coordinate frame 94. In some embodiments, the head coordinate frame may be the location of the wearable XR device 12.1 relative to the local coordinate frame 72.

The camera frame system 58 may include camera intrinsics 98. The camera intrinsics 98 may include dimensions of the head unit 22 that are features of its design and manufacture. The camera intrinsics 98 may be used to calculate a camera coordinate frame 100 that is stored within the origin and destination coordinate frames 34.

In some embodiments, the camera coordinate frame 100 may include all pupil positions of a left eye of the first user 14.1 in FIG. 1. When the left eye moves from left to right or up and down, the pupil positions of the left eye are located within the camera coordinate frame 100. In addition, the pupil positions of a right eye are located within a camera coordinate frame 100 for the right eye. In some embodiments, the camera coordinate frame 100 may include the location of the camera relative to the local coordinate frame when an image is taken.

The origin to destination coordinate frame transformers 36 may include a local-to-world coordinate transformer 104, a world-to-head coordinate transformer 106, and a head-to-camera coordinate transformer 108. The local-to-world coordinate transformer 104 may receive the local coordinate frame 72 and transform the local coordinate frame 72 to the world coordinate frame 86. The transformation of the local coordinate frame 72 to the world coordinate frame 86 may be represented as a local coordinate frame transformed to world coordinate frame 110 within the world coordinate frame 86.

The world-to-head coordinate transformer 106 may transform from the world coordinate frame 86 to the head coordinate frame 96. The world-to-head coordinate transformer 106 may transform the local coordinate frame transformed to world coordinate frame 110 to the head coordinate frame 96. The transformation may be represented as a local coordinate frame transformed to head coordinate frame 112 within the head coordinate frame 96.

The head-to-camera coordinate transformer 108 may transform from the head coordinate frame 96 to the camera coordinate frame 100. The head-to-camera coordinate transformer 108 may transform the local coordinate frame transformed to head coordinate frame 112 to a local coordinate frame transformed to camera coordinate frame 114 within the camera coordinate frame 100. The local coordinate frame transformed to camera coordinate frame 114 may be entered into the rendering engine 30. The rendering engine 30 may render the image data 68 representing the local content 28 based on the local coordinate frame transformed to camera coordinate frame 114.

Figure 3:
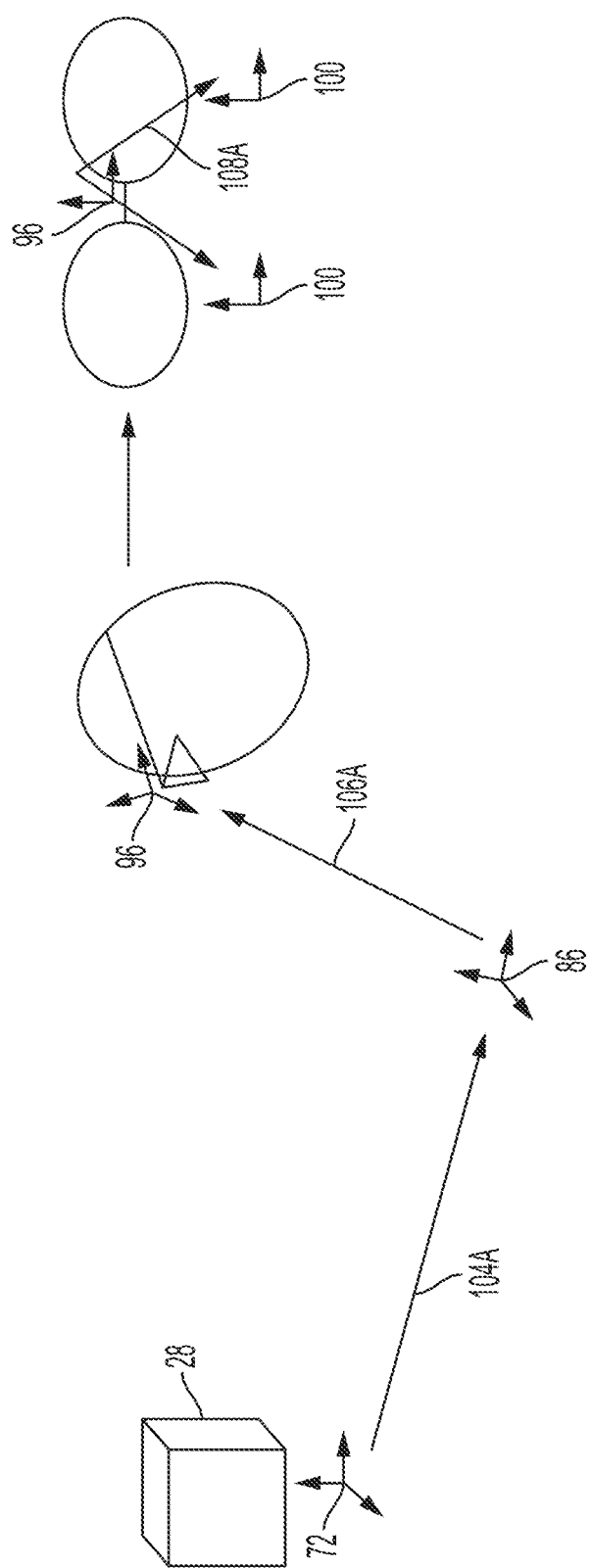
FIG. 3 is a schematic diagram illustrating the transformation of origin coordinate frames into destination coordinate frames in order to, for example, correctly render local XR content, according to some embodiments.

FIG. 3 is a spatial representation of the various origin and destination coordinate frames 34. The local coordinate frame 72, world coordinate frame 86, head coordinate frame 96, and camera coordinate frame 100 are represented in the figure. In some embodiments, the local coordinate frame associated with the XR content 28 may define a position and rotation of the virtual content (e.g. may provide a node and facing direction), which may then be transformed to a local and/or world coordinate frame and/or PCF when the virtual content is placed in the real world so the virtual content may be viewed by the user. Each camera may have its own camera coordinate frame 100 encompassing all pupil positions of one eye. Reference numerals 104A and 106A represent the transformations that are made by the local-to-world coordinate transformer 104, world-to-head coordinate transformer 106, and head-to-camera coordinate transformer 108 in FIG. 2, respectively.

Figure 4:
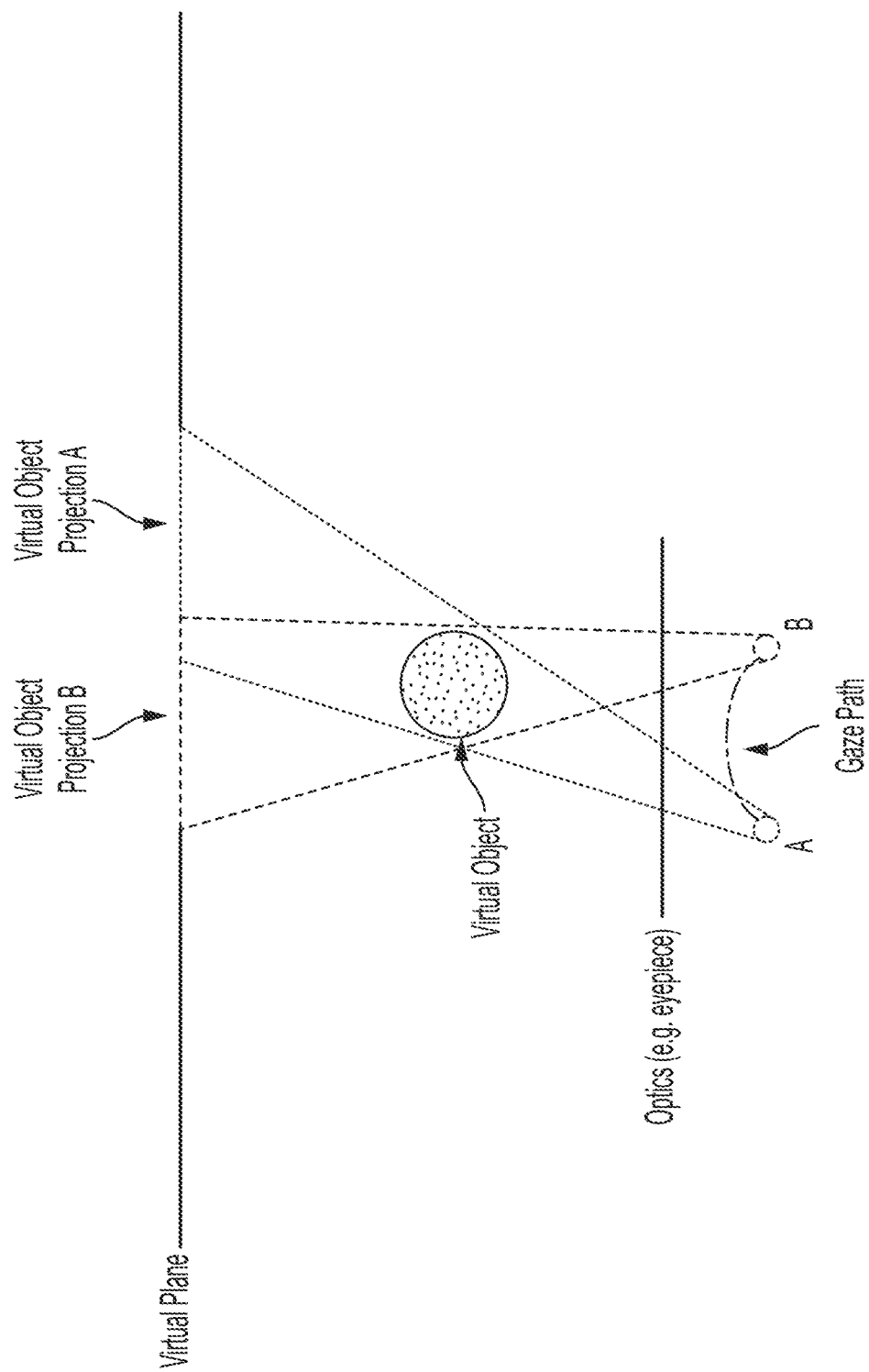
FIG. 4 is a top plan view illustrating pupil-based coordinate frames, according to some embodiments.

FIG. 4 depicts a camera render protocol for transforming from a head coordinate frame to a camera coordinate frame, according to some embodiments. In the illustrated example, a pupil for a single eye moves from position A to B. A virtual object that is meant to appear stationary will project onto a depth plane at one of the two positions A or B depending on the position of the pupil (assuming that the camera is configured to use a pupil as its coordinate frame). As a result, using a pupil coordinate frame transformed to a head coordinate frame will cause jitter in a stationary virtual object as the eye moves from position A to position B. This situation is referred to as view dependent display or projection.

Figure 5:
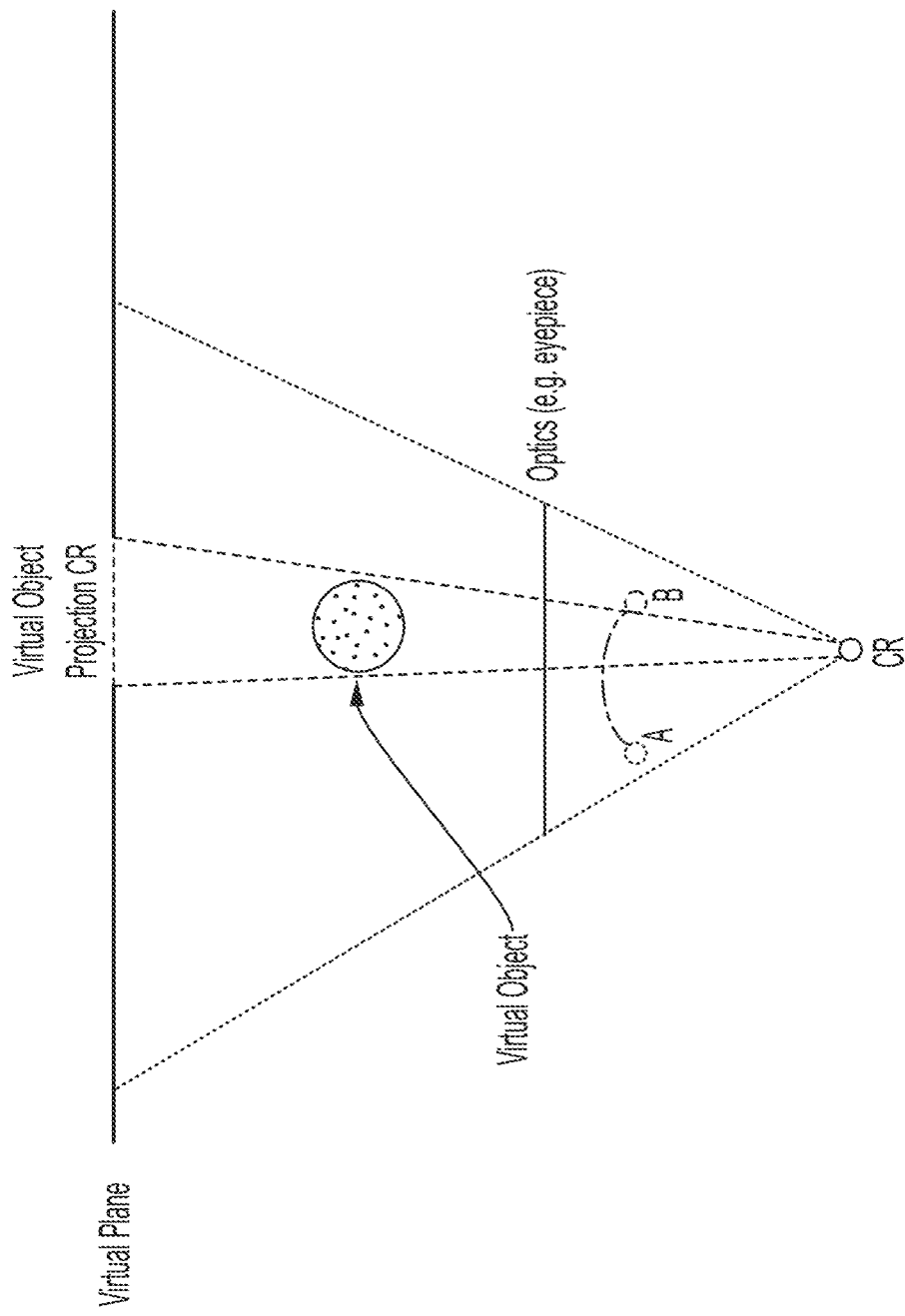
FIG. 5 is a top plan view illustrating a camera coordinate frame that includes all pupil positions, according to some embodiments.

As depicted in FIG. 5, a camera coordinate frame (e.g., CR) is positioned and encompasses all pupil positions and object projection will now be consistent regardless of pupil positions A and B. The head coordinate frame transforms to the CR frame, which is referred to as view independent display or projection. An image reprojection may be applied to the virtual content to account for a change in eye position, however, as the rendering is still in the same position, jitter is minimized.

Figure 6:
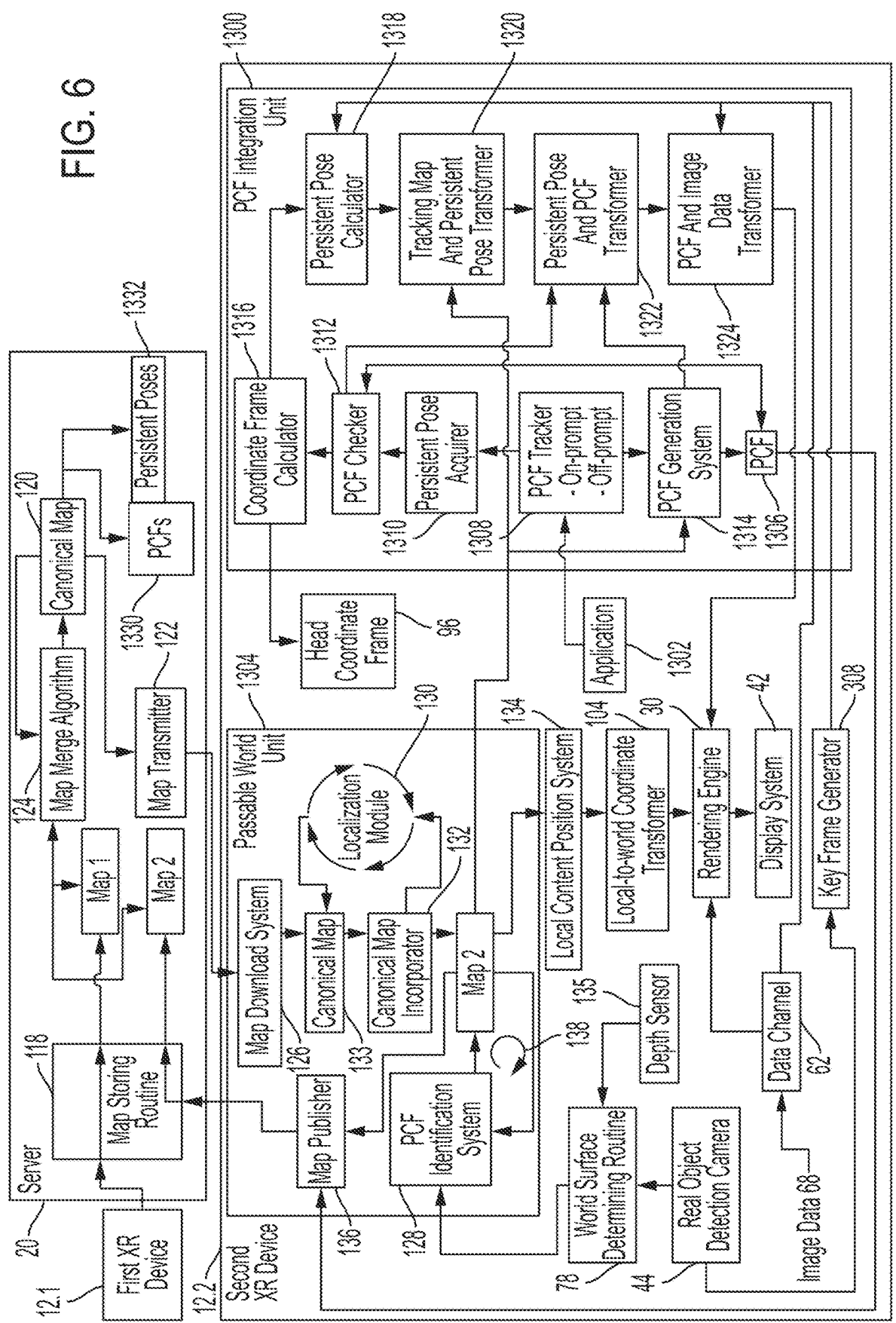
FIG. 6 is a block diagram of the XR system of FIG. 1, including an additional second XR device, according to some embodiments.

As depicted in FIG. 6, a second XR device 12.2, which may be in the same scene as the first XR device 12.1, may include a persistent coordinate frame (PCF) integration unit 1300, an application 1302 that generates the image data 68, and a frame embedding generator 308. In some embodiments, a map download system 126, anchor identification system 128, Map 2, localization module 130, canonical map incorporator 132, canonical map 133, and map publisher 136 may be grouped into a passable world unit 1304. The PCF integration unit 1300 may be connected to the passable world unit 1304 and other components of the second XR device 12.2 to allow for the retrieval, generation, use, upload, and download of PCF anchors. A coordinate frame, constituted by PCF anchors, may enable more persistence in a changing world, for example, a world where people move into and out of the scene and objects such as doors move relative to the scene, require less storage space and transmission rates, and enable the use of individual PCF anchors and their relationships relative to one another and/or integrated constellation of PCF anchors to map a scene.

In some embodiments, the PCF integration unit 1300 may include PCF anchors 1306 that were previously stored in a data store on a storage unit of the second XR device 12.2, a PCF tracker 1308, a persistent pose acquirer 1310, a PCF checker 1312, a PCF generation system 1314, a coordinate frame calculator 1316, a persistent pose calculator 1318, and three transformers, including a tracking map and persistent pose transformer 1320, a persistent pose and PCF transformer 1322 and a PCF and image data transformer 1324.

In some embodiments, the PCF tracker 1308 may have an on-prompt and an off-prompt that are selectable by the application 1302. The application 1302 may be executable by a processor of the second XR device 12.2 to, for example, display a virtual content. The application 1302 may have a call that switches the PCF tracker 1308 on via the on-prompt. The PCF tracker 1308 may generate PCF anchors when the PCF tracker 1308 is switched on. The application 1302 may have a subsequent call that can switch the PCF tracker 1308 off via the off-prompt. The PCF tracker 1308 terminates PCF generation when the PCF tracker 1308 is switched off.

In some embodiments, the server 20 may include a plurality of persistent poses 1332 and a plurality of PCF anchors 1330 that have previously been saved in association with a canonical map 120. The map transmitter 122 may transmit the canonical map 120 together with the persistent poses 1332 and/or the PCF anchors 1330 to the second XR device 12.2. The persistent poses 1332 and PCF anchors 1330 may be stored in association with the canonical map 133 on the second XR device 12.2. When Map 2 localizes to the canonical map 133, the persistent poses 1332 and the PCF anchors 1330 may be stored in association with Map 2.

In some embodiments, the persistent pose acquirer 1310 may acquire the persistent poses for Map 2. The PCF checker 1312 may be connected to the persistent pose acquirer 1310. The PCF checker 1312 may retrieve PCF anchors from the PCF anchors 1306 based on the persistent poses retrieved by the persistent pose acquirer 1310. The PCF anchors retrieved by the PCF checker 1312 may form an initial group of PCF anchors that are used for image display based on PCF anchors.

In some embodiments, the application 1302 may require additional PCF anchors to be generated. For example, if a user moves to an area that has not previously been mapped, the application 1302 may switch the PCF tracker 1308 on. The PCF generation system 1314 may be connected to the PCF tracker 1308 and begin to generate PCF anchors based on Map 2 as Map 2 begins to expand. The PCF anchors generated by the PCF generation system 1314 may form a second group of PCF anchors that may be used for PCF-based image display.

The coordinate frame calculator 1316 may be connected to the PCF checker 1312. After the PCF checker 1312 retrieved PCF anchors, the coordinate frame calculator 1316 may invoke the head coordinate frame 96 to determine a head pose of the second XR device 12.2. The coordinate frame calculator 1316 may also invoke the persistent pose calculator 1318. The persistent pose calculator 1318 may be directly or indirectly connected to the frame embedding generator 308. In some embodiments, the frame embedding generator 308 may output a global feature string 316 which may be used as a data representation for an image (e.g. frame or key frame). In some embodiments, an image/frame may be designated a key frame after a threshold distance from the previous key frame, e.g. 3 meters, is traveled. The persistent pose calculator 1318 may generate a persistent pose based on a plurality, for example three, key frames. In some embodiments, the persistent pose may be essentially an average of the coordinate frames of the plurality of key frames.

The tracking map and persistent pose transformer 1320 may be connected to Map 2 and the persistent pose calculator 1318. The tracking map and persistent pose transformer 1320 may transform Map 2 to the persistent pose to determine the persistent pose at an origin relative to Map 2.

The persistent pose and PCF transformer 1322 may be connected to the tracking map and persistent pose transformer 1320 and further to the PCF checker 1312 and the PCF generation system 1314. The persistent pose and PCF transformer 1322 may transform the persistent pose (to which the tracking map has been transformed) to the PCF anchors from the PCF checker 1312 and the PCF generation system 1314 to determine the PCF's relative to the persistent pose.

The PCF and image data transformer 1324 may be connected to the persistent pose and PCF transformer 1322 and to the data channel 62. The PCF and image data transformer 1324 transforms the PCF's to the image data 68. The rendering engine 30 may be connected to the PCF and image data transformer 1324 to display the image data 68 to the user relative to the PCF anchors.

The PCF integration unit 1300 may store the additional PCF anchors that are generated with the PCF generation system 1314 within the PCF anchors 1306. The PCF anchors 1306 may be stored relative to persistent poses. The map publisher 136 may retrieve the PCF anchors 1306 and the persistent poses associated with the PCF anchors 1306 when the map publisher 136 transmits Map 2 to the server 20, the map publisher 136 also transmits the PCF's and persistent poses associated with Map 2 to the server 20. When the map storing routine 118 of the server 20 stores Map 2, the map storing routine 118 may also store the persistent poses and PCF anchors generated by the second viewing device 12.2. The map merge algorithm 124 may create the canonical map 120 with the persistent poses and PCF anchors of Map 2 associated with the canonical map 120 and stored within the persistent poses 1332 and PCF anchors 1330, respectively.

The first XR device 12.1 may include a PCF integration unit similar to the PCF integration unit 1300 of the second XR device 12.2. When the map transmitter 122 transmits the canonical map 120 to the first XR device 12.1, the map transmitter 122 may transmit the persistent poses 1332 and PCF's 1330 associated with the canonical map 120 and originating from the second XR device 12.2. The first XR device 12.1 may store the PCF anchors and the persistent poses within a data store on a storage device of the first XR device 12.1. The first XR device 12.1 may then make use of the persistent poses and the PCF anchors originating from the second XR device 12.2 for image display relative to the PCF anchors. Additionally or alternatively, the first XR device 12.1 may retrieve, generate, make use, upload, and download PCF anchors and persistent poses in a manner similar to the second XR device 12.2 as described above.

Figure 44:
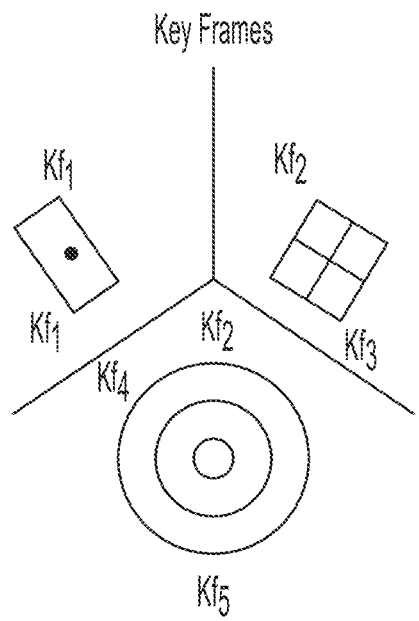
FIG. 44 is a schematic diagram illustrating a room and key frames that are established for various areas in the room, according to some embodiments.

FIG. 44 illustrates key frames that are generated for a room. In the illustrated example, a first key frame, KF1, is generated for a door on a left wall of the room. A second key frame, KF2, is generated for an area in a corner where a floor, the left wall, and a right wall of the room meet. A third key frame, KF3, is generated for an area of a window on the right wall of the room. A fourth key frame, KF4, is generated for an area at a far end of a rug on a floor of the wall. A fifth key frame, KF5, is generated for an area of the rug closest to the user.

Figure 45:
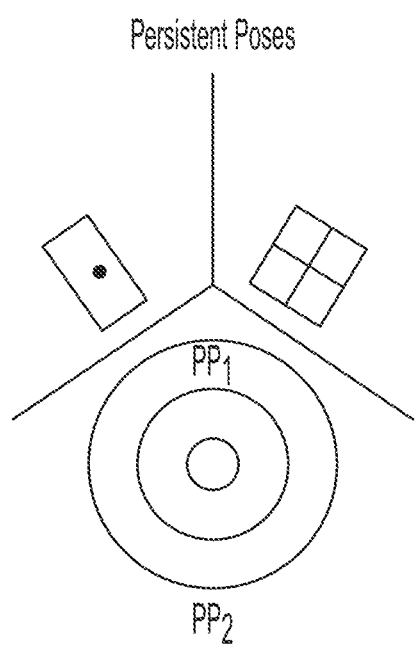
FIG. 45 is a schematic diagram illustrating the establishment of persistent poses based on the key frames, according to some embodiments.

FIG. 45 illustrates persistent poses PP1 and PP2 in the environment of a user. In some embodiments, a new persistent pose is created when the device measures a threshold distance traveled, and/or when an application requests a new persistent pose. In some embodiments, the threshold distance may be 3 meters, 5 meters, 20 meters, or any other suitable distance. Selecting a smaller threshold distance (e.g., 1 m) may result in an increase in compute load since a larger number of PPs may be created and managed compared to larger threshold distances. Selecting a larger threshold distance (e.g. 40 m) may result in increased virtual content placement error since a smaller number of PPs would be created, which would result in fewer PCFs being created, which means the virtual content attached to the PCF anchor could be a relatively large distance (e.g. 30 m) away from the PCF anchor, and error increases with increasing distance from an anchor to the virtual content.

In some embodiments, a PP may be created at the start of a new session. This initial PP may be thought of as zero, and can be visualized as the center of a circle that has a radius equal to the threshold distance. When the device reaches the perimeter of the circle, and, in some embodiments, an application requests a new PP, a new PP may be placed at the current location of the device (at the threshold distance). In some embodiments, a new PP will not be created at the threshold distance if the device is able to find an existing PP within the threshold distance from the device's new position. In some embodiments, when a new PP is created, the device attaches one or more of the closest key frames to the PP. In some embodiments, the location of the PP relative to the key frames may be based on the location of the device at the time a PP is created. In some embodiments, a PP will not be created when the device travels a threshold distance unless an application requests a PP.

In some embodiments, an application may request PCF from the device when the application has virtual content to display to the user. The PCF request from the application may trigger a PP request, and a new PP would be created after the device travels the threshold distance. FIG. 45 illustrates a first persistent pose PP1 which may have the closest key frames, (e.g. KF1, KF2, and KF3) attached. FIG. 45 also illustrates a second persistent pose PP2 which may have the closest key frames (e.g. KF4 and KF5) attached.

Figure 46:
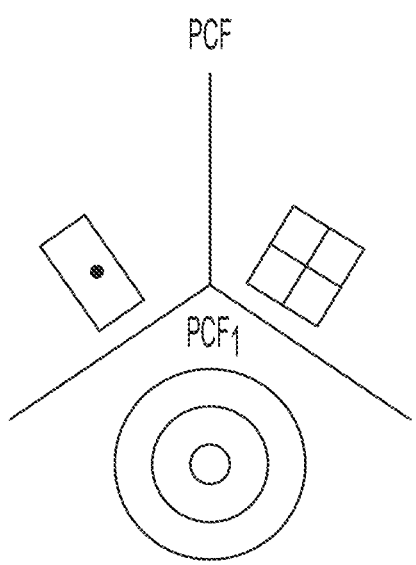
FIG. 46 is a schematic diagram illustrating the establishment of a persistent coordinate frame (PCF) based on the persistent poses, according to some embodiments.

FIG. 46 illustrates a PCF anchor that may include PP1 and PP2. As described above, the PCF may be used for displaying image data relative to the PCF. In some embodiments, each PCF may have coordinates in another coordinate frame (e.g., a world coordinate frame) and a descriptor. In some embodiments, various constellations of PCF anchors may be combined to represent the real world in a persistent manner and that requires less data and less transmission of data.

Figure 47:
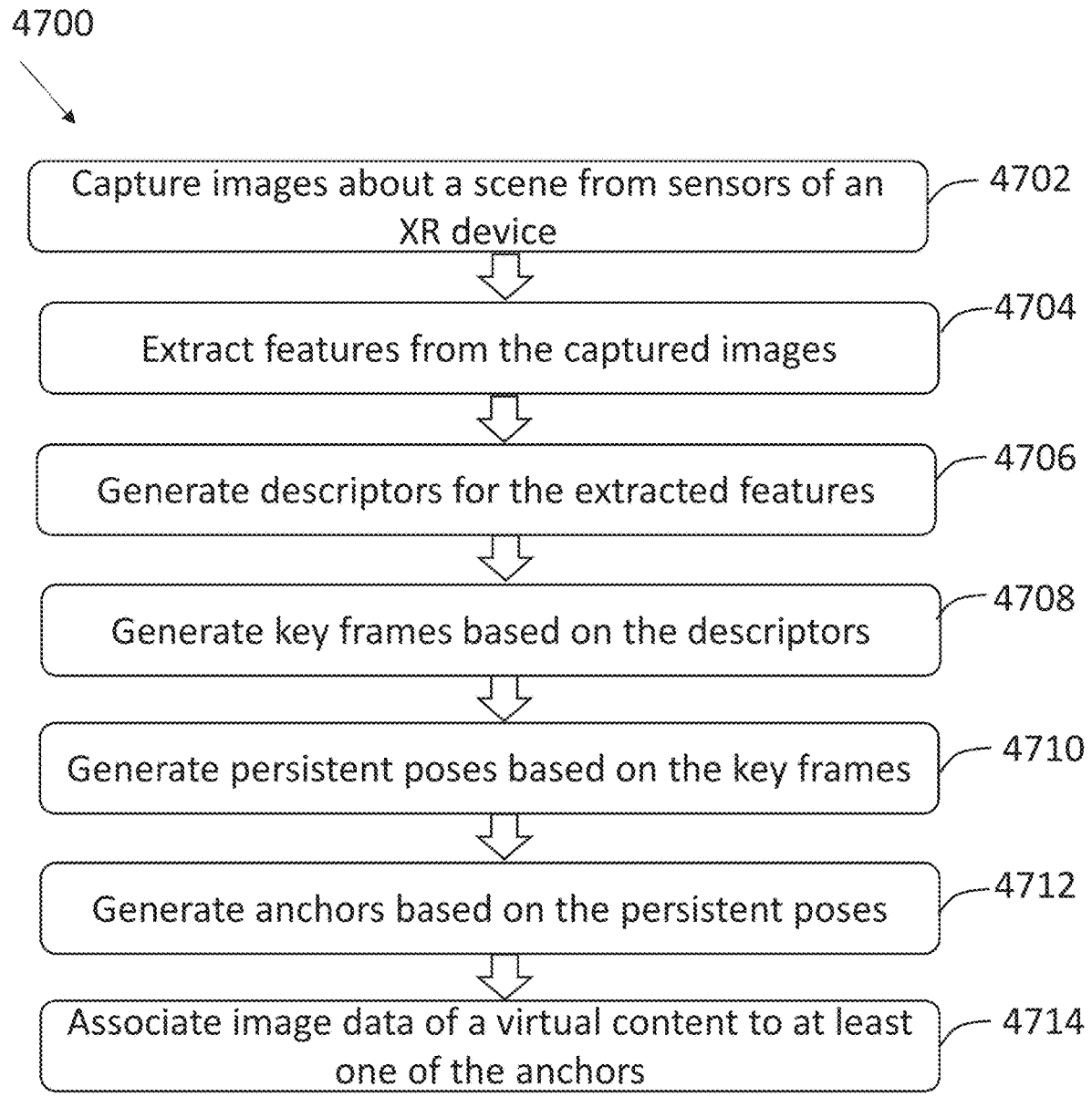
FIG. 47 is a flow chart illustrating a method of establishing and using a PCF, according to some embodiments.

FIG. 47 illustrates a method 4700 of establishing and using a persistence coordinate frame, according to some embodiments. The method 4700 may start from capturing (Act 4702) images about a scene using one or more sensors of an XR device. Multiple cameras may be used and one camera may generate multiple images. The method 4700 may include extracting (4704) features from the captured images, generating (Act 4706) descriptors for the extracted features, generating (Act 4708) key frames based on the descriptors, and generating (Act 4710) persistent poses based on the key frames. In some embodiments, key frames may be generated based on each one of the images and the average of the key frames of all the images of all the cameras may be used to generate a persistent pose. The method 4700 may include generating (Act 4712) anchors based on the persistent poses. An anchor may include one or more persistent poses. The method 4700 may include associating (Act 4714) image data of a virtual content to be displayed by the XR device to at least one of the anchors.

Figure 48A:
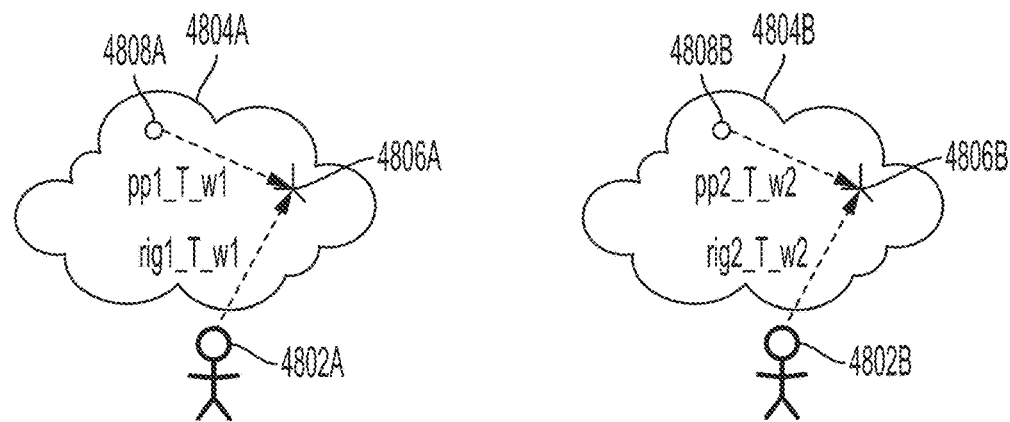
FIGS. 48A to 48I are schematic diagrams illustrating an example of establishing and using a PCF of FIG. 47.
Figure 48B:
Figure 48C:
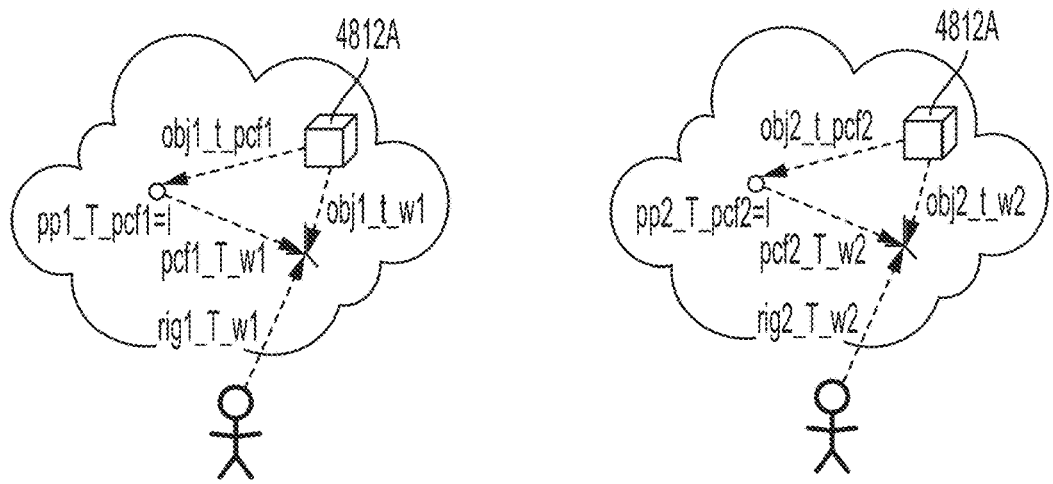
Figure 48D:
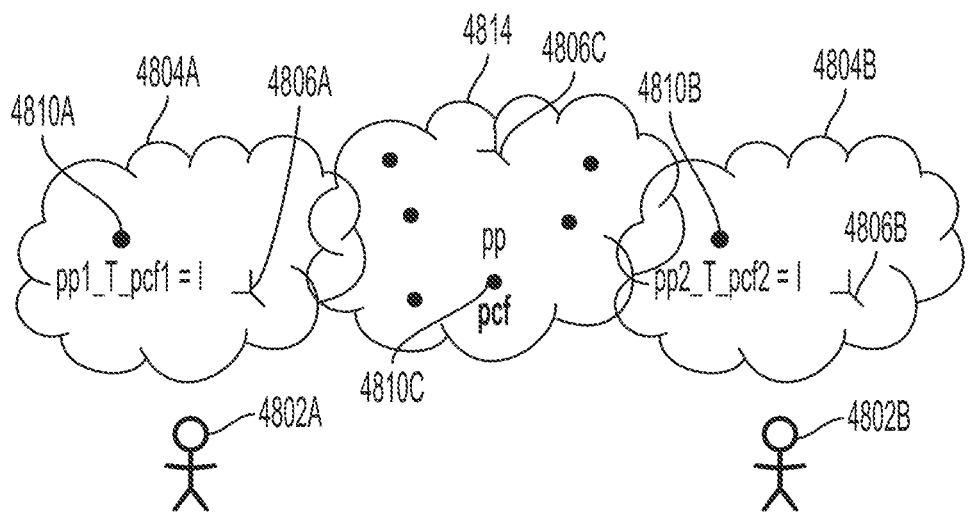
Figure 48E:
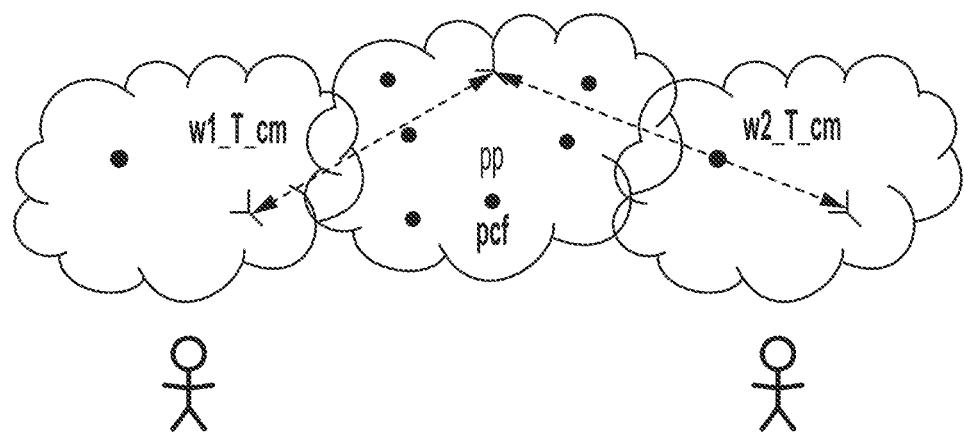
Figure 48F:
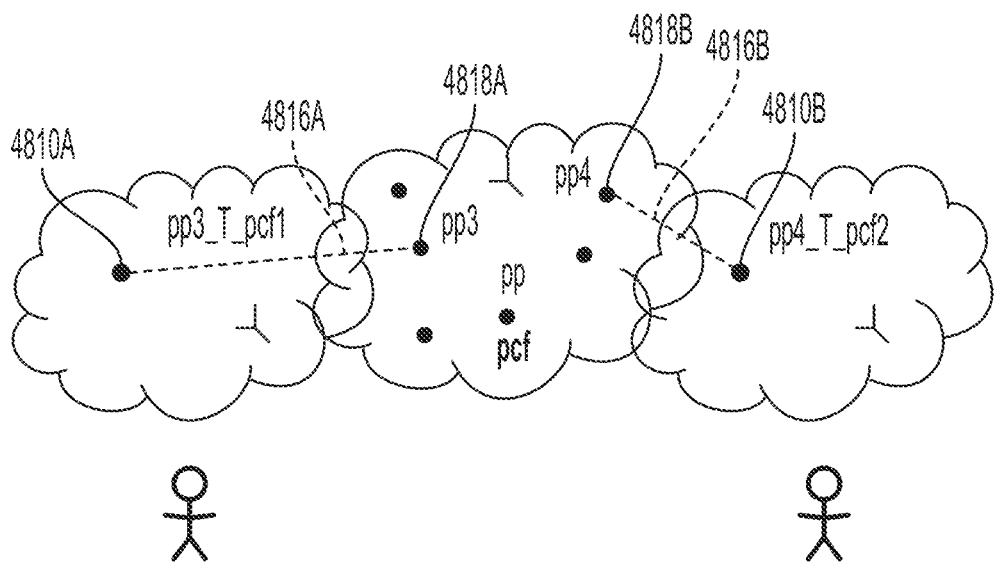
Figure 48G:
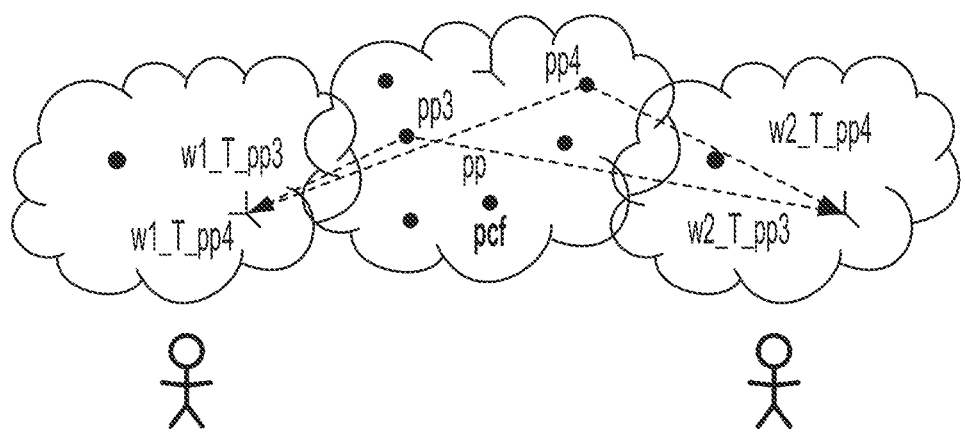
Figure 48H:
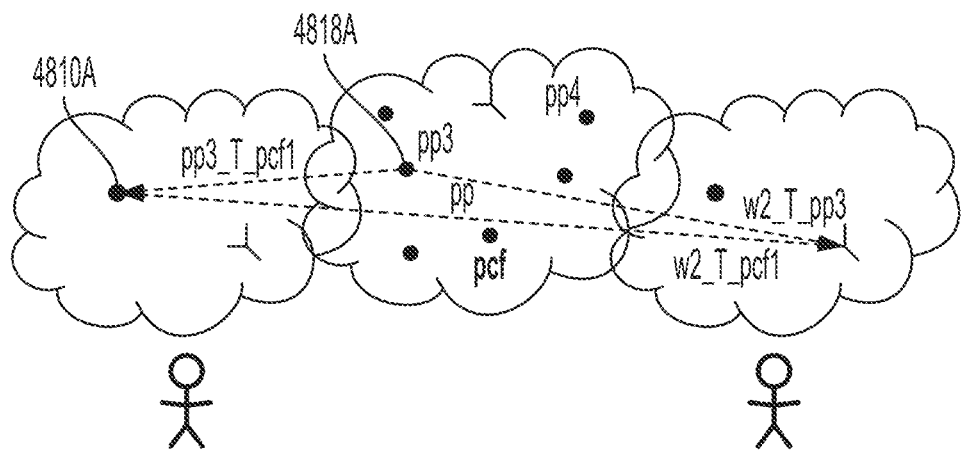
Figure 48I:
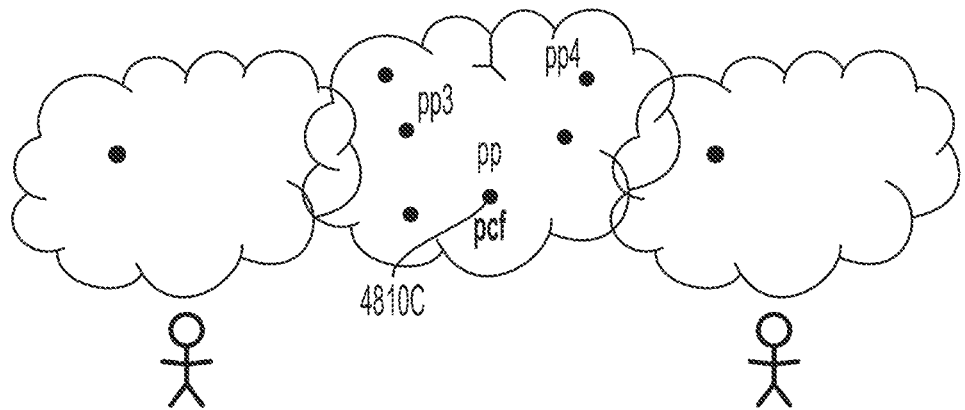

FIGS. 48A to 48I are schematic diagrams illustrating an example of establishing and using a persistent coordinate frame, which may enable data sharing between XR devices. FIG. 48A shows two users 4802A, 4802B with respective local tracking maps 4804A, 4804B that have not localized to a canonical map. The origins 4806A, 4806B for individual users are depicted by the coordinate system (e.g., a world coordinate system) in their respective areas. In some embodiments, the TM 4802A may include a persistent pose (PP) 4808A; the TM 4802B may include a PP 4808B. FIG. 48B shows that the XR devices worn by respective users 4802A, 4802B may create local PCF anchors 4810A, 4810B based on the PP 4808A, 4908B. FIG. 48C shows that a persistent content 4812 (e.g., a virtual content) can now attach to the PCF anchors 4810A, 4810B. FIG. 48D shows that a canonical map 1814, for example, from a cloud, is received by both devices. FIG. 48E shows that both devices localize to the canonical map 4814 on the respective devices. FIG. 48F shows that each device creates an attachment (e.g., attachments 4816A, 4816B) between a local PCF anchor (e.g., PCF anchors 4810A, 4810B) on the respective device to a respective persistent pose (e.g., PPs 4818A, 4818B) on the canonical map. FIG. 48G shows a persistent pose snapshot from the canonical map to the local tracking maps. As can be seen, the local tracking maps are connected to one another via the persistent poses. FIG. 48H shows that the PCF anchor 4810A on the device worn by the user 4802A is accessible in the device worn by the user 4802B. FIG. 48I shows that all of the maps may eventually merge, and the PCF may "unionize" in connected constellations.

Mapping and Localization

FIG. 6 illustrates the first XR device 12.1 and vision data and algorithms of a second XR device 12.2 and the server 20 in more detail, according to some embodiments. Although not illustrated, the first XR device 12.1 may be configured the same as the second XR device 12.2.

The server 20 may have a map storing routine 118, a canonical map 120, a map transmitter 122, and a map merge algorithm 124.

In the illustrated example, the first XR device 12.1 generates a local tracking map (referred to hereinafter as "Map 1") and the map storing routine 118 receives Map 1 from the first XR device 12.1. The map storing routine 118 then stores Map 1 on a storage device of the server 20 as the canonical map 120.

The second XR device 12.2 includes a map download system 126, an anchor identification system 128, a localization module 130, a canonical map incorporator 132, a local content position system 134, and a map publisher 136.

In use, the map transmitter 122 sends the canonical map 120 to the second XR device 12.2 and the map download system 126 downloads and stores the canonical map 120 as a canonical map 133 from the server 20

The anchor identification system 128 is connected to the world surface determining routine 78. The anchor identification system 128 identifies anchors based on objects detected by the world surface determining routine 78. The anchor identification system 128 generates a second map (Map 2) using the anchors. As indicated by the cycle 138, the anchor identification system 128 continues to identify anchors and continues to update Map 2. The locations of the anchors are recorded as three-dimensional data based on data provided by the world surface determining routing 78. The world surface determining routine 78 receives images from the real object detection camera 44 and depth data from depth sensors 135 to determine the locations of surfaces and their relative distance from the depth sensors 135

The localization module 130 is connected to the canonical map 133 and Map 2. The localization module 130 repeatedly attempts to localize Map 2 to the canonical map 133. The canonical map incorporator 132 is connected to the canonical map 133 and Map 2. When the localization module 130 localizes Map 2 to the canonical map 133, the canonical map incorporator 132 incorporates the canonical map 133 into anchors of Map 2. Map 2 is then updated with missing data that is included in the canonical map.

The local content position system 134 is connected to Map 2. The local content position system 134 may, for example, be a system wherein a user can locate local content in a particular location within a world coordinate frame. The local content then attaches itself to one anchor of Map 2. The local-to-world coordinate transformer 104 transforms the local coordinate frame to the world coordinate frame based on the settings of the local content position system 134. The functioning of the rendering engine 30, display system 42, and data channel 62 have been described with reference to FIG. 2.

The map publisher 136 uploads Map 2 to the server 20. The map storing routine 118 of the server 20 then stores Map 2 within a storage medium of the server 20.

The map merge algorithm 124 merges Map 2 with the canonical map 120. When more than two maps, for example three or four maps, have been stored, the map merge algorithm 124 merges all the maps into the canonical map 120 to render a new canonical map 120. The map transmitter 122 then transmits the new canonical map 120 to any and all devices 12.1 and 12.2 that are in an area represented by the new canonical map 120. When the devices 12.1 and 12.2 localize their respective maps to the canonical map 120, the canonical map 120 becomes the promoted map.

Figure 7:
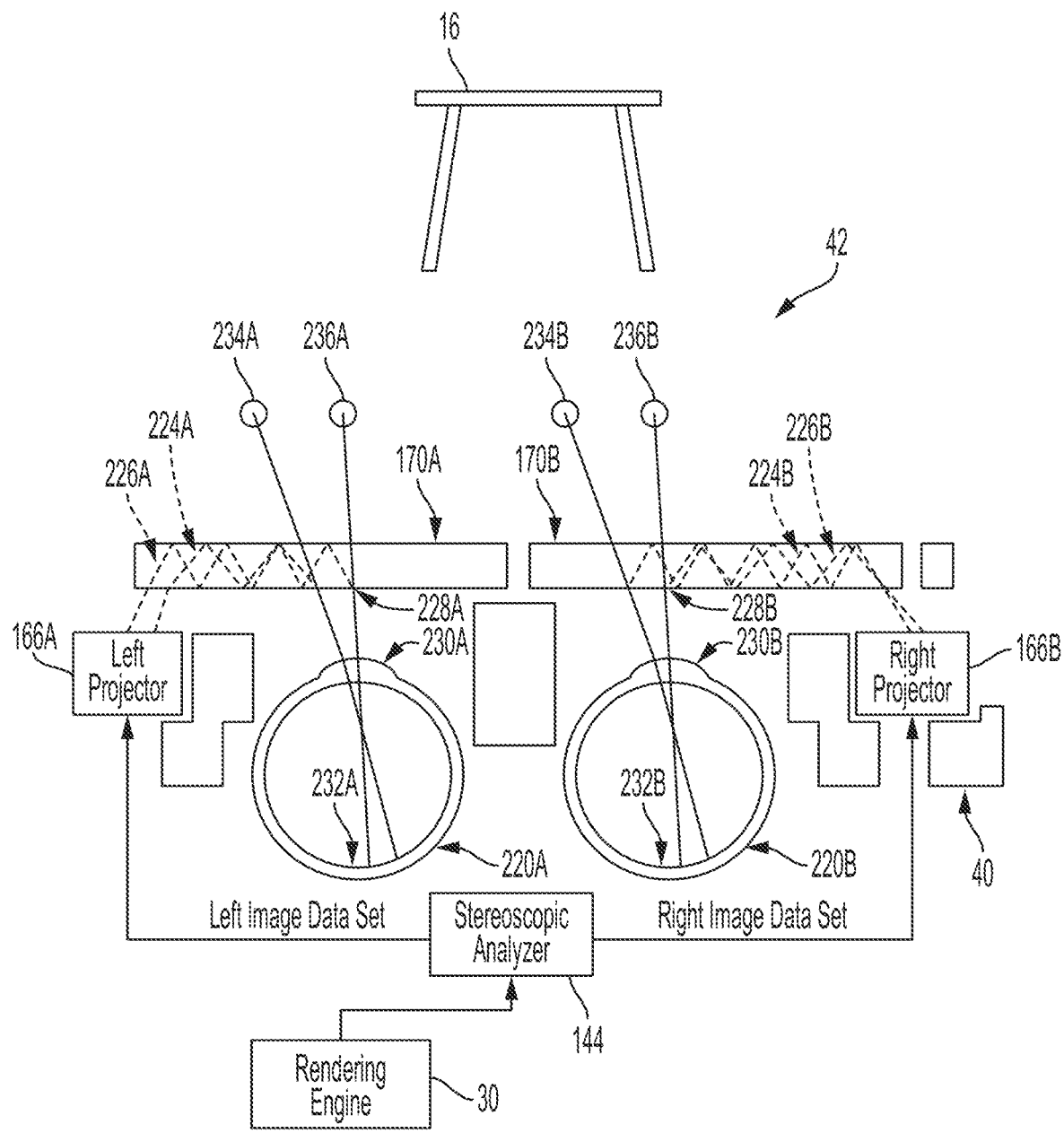
FIG. 7 is a schematic diagram of the display system of FIG. 2, according to some embodiments.

FIG. 7 illustrates the display system 42 in more detail. The display system 42 includes a stereoscopic analyzer 144 that is connected to the rendering engine 30 and forms part of the vision data and algorithms.

The display system 42 further includes left and right projectors 166A and 166B and left and right waveguides 170A and 170B. The left and right projectors 166A and 166B are connected to power supplies. Each projector 166A and 166B has a respective input for image data to be provided to the respective projector 166A or 166B. The respective projector 166A or 166B, when powered, generates light in two-dimensional patterns and emanates the light therefrom. The left and right waveguides 170A and 170B are positioned to receive light from the left and right projectors 166A and 166B, respectively. The left and right waveguides 170A and 170B are transparent waveguides.

In use, a user mounts the head mountable frame 40 to their head. Components of the head mountable frame 40 may, for example, include a strap (not shown) that wraps around the back of the head of the user. The left and right waveguides 170A and 170B are then located in front of left and right eyes 220A and 220B of the user.

The rendering engine 30 enters the image data that it receives into the stereoscopic analyzer 144. The image data is three-dimensional image data of the local content 28 in FIG. 1. The image data is projected onto a plurality of virtual planes. The stereoscopic analyzer 144 analyzes the image data to determine left and right image data sets based on the image data for projection onto each depth plane. The left and right image data sets are data sets that represent two-dimensional images that are projected in three-dimensions to give the user a perception of a depth.

The stereoscopic analyzer 144 enters the left and right image data sets into the left and right projectors 166A and 166B. The left and right projectors 166A and 166B then create left and right light patterns. The components of the display system 42 are shown in plan view, although it should be understood that the left and right patterns are two-dimensional patterns when shown in front elevation view. Each light pattern includes a plurality of pixels. For purposes of illustration, light rays 224A and 226A from two of the pixels are shown leaving the left projector 166A and entering the left waveguide 170A. The light rays 224A and 226A reflect from sides of the left waveguide 170A. It is shown that the light rays 224A and 226A propagate through internal reflection from left to right within the left waveguide 170A, although it should be understood that the light rays 224A and 226A also propagate in a direction into the paper using refractory and reflective systems.

The light rays 224A and 226A exit the left light waveguide 170A through a pupil 228A and then enter a left eye 220A through a pupil 230A of the left eye 220A. The light rays 224A and 226A then fall on a retina 232A of the left eye 220A. In this manner, the left light pattern falls on the retina 232A of the left eye 220A. The user is given the perception that the pixels that are formed on the retina 232A are pixels 234A and 236A that the user perceives to be at some distance on a side of the left waveguide 170A opposing the left eye 220A. Depth perception is created by manipulating the focal length of the light.

In a similar manner, the stereoscopic analyzer 144 enters the right image data set into the right projector 166B. The right projector 166B transmits the right light pattern, which is represented by pixels in the form of light rays 224B and 226B. The light rays 224B and 226B reflect within the right waveguide 170B and exit through a pupil 228B. The light rays 224B and 226B then enter through a pupil 230B of the right eye 220B and fall on a retina 232B of a right eye 220B. The pixels of the light rays 224B and 226B are perceived as pixels 134B and 236B behind the right waveguide 170B.

The patterns that are created on the retinas 232A and 232B are individually perceived as left and right images. The left and right images differ slightly from one another due to the functioning of the stereoscopic analyzer 144. The left and right images are perceived in a mind of the user as a three-dimensional rendering.

As mentioned, the left and right waveguides 170A and 170B are transparent. Light from a real-life object such as the table 16 on a side of the left and right waveguides 170A and 170B opposing the eyes 220A and 220B can project through the left and right waveguides 170A and 170B and fall on the retinas 232A and 232B.

Figure 8:
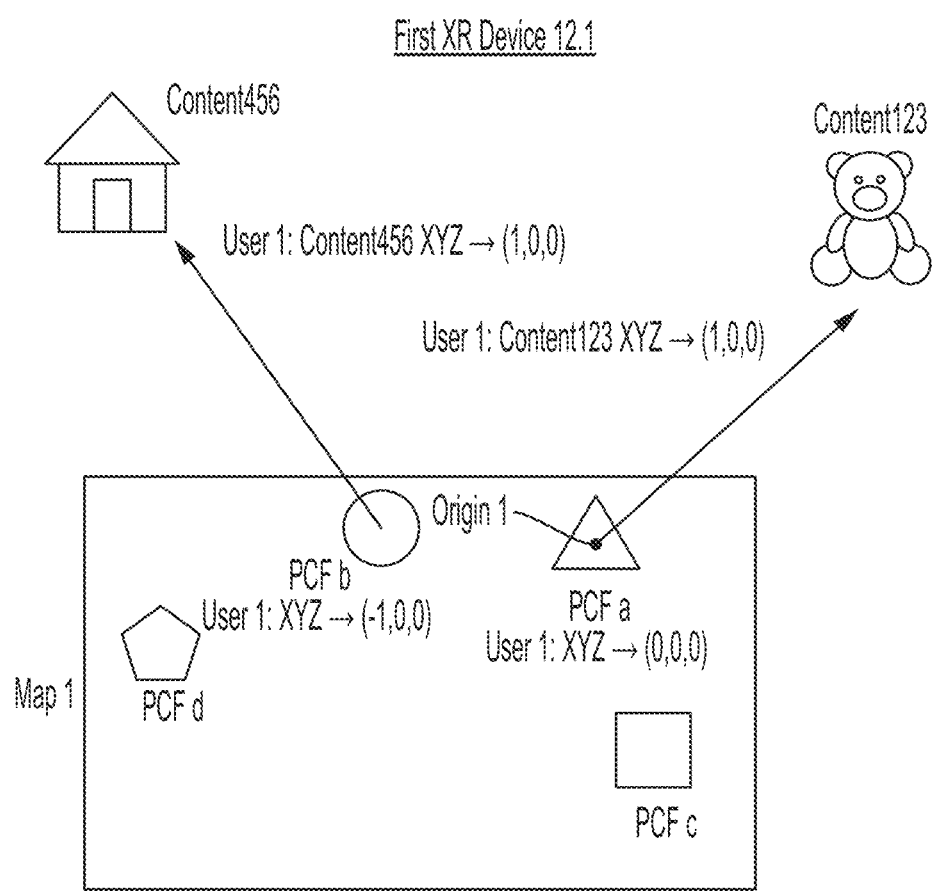
FIG. 8 is a two-dimensional representation of a three-dimensional first local tracking map (Map 1), which may be generated by the first XR device of FIG. 2, according to some embodiments.

FIG. 8 illustrates Map 1 and local content (Content123 and Content456) on the first XR device 12.1. Map 1 includes a number of anchors (Anchor a to Anchor d). From the perspective of the first XR device 12.1, Anchor a, by way of example, has X, Y, and Z coordinates of (0,0,0) and Anchor b has X, Y, and Z coordinates (−1,0,0). Content123 associated with Anchor a. In the present example, Content123 has an X, Y, and Z relationship relative to Anchor a of (1,0,0). Content456 has a relationship relative to Anchor b. In the present example, Content456 has an X, Y, and Z relationship of (1,0,0) relative to Anchor b. Map 1 also has an origin (Origin 1).

Figure 9:
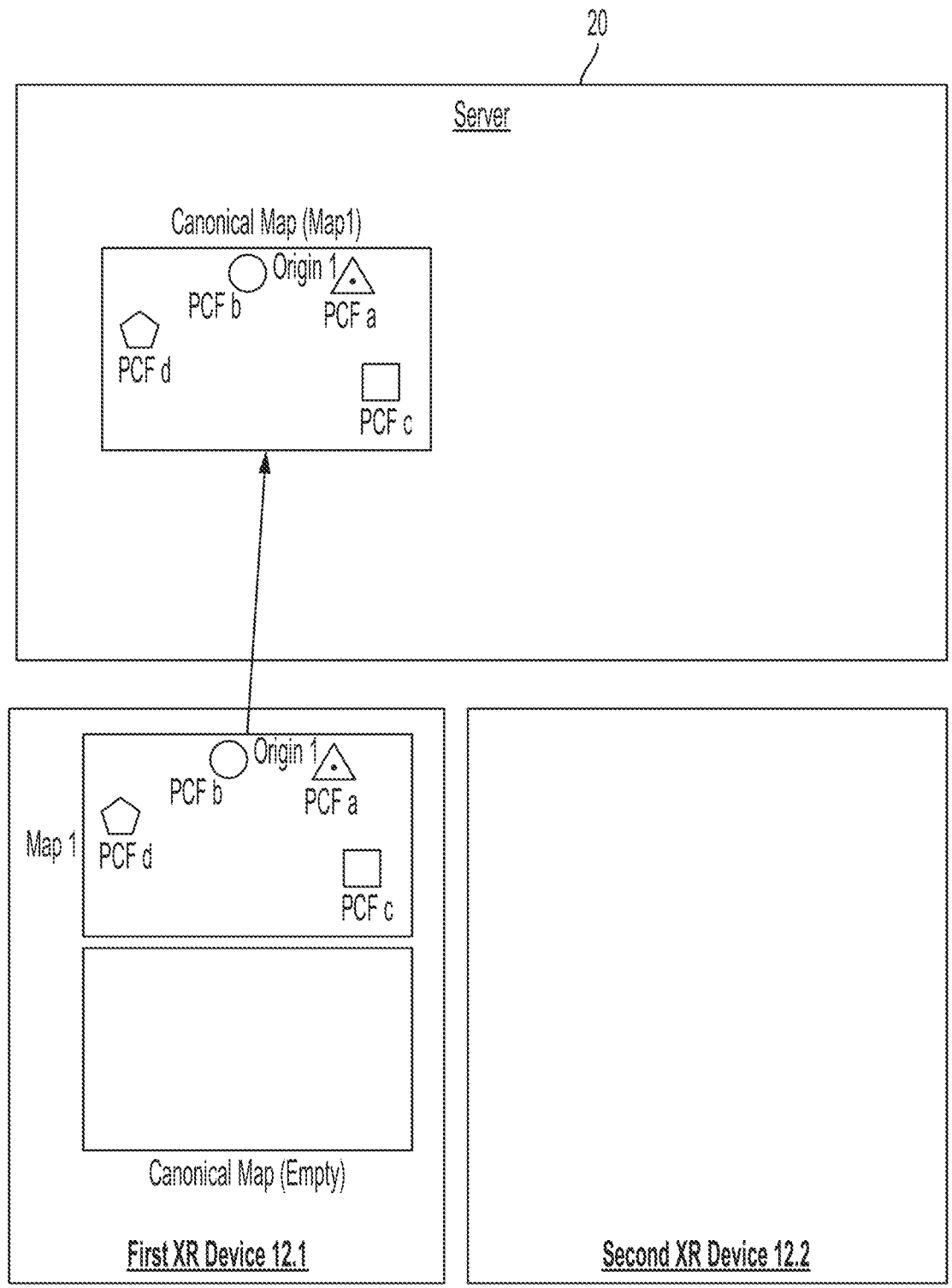
FIG. 9 is a block diagram illustrating uploading Map 1 from the first XR device to the server of FIG. 6, according to some embodiments.

In FIG. 9, the first XR device 12.1 uploads Map 1 to the server 20. The server 20 now has a canonical map based on Map 1. The first XR device 12.1 has a canonical map that is empty at this stage. The server 20, for purposes of discussion, and in some embodiments, includes no other maps other than Map 1. No maps are stored on the second XR device 12.2.

The first XR device 12.1 also transmits its Wi-Fi signature data to the server 20. The server 20 may use the Wi-Fi signature data to determine a rough location of the first XR device 12.1 based on intelligence gathered from other devices that have, in the past, connected to the server 20 or other servers together with the GPS locations of such other devices that have been recorded.

The first XR device 12.1 may now end the first session (See FIG. 1) and may disconnect from the server 20.

Figure 10:
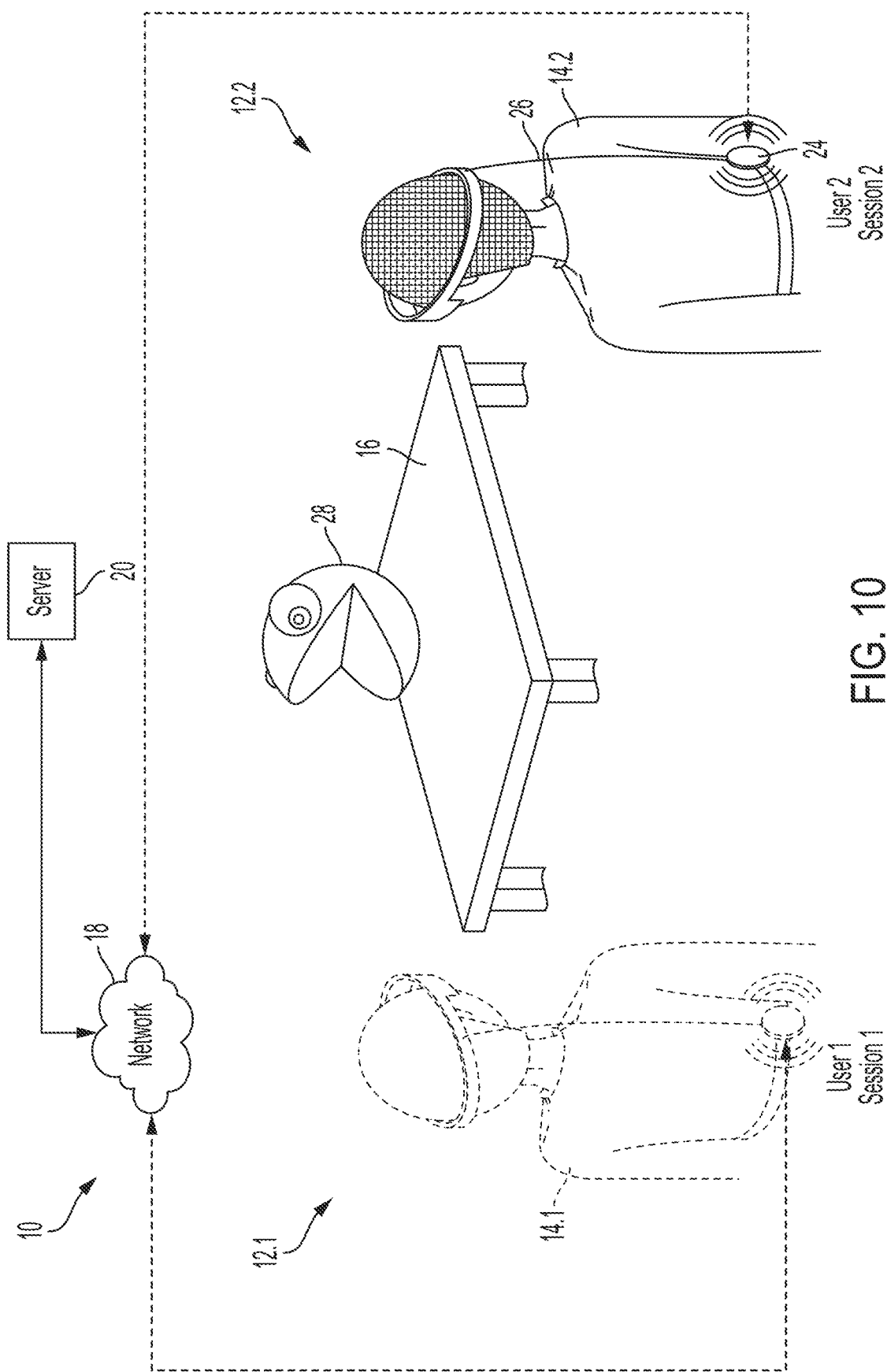
FIG. 10 is a schematic diagram illustrating the XR system of FIG. 6, showing the second user has initiated a second session using a second XR device of the XR system after the first user has terminated a first session, according to some embodiments.

FIGS. 10 and 11A show the initiation of a second session by a second user 14.2. The first user 14.1 is shown in phantom lines because the first session by the first user 14.1 has ended. The second XR device 12.2 begins to record objects. Various systems with varying degrees of granulation may be used by the server 20 to determine that the second session by the second XR device 12.2 is in the same vicinity of the first session by the first XR device 12.1. For example, Wi-Fi signature data, global positioning system (GPS) positioning data, GPS data based on Wi-Fi signature data, or any other data that indicates a location may be included in the first and second XR devices 12.1 and 12.2 to record their locations. Alternatively, the anchors that are identified by the second XR device 12.2 may show a similarity to the anchors of Map 1.

As shown in FIG. 11B, the second XR device boots up and begins to collect data, such as images 1110 from one or more cameras 44, 46. As shown in FIG. 11D, in some embodiments, a XR device (e.g. the second XR device 12.2) may collect one or more images 1110 and perform image processing to extract one or more features/interest points 1120. Each feature may be converted to a descriptor 1130. In some embodiments, the descriptors 1130 may be used to describe a key frame 1140, which may have the position and direction of the associated image attached. One or more key frames 1140 may correspond to a single persistent pose 1150, which may be automatically generated after a threshold distance from the previous persistent pose 1150, e.g. 3 meters. One or more persistent poses 1150 may correspond to a single PCF 1160, which may be automatically generated after a pre-determined distance, e.g. every 5 meters. Over time as the user continues to move around the user's environment, and the XR device continues to collect more data, such as images 1110, additional PCF anchors (e.g. PCF anchors 4,5 and PCF anchor 3) may be created. An application or two 1180 may run on the XR device and provide virtual content 1170 to the XR device for presentation to the user. The virtual content may have an associated content coordinate frame which may be placed relative to one or more PCF anchors. As shown in FIG. 11B, the second XR device 12.2 creates three PCF anchors. In some embodiments, the second XR device 12.2 may try to localize into one or more canonical maps stored on the server 20. In some embodiments, as shown in FIG. 11C, the second XR device 12.2 may download the canonical map 120 from the server 20. Map 1 on the second XR device 12.2 includes anchors a to d and Origin 1. In some embodiments, the server 20 may have multiple canonical maps for various locations and may determine that the second XR device 12.2 is in the same vicinity as the vicinity of the first XR device 12.1 during the first session and sends the second XR device 12.2 the canonical map for that vicinity.

Figure 12:
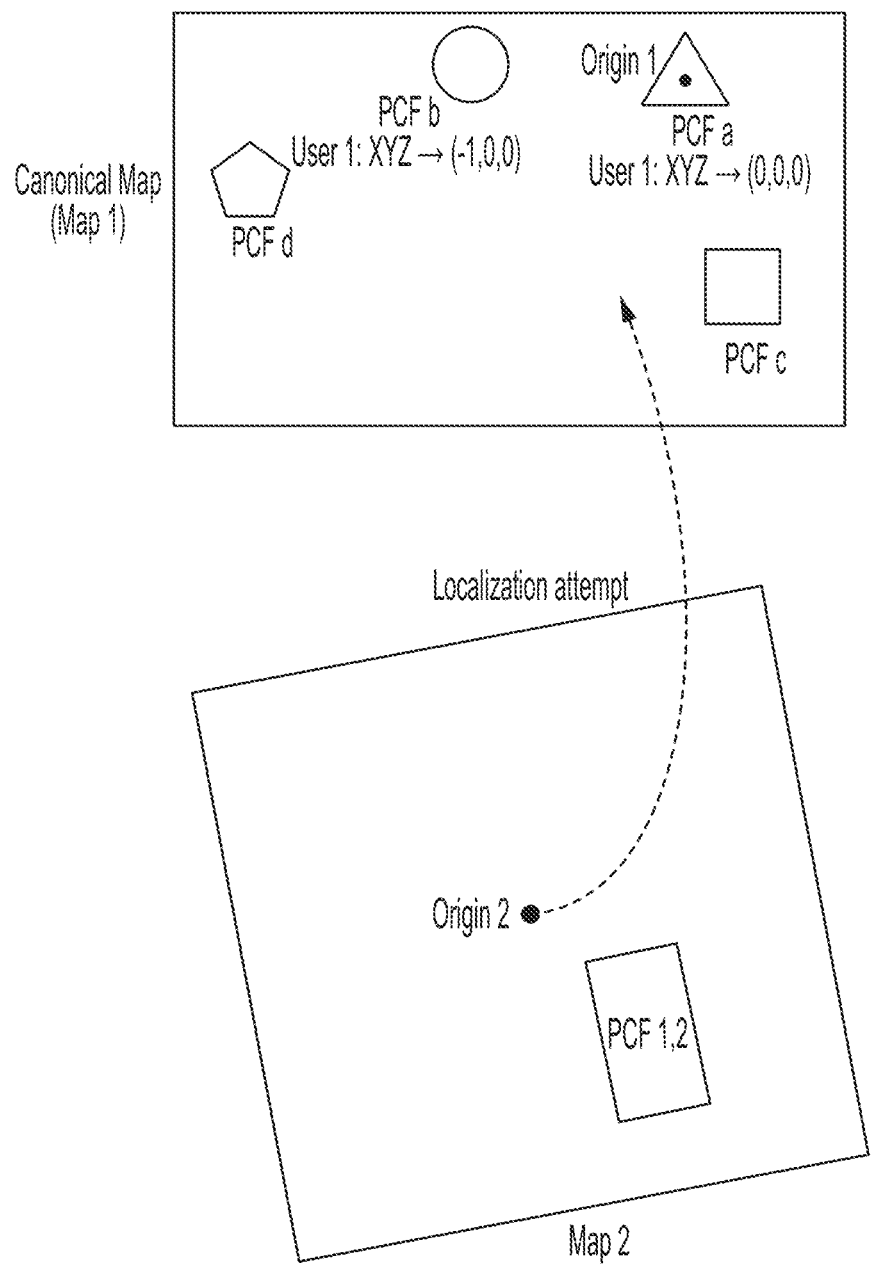
FIG. 12 is a schematic diagram illustrating a localization attempt to localize to a canonical map a second tracking map (Map 2), which may be generated by the second XR device of FIG. 10, according to some embodiments.

FIG. 12 shows the second XR device 12.2 beginning to identify anchors for purposes of generating Map 2. The second XR device 12.2 has only identified a single anchor, namely PCF 1,2. The X, Y, and Z coordinates of PCF 1,2 for the second XR device 12.2 may be (1,1,1). Map 2 has its own origin (Origin 2), which may be based on the head pose of device 2 for the current head pose session. In some embodiments, the second XR device 12.2 may immediately attempt to localize Map 2 to the canonical map. In some embodiments, Map 2 may not be able to localize into Canonical Map (Map 1) (i.e. localization may fail) because the system does not recognize any or enough overlap between the two maps. In some embodiments, the system may localize based on anchor/PCF comparison between the local and canonical maps. In some embodiments, the system may localize based on persistent pose comparison between the local and canonical maps. In some embodiments, the system may localize based on key frame comparison between the local and canonical maps.

Figure 13:
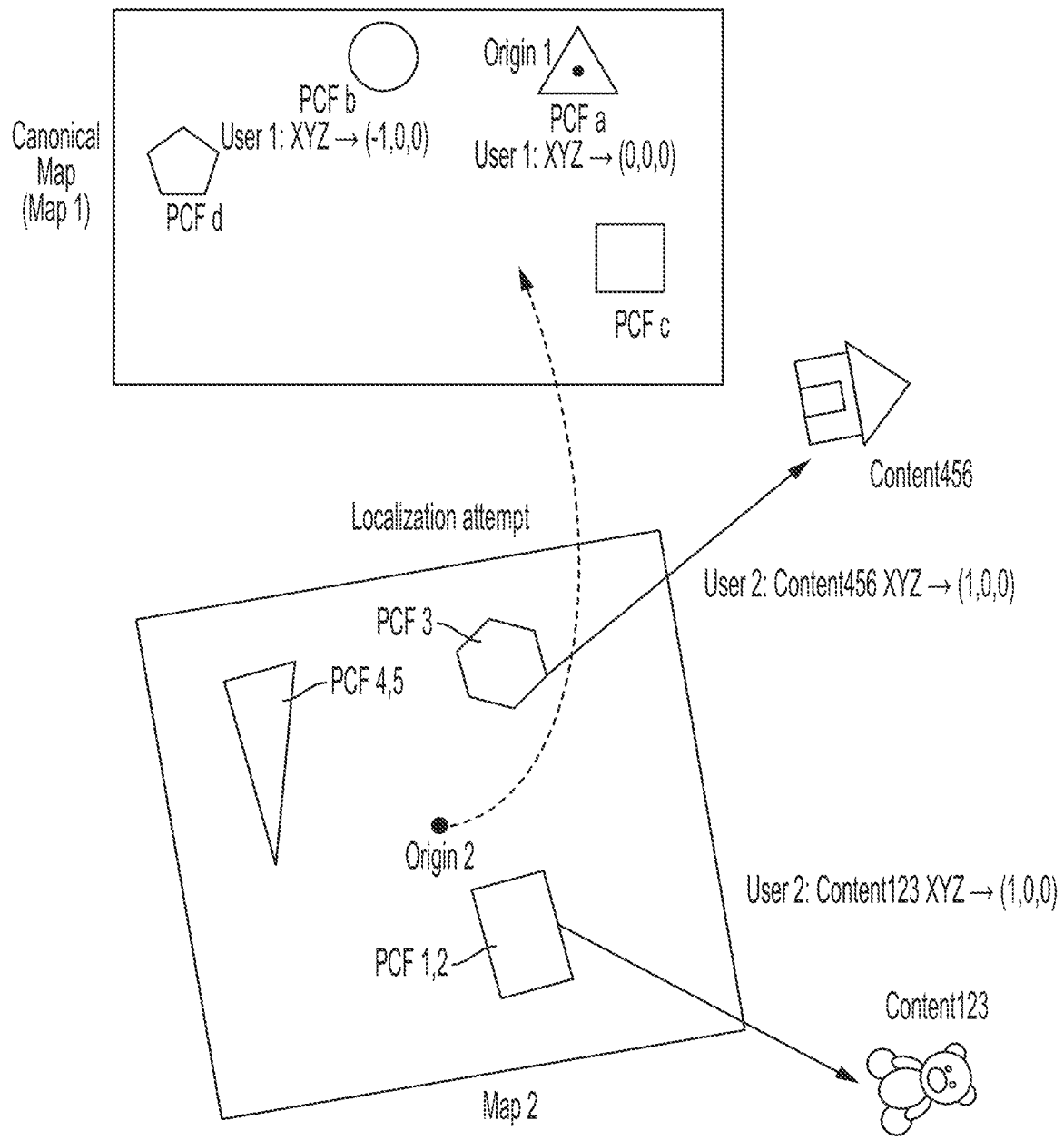
FIG. 13 is a schematic diagram illustrating a localization attempt to localize to a canonical map the second tracking map (Map 2) of FIG. 12, which may be further developed and with XR content associated with anchors of Map 2, according to some embodiments.

FIG. 13 shows Map 2 after the second XR device 12.2 has identified further anchors (PCF 1,2, PCF 3, PCF 4,5) of Map 2. The second XR device 12.2 again attempts to localize Map 2 to the canonical map. Because Map 2 has expanded to overlap with at least a portion of the Canonical Map, the localization attempt will succeed. In some embodiments, the overlap between the local tracking map, Map 2, and the Canonical Map may be represented by PCF/anchors, persistent poses, key frames, or any other suitable intermediate or derivative construct.

Furthermore, the second XR device 12.2 has associated Content123 and Content456 to PCFs 1,2 and PCF 3 of Map 2. Content123 has X, Y, and Z coordinates relative to PCF 1,2 of (1,0,0).

Similarly, the X, Y, and Z coordinates of Content456 relative to PCF 3 in Map 2 are (1,0,0).

Figure 14A:
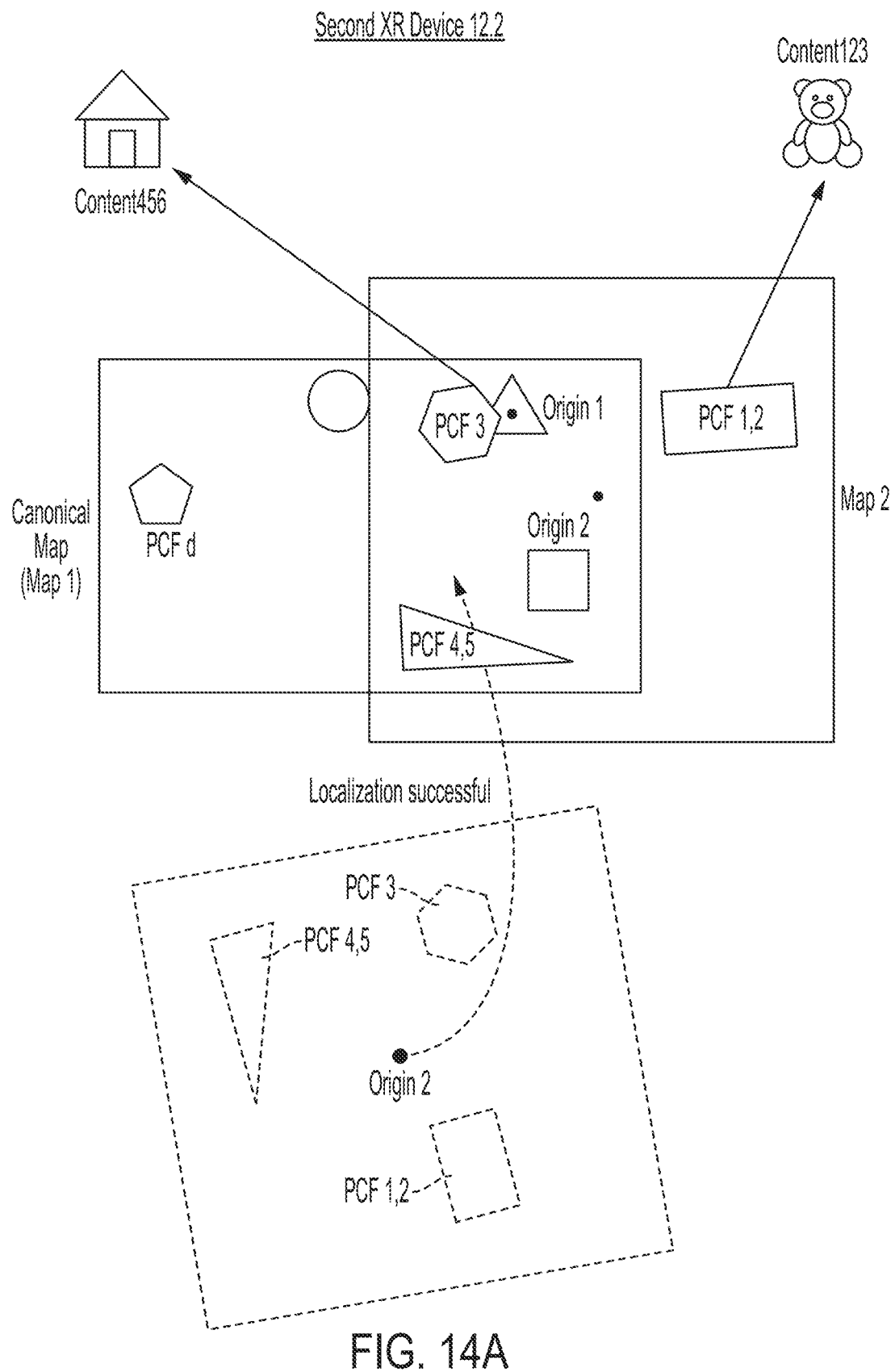

FIGS. 14A and 14B illustrate a successful localization of Map 2 to the canonical map. The overlapping area/volume/section of the maps 1410 represent the common parts to Map 1 and the canonical map. Since Map 2 created PCFs 3 and 4,5 before localizing, and the Canonical map created anchors a and c before Map 2 was created, different anchors/PCFs were created to represent the same volume in real space (e.g., in different maps).

Figure 15:
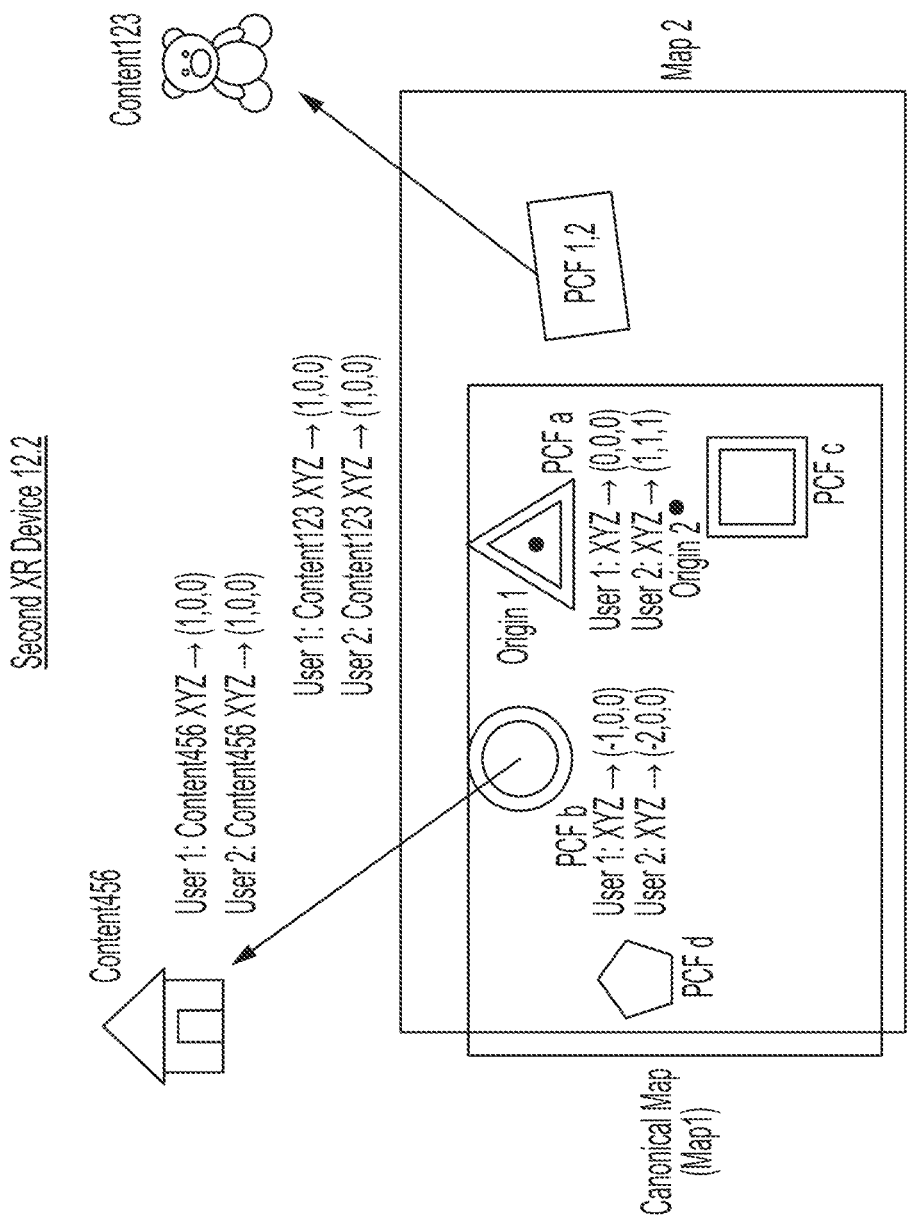
FIG. 15 is a schematic diagram illustrating a canonical map generated by including an anchor or anchors from the canonical map of FIG. 14A into Map 2 of FIG. 13, according to some embodiments.

As shown in FIG. 15, the second XR device 12.2 expands Map 2 to include Anchors a-d from the Canonical Map. The inclusion of Anchors a-d represents the localization of Map 2 to the Canonical Map. In some embodiments, the XR system may perform an optimization step to remove duplicate anchors/PCFs from overlapping areas, such as the PCFs in 1410, PCF 3 and PCF 4,5. After Map 2 localizes, the placement of virtual content, such as Content456 and Content123 will be relative to the closest updated anchors/PCFs in the updated Map 2. The virtual content appears in the same real-world location relative to the user, despite the changed PCF attachment for the content, and despite the updated anchors for Map 2.

Figure 16:
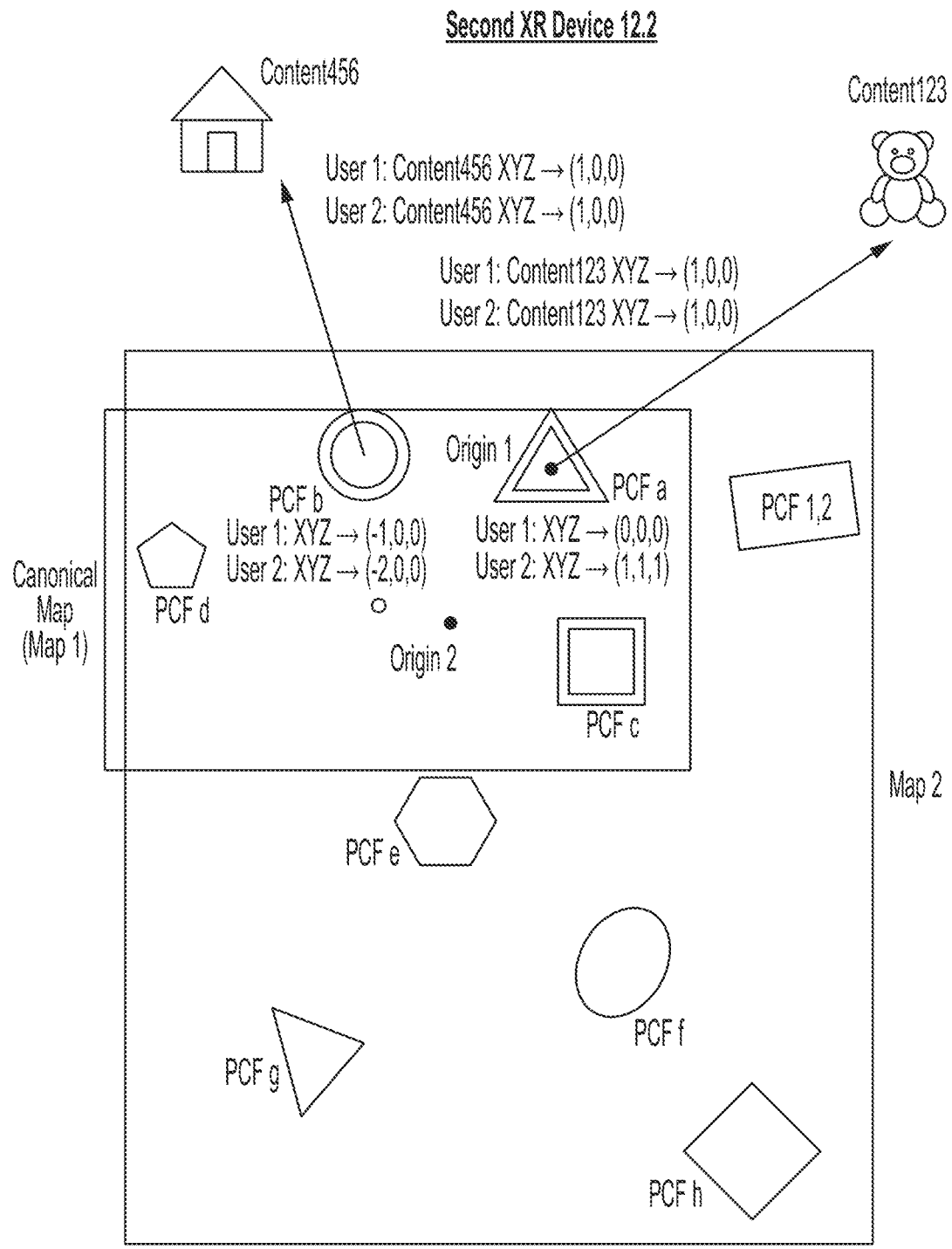
FIG. 16 is a schematic diagram illustrating the canonical map of FIG. 15 with further expansion of Map 2 on the second XR device, according to some embodiments.

As shown in FIG. 16, the second XR device 12.2 continues to expand Map 2 as further anchors (Anchors e, f, g, and h) are identified by the second XR device 12.2, for example as the user walks around the real world. It can also be noted that Map 1 has not expanded in FIGS. 15 and 16.

Figure 17:
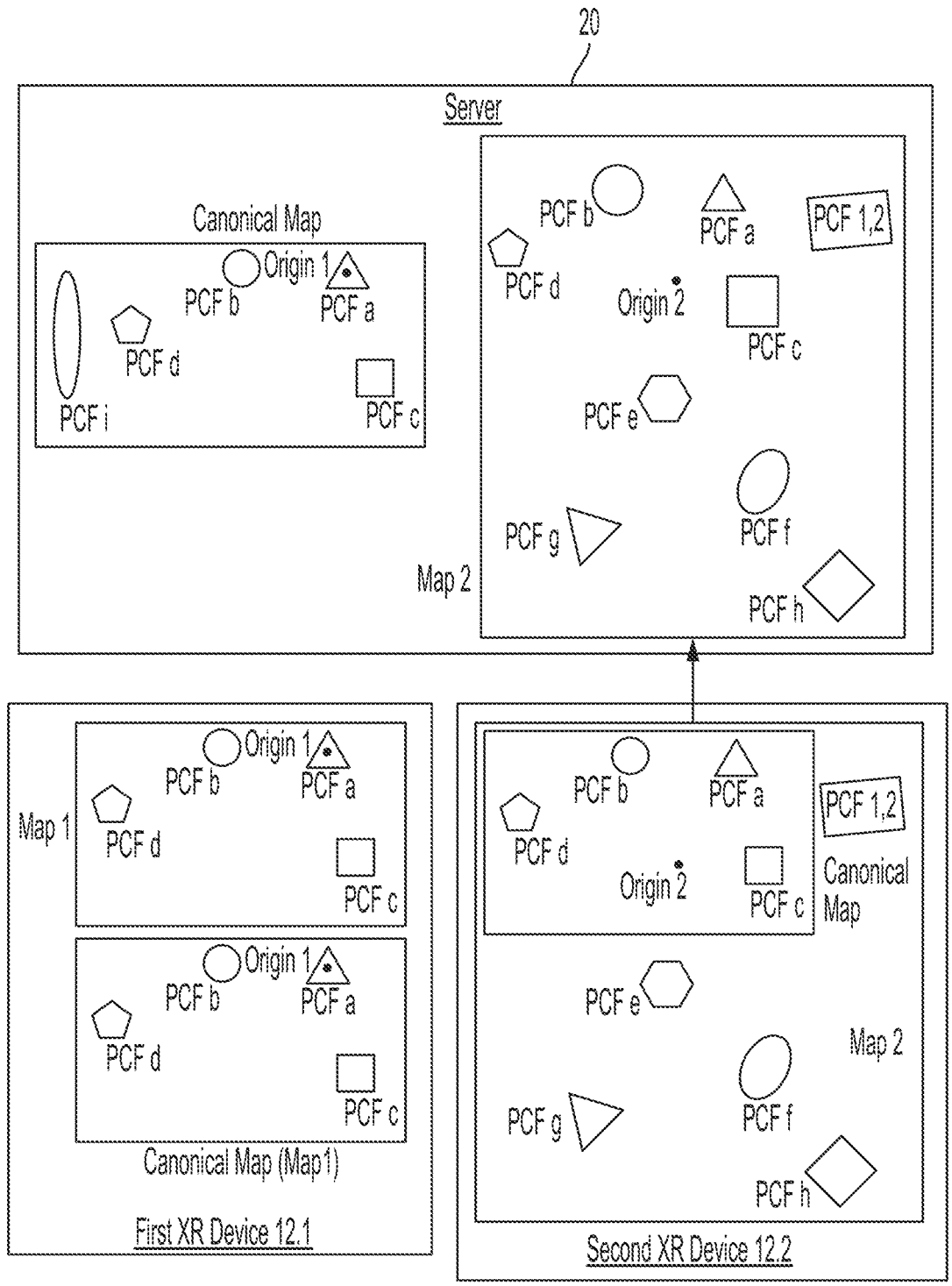
FIG. 17 is a block diagram illustrating uploading Map 2 from the second XR device to the server, according to some embodiments.

Referring to FIG. 17, the second XR device 12.2 uploads Map 2 to the server 20. The server 20 stores Map 2 together with the canonical map. In some embodiments, Map 2 may upload to the server 20 when the session ends for the second XR device 12.2.

The canonical map within the server 20 now includes anchor i which is not included in Map 1 on the first XR device 12.1. The canonical map on the server 20 may have expanded to include anchor i when a third XR device (not shown) uploaded a map to the server 20 and such a map included anchor i.

Figure 18:
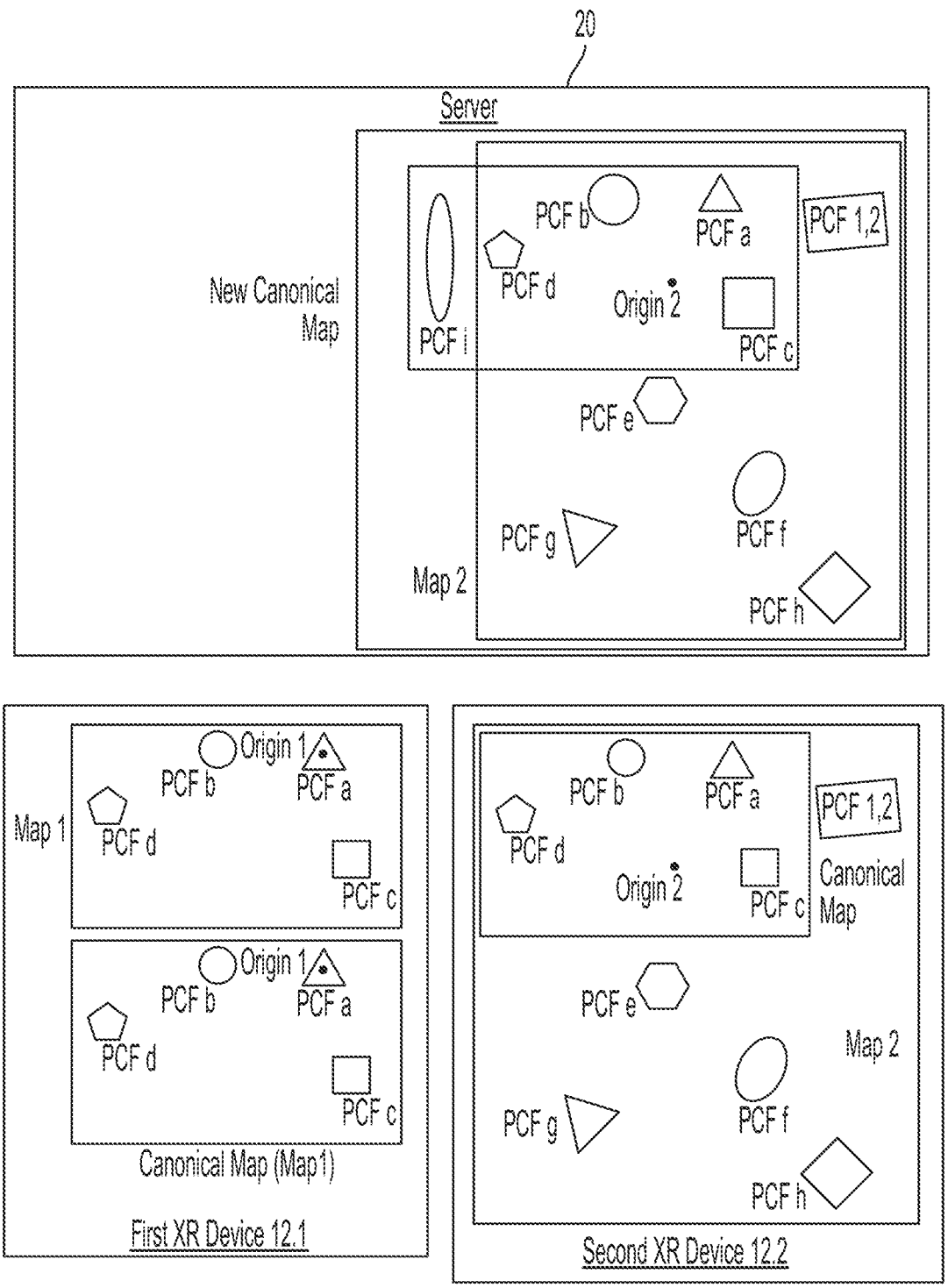
FIG. 18 is a block diagram illustrating merging Map 2 with the canonical map, according to some embodiments.

In FIG. 18, the server 20 merges Map 2 with the canonical map to form a new canonical map. The server 20 determines that anchors a to d are common to the canonical map and Map 2. The server expands the canonical map to include anchors e to h and PCF 1,2 from Map 2 to form a new canonical map. The canonical maps on the first and second XR devices 12.1 and 12.2 are based on Map 1 and are outdated.

Figure 19:
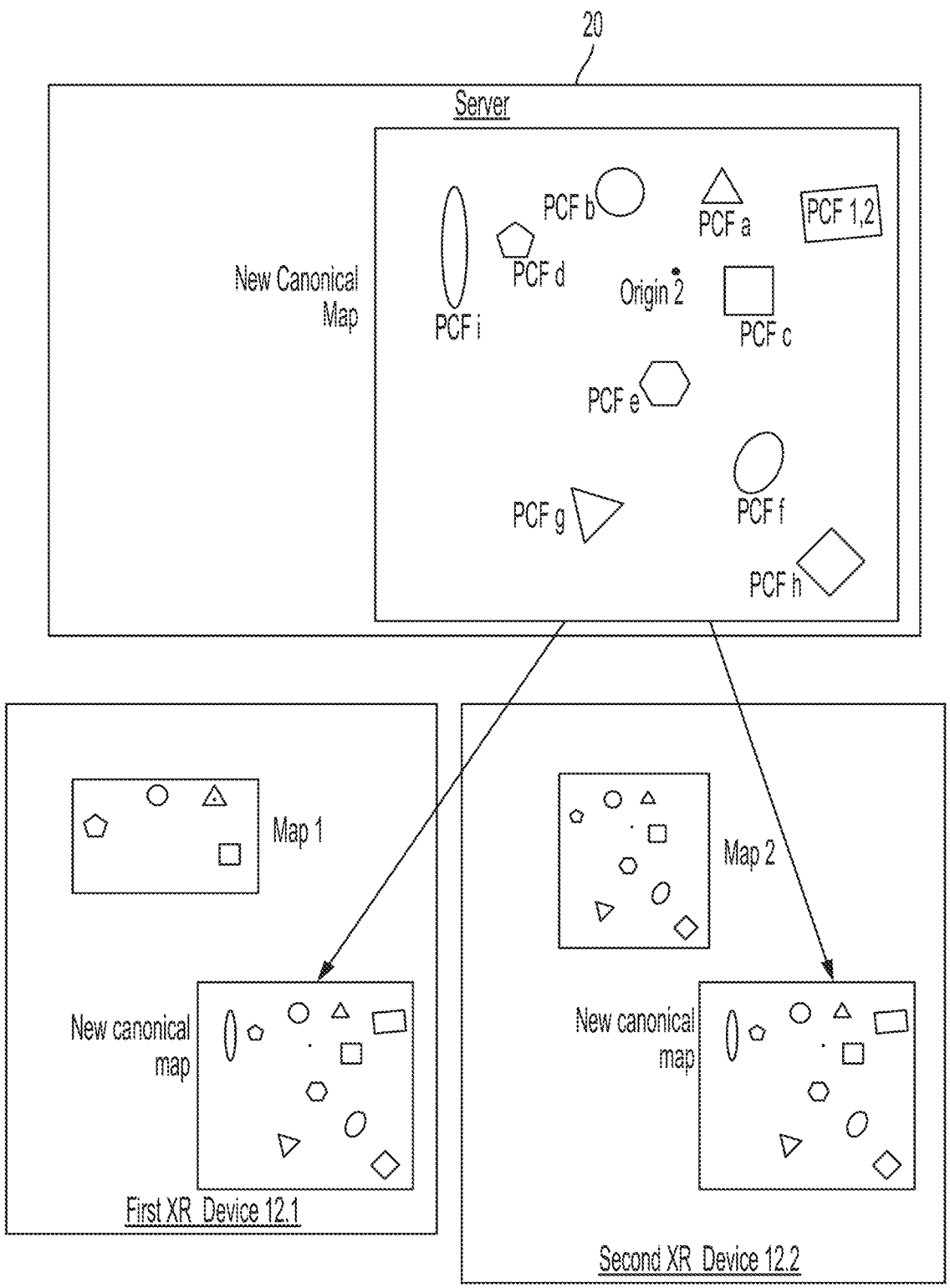
FIG. 19 is a block diagram illustrating transmission of a new canonical map from the server to the first and second XR devices, according to some embodiments.

In FIG. 19, the server 20 transmits the new canonical map to the first and second XR devices 12.1 and 12.2. In some embodiments, this may occur when the first XR device 12.1 and second device 12.2 try to localize during a different or new or subsequent session. The first and second XR devices 12.1 and 12.2 proceed as described above to localize their respective local maps (Map 1 and Map 2 respectively) to the new canonical map.

Figure 20:
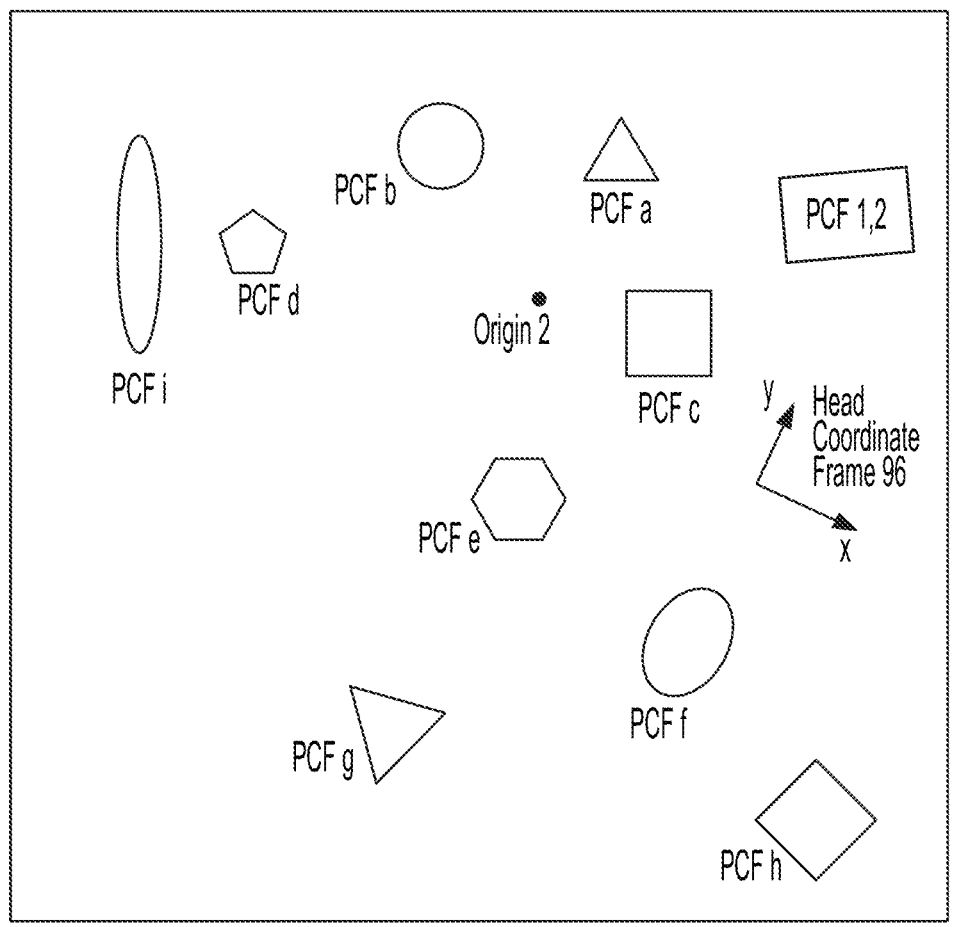
FIG. 20 is block diagram illustrating a two-dimensional representation of Map 2 and a head coordinate frame of the second XR device that is referenced to Map 2, according to some embodiments.

As shown in FIG. 20, the head coordinate frame 96 or "head pose" is related to the anchors in Map 2. In some embodiments, the origin of the map, Origin 2, is based off of the head pose of second XR device 12.2 at the start of the session. As anchors are created during the session, the anchors are placed relative to the local coordinate frame, Origin 2. The anchors of Map 2 serve as a persistent coordinate frames relative to a world coordinate frame, where the world coordinate frame may be a previous session's local coordinate frame (e.g. Map 1's Origin 1 in FIG. 8). The transformation from the world coordinate frame to the head coordinate frame 96 has been previously discussed with reference to FIG. 2. The head coordinate frame 96 shown in FIG. 20 only has two orthogonal axes that are in a particular coordinate position relative to the anchors of Map 2, and at particular angles relative to Map 2. It should however be understood that the head coordinate frame 96 is in a three-dimensional location relative to the anchors of Map 2 and has three orthogonal axes within three-dimensional space.

Figure 21:
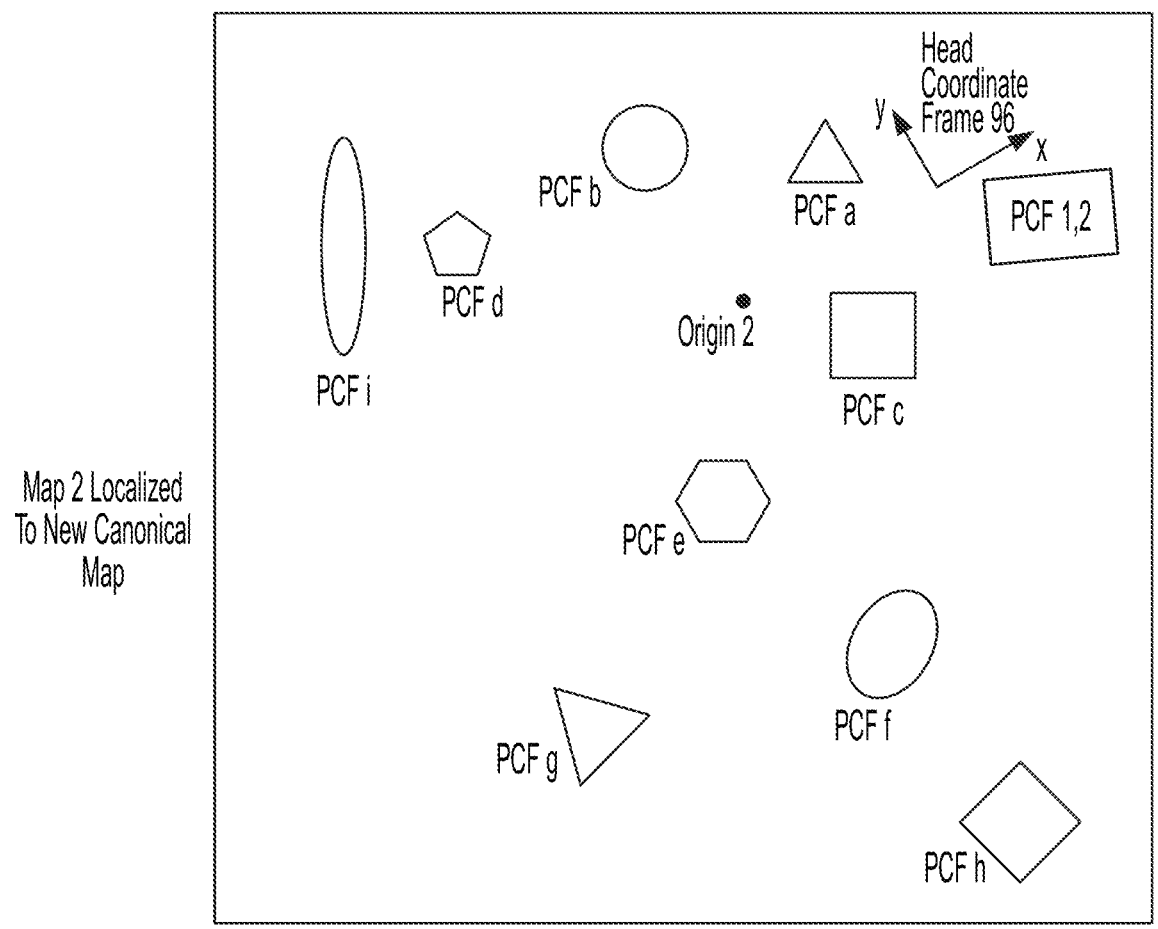
FIG. 21 is a block diagram illustrating, in two-dimensions, adjustment of the head coordinate frame which can occur in six degrees of freedom, according to some embodiments.

In FIG. 21, the head coordinate frame 96 has moved relative to the anchors of Map 2. The head coordinate frame 96 has moved because the second user 14.2 has moved their head. The user can move their head in six degrees of freedom (6 dof). The head coordinate frame 96 can thus move in 6 dof, namely in three-dimensions from its previous location in FIG. 20 and about three orthogonal axes relative to the anchors of Map 2. The head coordinate frame 96 is adjusted when the real object detection camera 44 and inertial measurement unit 48 in FIG. 2 respectively detect real objects and motion of the head unit 22. More information regarding head pose tracking is disclosed in U.S. patent application Ser. No. 16/221,065 entitled "Enhanced Pose Determination for Display Device" and is hereby incorporated by reference in its entirety.

Figure 22:
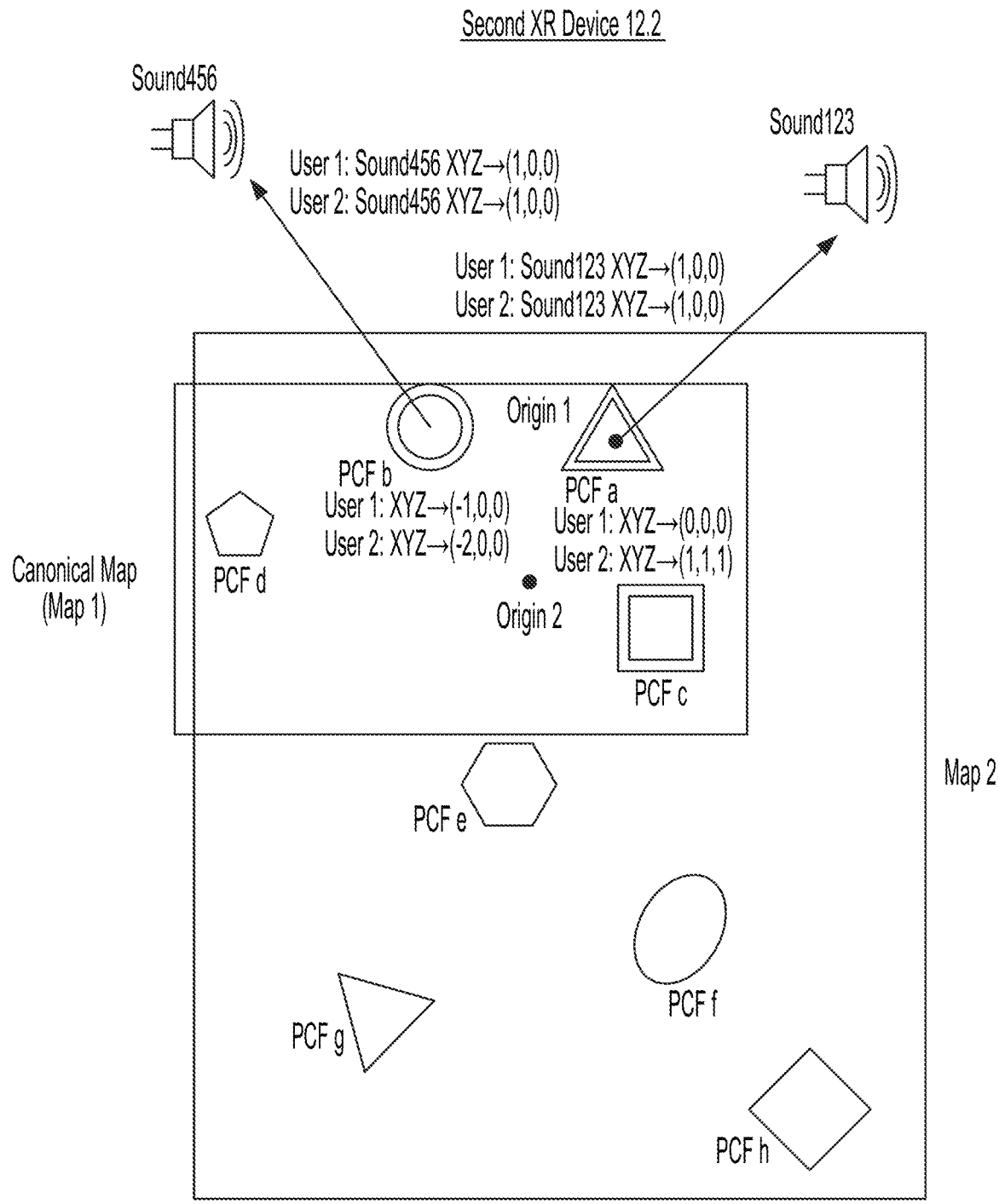
FIG. 22 a block diagram illustrating a canonical map on the second XR device wherein sound is localized relative to anchors of Map 2, according to some embodiments.

FIG. 22 shows that sound may be associated with one or more anchors. A user may, for example, wear headphones or earphones with stereoscopic sound. The location of sound through headphones can be simulated using conventional techniques. The location of sound may be located in a stationary position so that, when the user rotates their head to the left, the location of sound rotates to the right so that the user perceives the sound coming from the same location in the real world. In the present example, location of sound is represented by Sound123 and Sound456. For purposes of discussion, FIG. 22 is similar to FIG. 16 in its analysis. When the first and second users 14.1 and 14.2 are located in the same room at the same or different times, they perceive Sound123 and Sound456 coming from the same locations within the real world.

Figure 23:
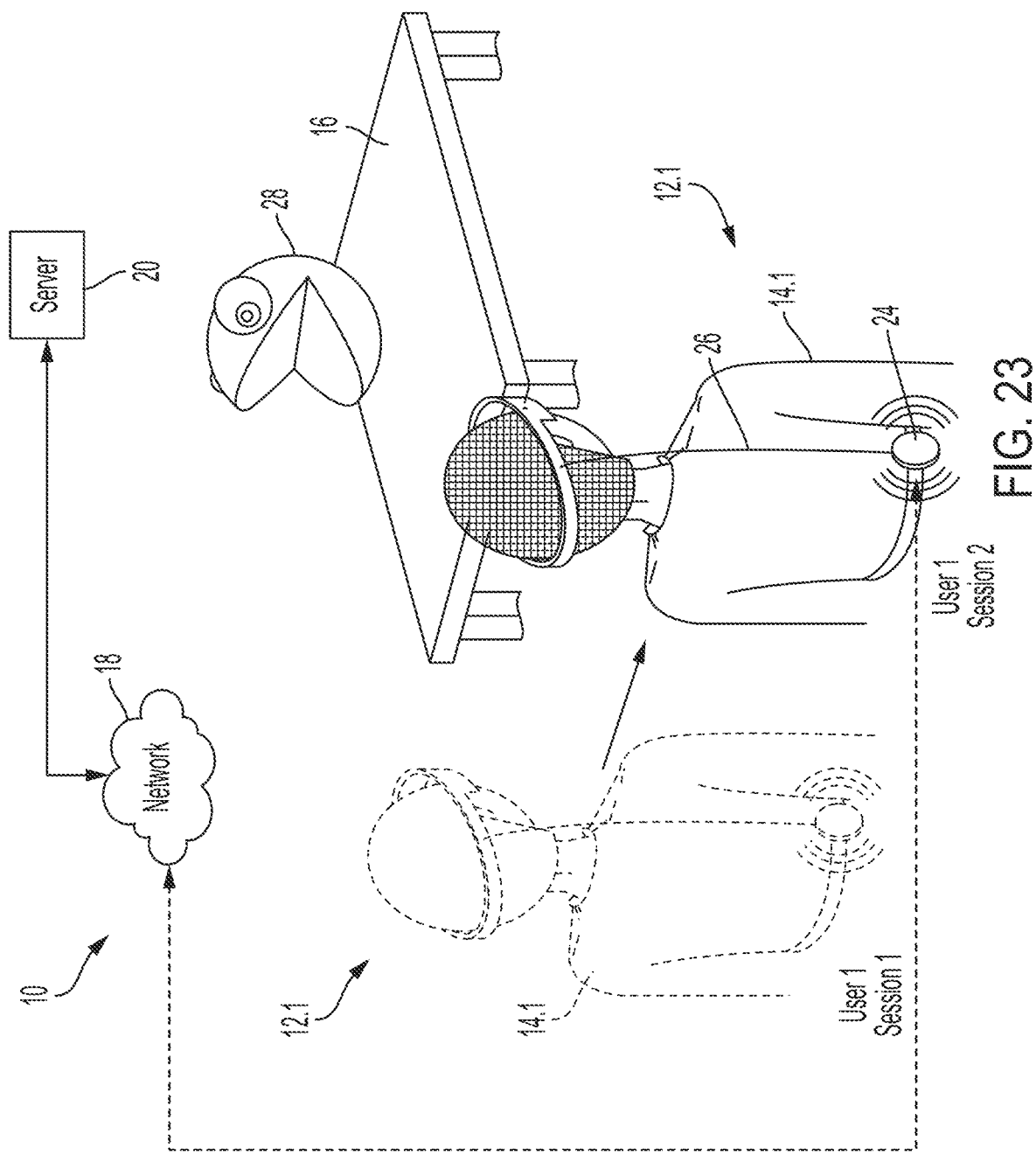
FIGS. 23 and 24 are a perspective view and a block diagram illustrating use of the XR system when the first user has terminated a first session and the first user has initiated a second session using the XR system, according to some embodiments.
Figure 24:
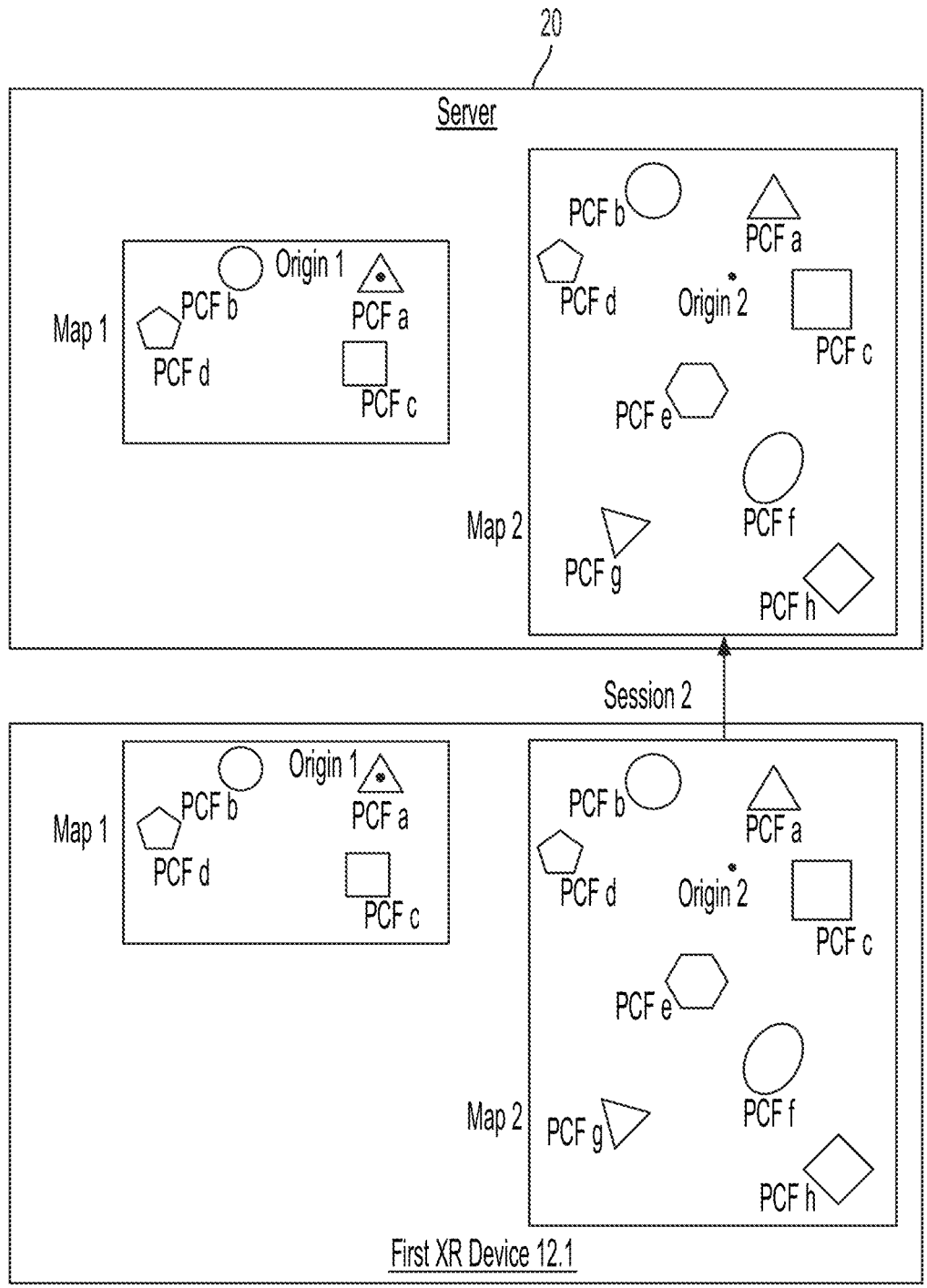

FIGS. 23 and 24 illustrate a further implementation of the technology described above. The first user 14.1 has initiated a first session as described with reference to FIG. 1. As shown in FIG. 23, the first user 14.1 has terminated the first session as indicated by the phantom lines. At the end of the first session, the first XR device 12.1 uploaded Map 1 to the server 20. The first user 14.1 has now initiated a second session at a later time than the first session. The first XR device 12.1 does not download Map 1 from the server 20 because Map 1 is already stored on the first XR device 12.1. If Map 1 is lost, then the first XR device 12.1 downloads Map 1 from the server 20. The first XR device 12.1 then proceeds to build anchors for Map 2, localizes to Map 1 and further develops a canonical map as described above. Map 2 is then used for relating local content, a head coordinate frame, local sound, etc. as described above.

Figure 25:
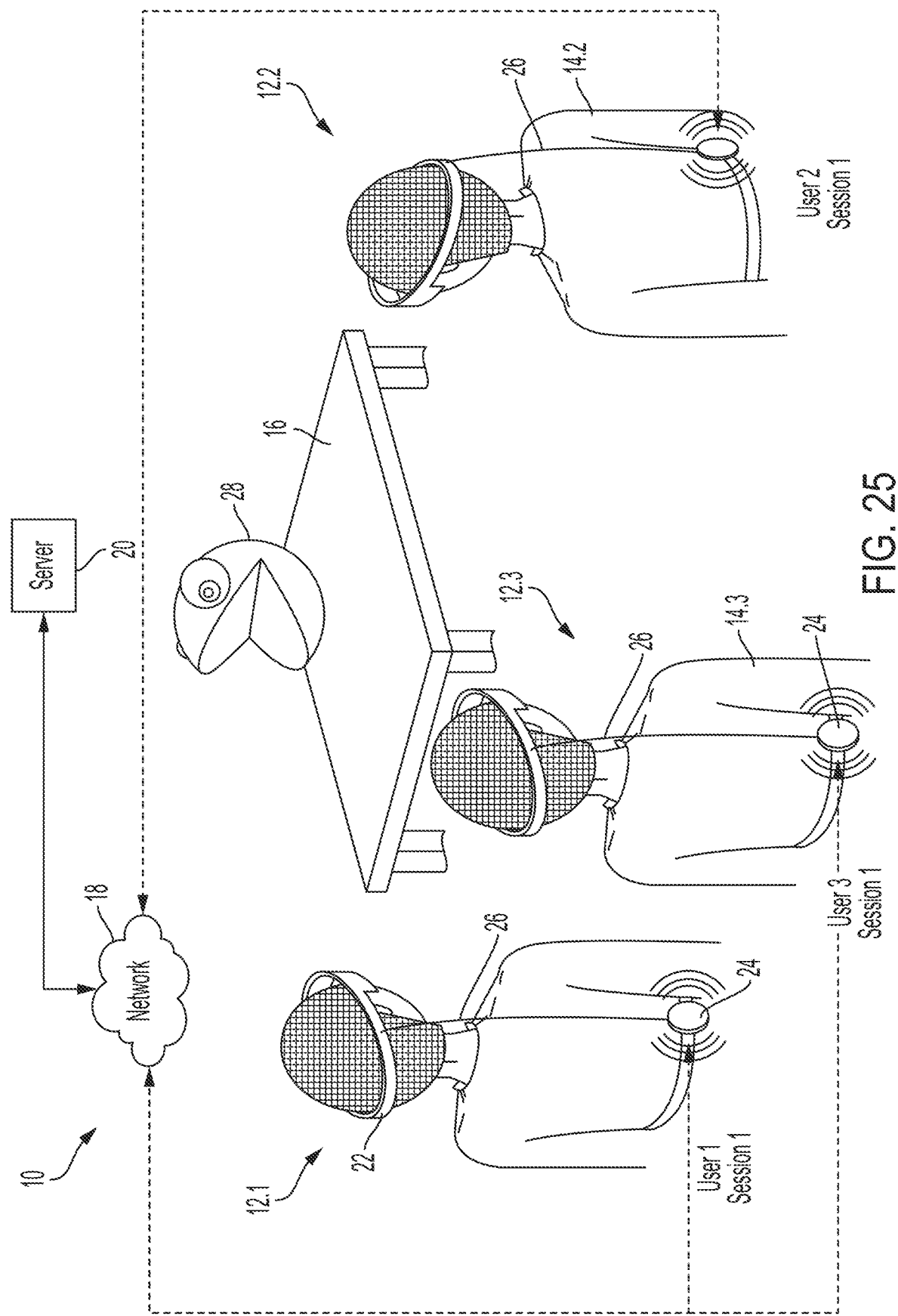
FIGS. 25 and 26 are a perspective view and a block diagram illustrating use of the XR system when three users are simultaneously using the XR system in the same session, according to some embodiments.
Figure 26:
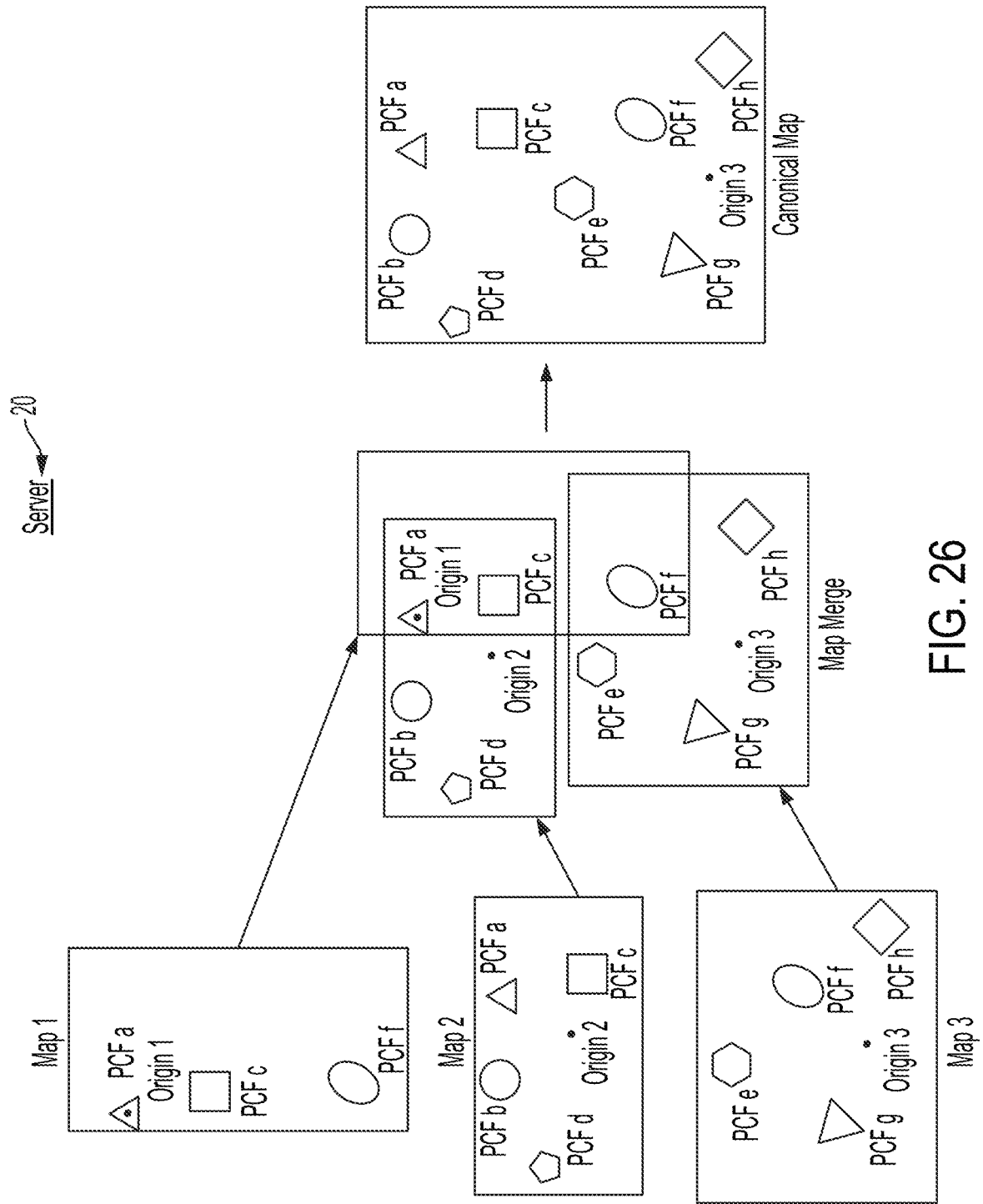

Referring to FIGS. 25 and 26, it may also be possible that more than one user interacts with the server in the same session. In the present example, the first user 14.1 and the second user 14.2 are joined by a third user 14.3 with a third XR device 12.3. Each XR device 12.1, 12.2 and 12.3 begins to generate its own map, namely Map 1, Map 2 and Map 3, respectively. As the XR devices 12.1, 12.2 and 12.3 continue to develop Maps 1, 2, and 3, the maps are incrementally uploaded to the server 20. The server 20 merges Maps 1, 2, and 3 to form a canonical map. The canonical map is then transmitted from the server 20 to each one of the XR devices 12.1, 12.2 and 12.3.

Figure 27:
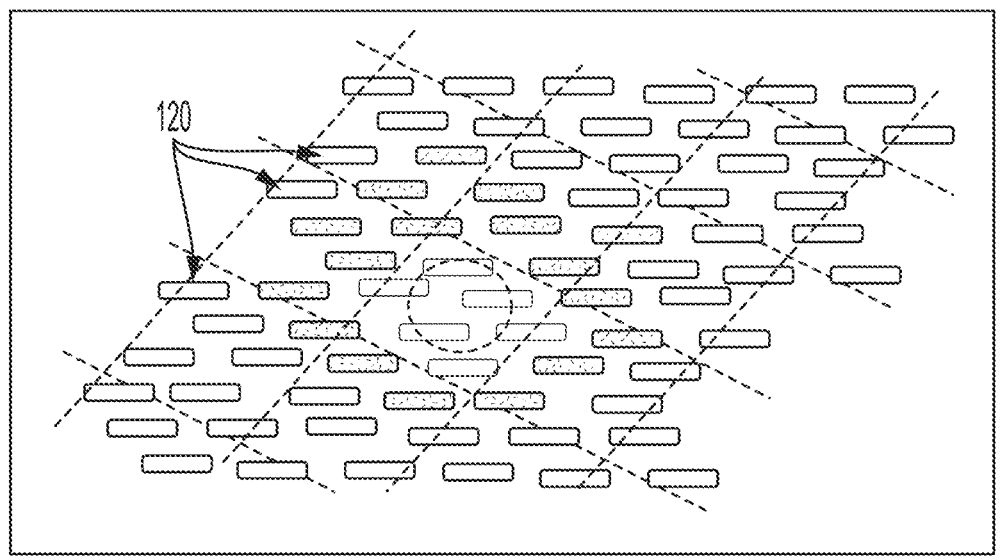
FIG. 27 is a block diagram illustrating a two-dimensional view representing latitude and longitude of canonical maps stored on the server, according to some embodiments.

Multiple Canonical Maps and Key Frame for Canonical Map Filtering and for Localization FIG. 27 shows a plurality of canonical maps 120 that are stored in data storage on a computer-readable medium of the server 20. Each canonical map 120 has a plurality of canonical map identifiers associated therewith. These canonical map identifiers include an area on the planet Earth represented by a range of longitudes and latitudes. The canonical map identifiers also include global feature strings.

The canonical maps 120 are illustrated geographically in a two-dimensional pattern as they may exist on a surface of the earth. The longitudes and latitudes differ from one another to uniquely identify the canonical maps. The server 20 has a position detector that receives position data, including longitude and latitude, a Wi-Fi fingerprint, and features of an image that is taken by the respective viewing device 12.1 or 12.2. The position detector then stores the position identifiers. Not all viewing devices provide the server 20 with longitude and latitude as position identifiers. However, viewing devices will normally include a Wi-Fi fingerprint and image features as position identifiers.

Figure 28:
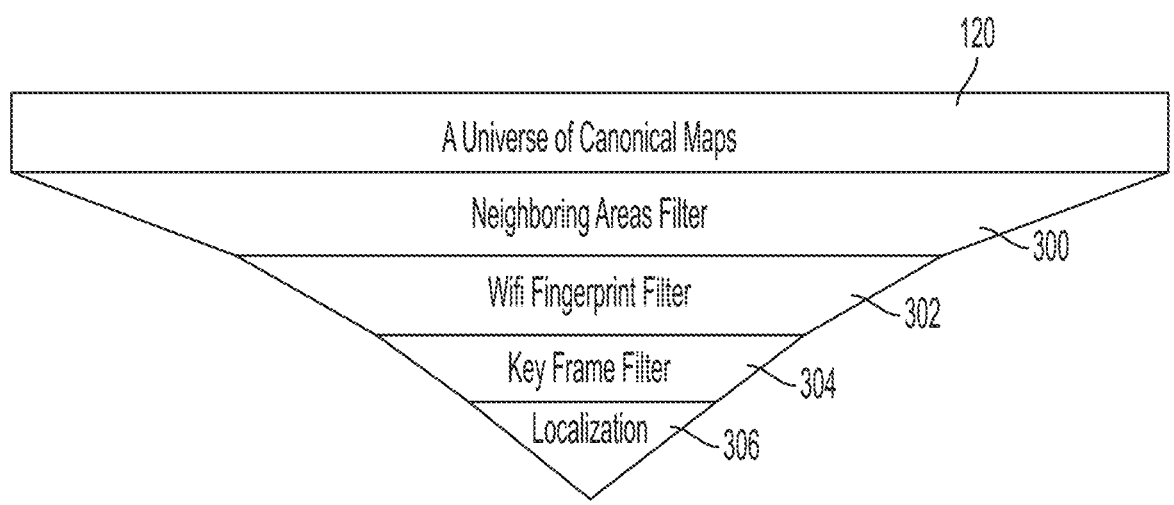
FIG. 28 is a schematic diagram illustrating a series of filters for selecting canonical maps for transmission by the server to a XR device, according to some embodiments.

FIG. 28 illustrates the canonical maps 120 and a series of filters, including a neighboring areas filter 300, a Wi-Fi fingerprint filter 302, and a key frame filter 304 that the sever 20 executes to determine one or more maps that are sent to a viewing device, followed by localization 306 on the viewing device as described above.

The canonical maps 120 may have many canonical maps, such as thousands of canonical maps. In some embodiments, it may not be possible to send all the canonical maps to a viewing device due to bandwidth restrictions.

In some embodiments, the neighboring areas filter 300 may select at least one matching canonical map 120 covering longitude and latitude that include that longitude and latitude of the position identifier received from the viewing device, as long as at least one map exists at that longitude and latitude. In some embodiments, the neighboring areas filter 300 further selects at least one neighboring canonical map covering longitude and latitude that are adjacent the matching canonical map. In some embodiments, the neighboring areas filter 300 may select a plurality of matching canonical maps and a plurality of neighboring canonical maps. The neighboring areas filter 300 may, for example, reduce the number of canonical maps from thousands to, for example, 130 to form a first filtered selection. In some embodiments, the neighboring areas filter 300 may be configured to reduce the number canonical maps 120. In other words, the number of canonical maps that enters the neighboring areas filter 300 may be greater than the number of canonical maps that exits the neighboring areas filter 300.

In some embodiments, the Wi-Fi fingerprint filter 302 forms a second filter. The Wi-Fi fingerprint filter 302 determines a latitude and longitude based on the Wi-Fi fingerprint received as part of the position identifier from the viewing device. The Wi-Fi fingerprint filter 302 then compares the latitude and longitude from the Wi-Fi fingerprint filter 302 with latitude and longitude of the canonical maps 120 to determine one or more canonical maps that form a second filtered selection within the first filtered selection established by the neighboring areas filter 300. The second filtered selection may, for example, reduce the number of canonical maps to 50 canonical maps that form a second selection that does not include any canonical maps based on the first filtered selection outside of the second filtered selection. In this example, the first filtered selection thus includes 130 canonical maps and the second filtered selection includes 50 of the 130 canonical maps and does not include the other 80 of the 130 canonical maps.

The key frame filter 304 reduces the number of canonical maps further to, for example, five canonical maps. The key frame filter 304 may be a computer vision filter that compares data represented by an image captured by the viewing device with data representing the canonical maps 120. The key frame filter 304 thus provides, as an output, a third filtered selection that includes only five of the 50 canonical maps identified following the second filtered selection. The map transmitter 122 then transmits the one or more canonical maps based on the third filtered selection to the viewing device. The viewing device receives, in this example and in some embodiments, the five canonical maps and, at 306, attempts to localize to all five canonical maps.

FIGS. 29A-29C illustrate a frame embedding generator 308 that, in some embodiments, may be used within the server 20 (or within one of the viewing devices 12.1 and 12.2) to generate a unique and reduced data representation of an image from an initial size (e.g. 76,800 Bytes) to a final size (e.g. 256 bytes/one bit). In some embodiments, the frame embedding generator may be configured to generate a data representation for an image which may be a key frame or a frame. In some embodiments, the frame embedding generator 308 may be configured to convert an image at a particular location and orientation into a unique 256 byte string of numbers. An image 320 taken by a viewing device may be processed by the viewing device to detect features 324 in the image 320 (e.g. using a deep sparse feature method) and each feature 322 may be represented by a string of 32 numbers 326. The features 322 are jointly shown by block 310. There may, for example, be n=100 features and each feature is represented by a string of 32 numbers.

In some embodiments, the frame embedding generator 308 may include a multi-layer perceptron unit 312 and a maximum (max) pool unit 314. In some embodiments, the multi-layer perceptron (MLP) unit 312 may comprise a multi-layer perceptron, which may comprise a neural network. In some embodiments, the MLP unit 312 may be configured to perform matrix multiplication. The multi-layer perceptron unit 312 receives the plurality of features 322 of an image 320 and converts each feature to a respective string of 256 numbers. In the present example, there may be 100 features and each feature is represented by a byte size of 256 numbers. A matrix, in this example, may be created having 100 horizontal rows and 256 vertical columns. Each row has a series of 256 numbers that vary in magnitude with some being smaller and others being larger. In some embodiments, the output of the MLP may be an n×256 matrix 328, where n represents the number of features extracted from the image.

Figure 29D:
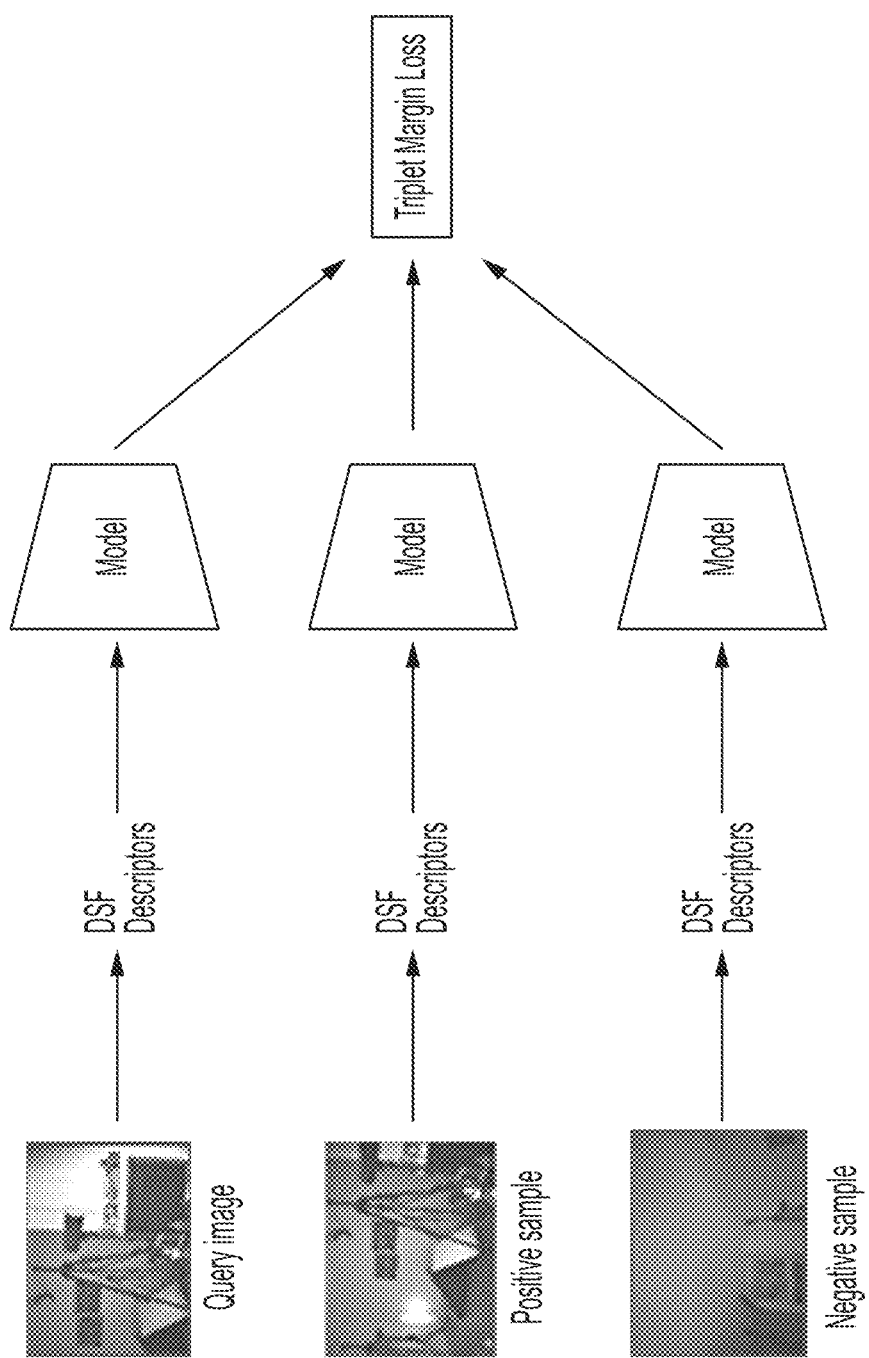
FIG. 29D is a block diagram illustrating a method of training a neural network, according to some embodiments.

In some embodiments, the MLP may comprise a neural network, which may have a training phase, e.g. to determine the model parameters, and a use phase. In some embodiments, the MLP may be trained as illustrated in FIG. 29D. The input training data may comprise data in sets of three, the set of three comprising 1) a query image, 2) a positive sample, and 3) a negative sample. The query image may be considered the reference image. The positive sample may comprise an image that is similar to the query image. For example, in some embodiments, similar may be having the same object in both the query and positive sample image but viewed from a different angle. In some embodiments, similar may be having the same object in both the query and positive sample image but having the object shifted (e.g. left, right, up, down) relative to the other image. The negative sample may comprise an image that is dissimilar to the query image. For example, in some embodiments, dissimilar may be having an object in the query image, but not in the sample image. In some embodiments, dissimilar may be having most of an object (e.g. >50%, or >75%) in the query image, but only a small portion of the same object in the negative sample (e.g. <10%, 1%). In some embodiments, features (e.g. sparse features) may be extracted from the images in the input training data and may be converted to descriptors. In some embodiments, a deep sparse feature (DSF) process may be used to generate the descriptors (e.g., DSF descriptors, feature descriptors) as described in U.S. patent application Ser. No. 16/190,948. In some embodiments, DSF descriptors are n×32 dimension. The descriptors may then be passed through the model/MLP to create a 256 byte output. In some embodiments, the model/MLP may be the MLP described in FIGS. 29A-29C. The 256 byte output from the MLP model may then be sent to a triplet margin loss module (and may only be used during the training phase, not during use phase of the MLP neural network). In some embodiments, the triplet margin loss module may be configured to minimize the difference between the 256 byte output from the query image and the 256 byte output from the positive sample, and to maximize the difference between the 256 byte output from the query image and the 256 byte output from the negative sample. In some embodiments, the training phase may comprise feeding a plurality of triplet input images into the learning process (e.g. MLP, model) to determine model parameters.

The max pool unit 314 analyzes each column to determine a maximum number in the respective column. The max pool unit 314 combines the maximum value of each column of numbers into a global feature string 316 of 256 numbers. The global feature string 316 is a relatively small number that takes up relatively little memory and is easily searchable. It is thus possible to search for images without analyzing each original frame from the camera and it is also cheaper to store 256 bytes instead of complete frames.

In some embodiments, the key frame filter 304 in FIG. 28 may filter the canonical maps 120 based on the global feature strings 316 of the canonical maps 120 and the global feature string 316 that is based on an image that is captured by the viewing device (e.g. an image that may be part of the local tracking map for a user). Each one of the canonical maps 120 in FIG. 27 thus has one or more global feature strings 316 associated therewith. In some embodiments, the global feature strings 316 may be acquired when a viewing device submits images or feature details to the server 20 and the server 20 processes the image or feature details to generate global feature strings 316 for the canonical maps 120. In some embodiments, the server 20 may receive feature details of a live/new/current image captured by a viewing device, the server 20 may generate a global feature string 316 for the live image, and filter the canonical maps 120 based on the live global feature strings 316. In some embodiments, the global feature string may be generated on the local viewing device. In some embodiments, the global feature string may be generated remotely, for example on the cloud or the server 20. In some embodiments, the viewing device may take one or more images, execute the process illustrated in FIG. 29C, and attach the global feature string 316 to the local tracking map. In some embodiments, the global feature string 316 may be a data representation of a frame or a key frame, in a local tracking map or a canonical map on the local device or the cloud.

In some embodiments, the server 20 may transmit the filtered canonical maps to the viewing device together with the global feature strings 316 associated with the filtered canonical maps. In some embodiments, when the viewing device localizes its tracking map to the canonical map, it may do so by matching the global feature strings 316 of the local tracking map with the global feature strings of the canonical map.

Ranking and Merging Maps

Described herein are methods and apparatus for ranking and merging a plurality of environment maps (e.g., canonical maps) in an X Reality (XR) system. To provide realistic XR experiences to users, the XR system must know the user's physical surroundings in order to correctly correlate locations of virtual objects in relation to real objects. Information about a user's physical surroundings may be obtained from an environment map for the user's location. An environment map may be created from image and depth information collected with sensors that are part of XR devices worn by users of the XR system. The environment maps may be constructed with information collected by sensors worn by the user of the system at various locations and times. Each environment map may include mapped points, each of which is associated with a three-dimensional (3D) world reconstruction of a real object in the environment.

The inventors have recognized and appreciated that an XR system could provide an enhanced XR experience to multiple users sharing a same world, comprising real and/or virtual content, by enabling efficient sharing of environment maps of the real/physical world collected by multiple users, whether those users are present in the world at the same or different times. However, there are significant challenges in providing such a system. Such a system may store multiple maps generated by multiple users and/or the system may store multiple maps generated at different times. For operations that might be performed with a previously generated map, such as localization, for example as described above, substantial processing may be required to identify a relevant environment map of a same world (e.g. same real world location) from all the environment maps collected in an XR system. In some embodiments, such as those described in FIGS. 8-26, there may only be a small number of environment maps a device could access, for example for localization. In some embodiments, such as described in relation to FIGS. 27-29C above for example, there may be a large number of environment maps a device could access. The inventors have recognized and appreciated techniques to quickly and accurately rank the relevance of environment maps out of all possible environment maps, such as the universe of all canonical maps 120 in FIG. 28, for example. A high ranking map may then be selected for further processing, such as to render virtual objects on a user display realistically interacting with the physical world around the user or merging map data collected by that user with stored maps to create larger or more accurate maps.

In some embodiments, a stored map that is relevant to a task for a user at a location in the physical world may be identified by filtering stored maps based on multiple criteria. Those criteria may indicate comparisons of a tracking map, generated by the wearable device of the user in the location, to candidate environment maps stored in a database, such as described above in regards to FIG. 27-29C, for example. The comparisons may be performed based on metadata associated with the maps, such as a Wi-Fi fingerprint detected by the device generating the map and/or set of BSSID's to which the device connected while forming the map. The comparisons may also be performed based on compressed or uncompressed content of the map. Comparisons based on a compressed representation may be performed, for example, by comparison of vectors computed from map content, such as described in FIGS. 29A-29C, for example. Comparisons based on un-compressed maps may be performed, for example, by localizing the tracking map within the stored map, or vice versa. Multiple comparisons may be performed in an order based on computation time needed to reduce the number of candidate maps for consideration, with comparisons involving less computation being performed earlier in the order than other comparisons requiring more computation.

Techniques as described herein may be used together or separately with many types of devices and for many types of scenes, including wearable or portable devices with limited computations resources that provide an XR scene. In some embodiments, the techniques may be implemented by one or more services that form a portion of an XR system.

Figure 30:
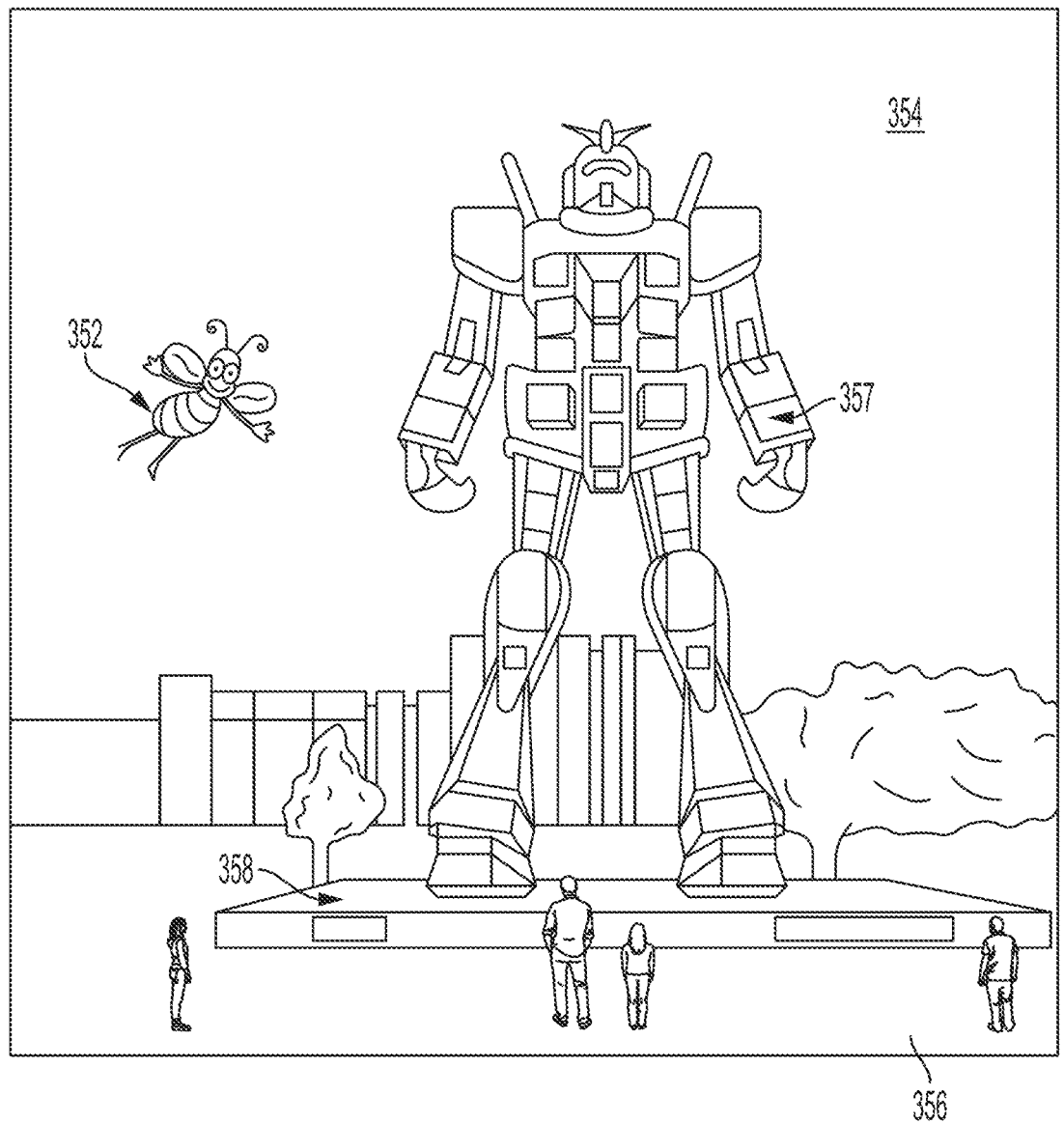
FIG. 30 is a sketch illustrating an example of a simplified augmented reality (AR) scene, according to some embodiments.
Figure 31:
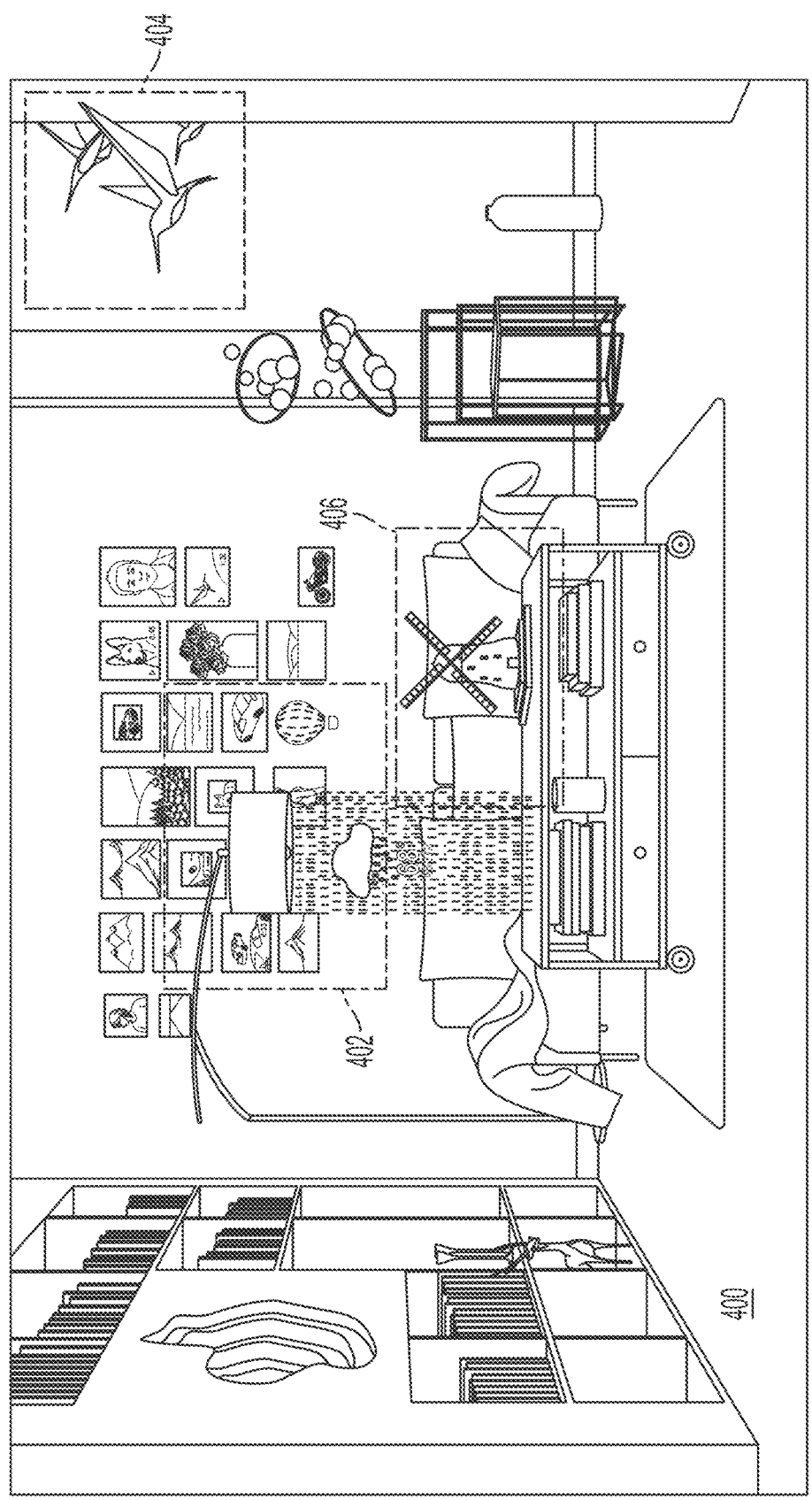
FIG. 31 is a sketch of an exemplary simplified AR scene, showing exemplary World Reconstruction use cases including visual occlusion, physics-based interactions, and environment reasoning, according to some embodiments.

FIGS. 30 and 31 illustrate such scenes. For purposes of illustration, an AR system is used as an example of an XR system. FIGS. 32-35 illustrate an exemplary AR system, including one or more processors, memory, sensors and user interfaces that may operate according to the techniques described herein.

Referring to FIG. 30, an outdoor AR scene 354 is depicted wherein a user of an AR technology sees a physical world park-like setting 356, featuring people, trees, buildings in the background, and a concrete platform 358. In addition to these items, the user of the AR technology also perceives that they "see" a robot statue 357 standing upon the physical world concrete platform 358, and a cartoon-like avatar character 352 flying by which seems to be a personification of a bumble bee, even though these elements (e.g., the avatar character 352, and the robot statue 357) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that includes a world reconstruction component, which may build and update a digital representation of the physical world surfaces around the user. This representation may be used to occlude rendering, to place virtual objects, in physics based interactions, and for virtual character path planning and navigation, or for other operations in which information about the physical world is used. FIG. 31 depicts another example of an indoor AR scene 400, showing exemplary world reconstruction use cases, including visual occlusion 402, physics-based interactions 404, and environment reasoning 406, according to some embodiments.

The exemplary scene 400 is a living room having walls, a bookshelf on one side of a wall, a floor lamp at a corner of the room, a floor, a sofa, and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table. For the images on the wall, the AR technology requires information about not only surfaces of the wall but also objects and surfaces in the room such as lamp shape, which are occluding the images to render the virtual objects correctly. For the flying birds, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may determine that it is movable, whereas corners of shelves or corners of the wall may be determined to be stationary. Such a distinction may be used in determinations as to which portions of the scene are used or updated in each of various operations.

A scene may be presented to the user via a system that includes multiple components, including a user interface that can stimulate one or more user senses, including sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or may be distributed across multiple interconnected devices. In some embodiments, some or all of these components may be integrated into a wearable device.

Figure 32:
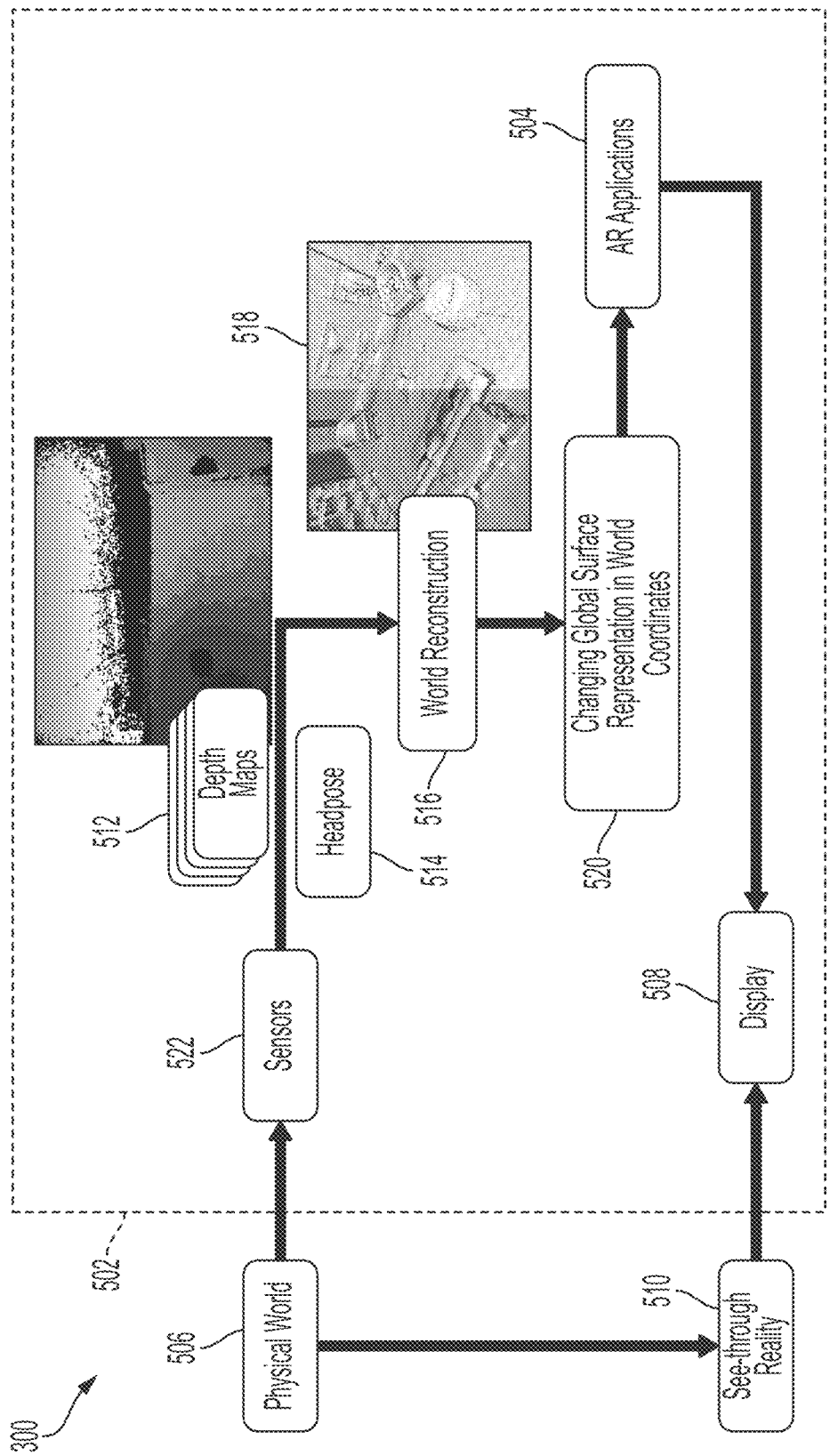
FIG. 32 is a schematic diagram illustrating data flow in an AR system configured to provide an experience of AR contents interacting with a physical world, according to some embodiments.

FIG. 32 depicts an AR system 502 configured to provide an experience of AR contents interacting with a physical world 506, according to some embodiments. The AR system 502 may include a display 508. In the illustrated embodiment, the display 508 may be worn by the user as part of a headset such that a user may wear the display over their eyes like a pair of goggles or glasses. At least a portion of the display may be transparent such that a user may observe a see-through reality 510. The see-through reality 510 may correspond to portions of the physical world 506 that are within a present viewpoint of the AR system 502, which may correspond to the viewpoint of the user in the case that the user is wearing a headset incorporating both the display and sensors of the AR system to acquire information about the physical world.

AR contents may also be presented on the display 508, overlaid on the see-through reality 510. To provide accurate interactions between AR contents and the see-through reality 510 on the display 508, the AR system 502 may include sensors 522 configured to capture information about the physical world 506.

The sensors 522 may include one or more depth sensors that output depth maps 512. Each depth map 512 may have multiple pixels, each of which may represent a distance to a surface in the physical world 506 in a particular direction relative to the depth sensor. Raw depth data may come from a depth sensor to create a depth map. Such depth maps may be updated as fast as the depth sensor can form a new image, which may be hundreds or thousands of times per second. However, that data may be noisy and incomplete, and have holes shown as black pixels on the illustrated depth map.

The system may include other sensors, such as image sensors. The image sensors may acquire monocular or stereoscopic information that may be processed to represent the physical world in other ways. For example, the images may be processed in world reconstruction component 516 to create a mesh, representing connected portions of objects in the physical world. Metadata about such objects, including for example, color and surface texture, may similarly be acquired with the sensors and stored as part of the world reconstruction.

The system may also acquire information about the headpose of the user with respect to the physical world. In some embodiments, sensors 522 may include inertial measurement units that may be used to compute and/or determine a headpose 514. A headpose 514 for a depth map may indicate a present viewpoint of a sensor capturing the depth map with six degrees of freedom (6 DoF), for example, but the headpose 514 may be used for other purposes, such as to relate image information to a particular portion of the physical world or to relate the position of the display worn on the user's head to the physical world. In some embodiments, the headpose information may be derived in other ways than from an IMU, such as from analyzing objects in an image.

The world reconstruction component 516 may receive the depth maps 512 and headposes 514, and any other data from the sensors, and integrate that data into a reconstruction 518. The reconstruction 518 may be more complete and less noisy than the sensor data. The world reconstruction component 516 may update the reconstruction 518 using spatial and temporal averaging of the sensor data from multiple viewpoints over time.

The reconstruction 518 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 518, portions of the physical world are presented as a global surface; on the right side of the reconstruction 518, portions of the physical world are presented as meshes.

The reconstruction 518 may be used as or processed into a map providing information about the portion of the physical world represented by the reconstruction. The map may indicate locations of key points and/or structures, such as edges and/or planes. Additionally, the map may include information about a pose of a user from which the points or structures are observable to a user, which in some embodiments may be called a key frame or a key rig. In the illustrated embodiment, the map represents the portion of the physical world in which a user of a single, wearable device is present. In combination with content characterizing that portion of the physical world, the map may include metadata. The metadata, for example, may indicate time of capture of the sensor information used to form the map. Metadata alternatively or additionally may indicate location of the sensors at the time of capture of information used to form the map. Location may be expressed directly, such as with information from a GPS chip, or indirectly, such as with a Wi-Fi signature indicating strength of signals received from one or more wireless access points while the sensor data was being collected and/or with the BSSID's of wireless access points to which the user device connected while the sensor data was collected.

The reconstruction 518 may be used for AR functions, such as producing a surface representation of the physical world for occlusion processing or physics-based processing. This surface representation may change as the user moves or objects in the physical world change. Aspects of the reconstruction 518 may be used, for example, by a component 520 that produces a changing global surface representation in world coordinates, which may be used by other components.

The AR content may be generated based on this information, such as by AR applications 504. An AR application 504 may be a game program, for example, that performs one or more functions based on information about the physical world, such as visual occlusion, physics-based interactions, and environment reasoning. It may perform these functions by querying data in different formats from the reconstruction 518 produced by the world reconstruction component 516. In some embodiments, component 520 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 504 may use this information to generate and update the AR contents. The virtual portion of the AR contents may be presented on the display 508 in combination with the see-through reality 510, creating a realistic user experience.

Figure 33:
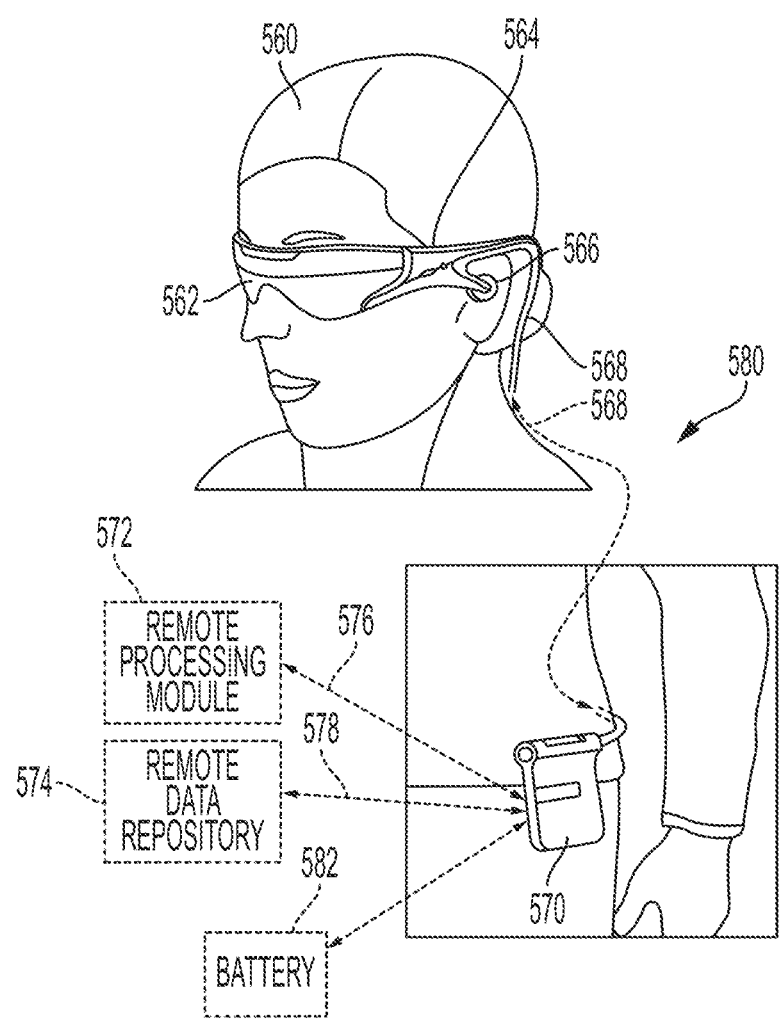
FIG. 33 is a schematic diagram illustrating an example of an AR display system, according to some embodiments.

In some embodiments, an AR experience may be provided to a user through a wearable display system. FIG. 33 illustrates an example of wearable display system 580 (hereinafter referred to as "system 580"). The system 580 includes a head mounted display device 562 (hereinafter referred to as "display device 562"), and various mechanical and electronic modules and systems to support the functioning of the display device 562. The display device 562 may be coupled to a frame 564, which is wearable by a display system user or viewer 560 (hereinafter referred to as "user 560") and configured to position the display device 562 in front of the eyes of the user 560. According to various embodiments, the display device 562 may be a sequential display. The display device 562 may be monocular or binocular. In some embodiments, the display device 562 may be an example of the display 508 in FIG. 32.

In some embodiments, a speaker 566 is coupled to the frame 564 and positioned proximate an ear canal of the user 560. In some embodiments, another speaker, not shown, is positioned adjacent another ear canal of the user 560 to provide for stereo/shapeable sound control. The display device 562 is operatively coupled, such as by a wired lead or wireless connectivity 568, to a local data processing module 570 which may be mounted in a variety of configurations, such as fixedly attached to the frame 564, fixedly attached to a helmet or hat worn by the user 560, embedded in headphones, or otherwise removably attached to the user 560 (e.g., in a backpack-style configuration, in a belt-coupling style configuration).

The local data processing module 570 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 564) or otherwise attached to the user 560, such as image capture devices (such as cameras), microphones, inertial measurement units, accelerometers, compasses, GPS units, radio devices, and/or gyros; and/or b) acquired and/or processed using remote processing module 572 and/or remote data repository 574, possibly for passage to the display device 562 after such processing or retrieval.

The local data processing module 570 may be operatively coupled by communication links 576, 578, such as via a wired or wireless communication links, to the remote processing module 572 and remote data repository 574, respectively, such that these remote modules 572, 574 are operatively coupled to each other and available as resources to the local data processing module 570. In some embodiments, the world reconstruction component 516 in FIG. 32 may be at least partially implemented in the local data processing module 570. For example, the local data processing module 570 may be configured to execute computer executable instructions to generate the physical world representations based at least in part on at least a portion of the data.

In some embodiments, processing may be distributed across local and remote processors. For the world reconstruction component 516, for example, local processing may be used to construct a map on a user device (e.g. tracking map) based on sensor data collected with sensors on that user's device. Such a map may be used by applications on that user's device. Additionally, previously created environment maps (e.g. world maps and/or canonical maps) may be stored in remote data repository 574. Where a suitable stored environment map is available, it may be used instead of or in addition to the tracking map. The environment map might be loaded on the user device to allow the user device to render virtual content without a delay associated with scanning a location and building a tracking map from sensor data acquired during the scan. Alternatively or additionally, the tracking map may be merged with previously stored environment maps to extend or improve the quality of those environment maps. The processing to determine whether a suitable previously created environment map is available and/or to merge a tracking map with one or more stored environment maps may be done in local data processing module 570 or remote processing module 572.

In some embodiments, the local data processing module 570 may include one or more processors (e.g., a graphics processing unit (GPU)) configured to analyze and process data and/or image information. In some embodiments, the local data processing module 570 may include a single processor (e.g., a single-core or multi-core ARM processor), which would limit the local data processing module 570's compute budget but enable a more miniature device. In some embodiments, the world reconstruction component 516 may use a compute budget less than a single Advanced RISC Machine (ARM) core to generate physical world representations in real-time on a non-predefined space such that the remaining compute budget of the single ARM core can be accessed for other uses such as, for example, extracting meshes.

In some embodiments, the remote data repository 574 may include a digital data storage facility, which may be available through the Internet or other networking configuration in a "cloud" resource configuration. In some embodiments, all data is stored and all computations are performed in the local data processing module 570, allowing fully autonomous use from a remote module. In some embodiments, all data is stored and all or most computations are performed in the remote data repository 574, allowing for a smaller device. A world reconstruction, for example, may be stored in whole or in part in this repository 574.

In embodiments in which data is stored remotely, and accessible over a network, data may be shared by multiple users of an augmented reality system. For example, user devices may upload their tracking maps which may be stored in a database of environment maps. In some embodiments the tracking map upload occurs at the end of a session. In some embodiments, the tracking map uploads may occur continuously, semi-continuously, intermittently, at a pre-defined time, after a pre-defined period from the previous upload, or when triggered by an event. A tracking map uploaded by any user device may be used to expand or improve a previously stored environment map, whether based on data from that user device or any other user device. Likewise, an environment map downloaded to a user device may be based on data from that user device or any other user device. In this way, high quality environment maps may be readily available to users to improve their experiences with the AR system.

In some embodiments, the local data processing module 570 is operatively coupled to a battery 582. In some embodiments, the battery 582 is a removable power source, such as over the counter batteries. In other embodiments, the battery 582 is a lithium-ion battery. In some embodiments, the battery 582 includes both an internal lithium-ion battery chargeable by the user 560 during non-operation times of the system 580 and removable batteries such that the user 560 may operate the system 580 for longer periods of time without having to be tethered to a power source to charge the lithium-ion battery or having to shut the system 580 off to replace batteries.

Figure 34A:
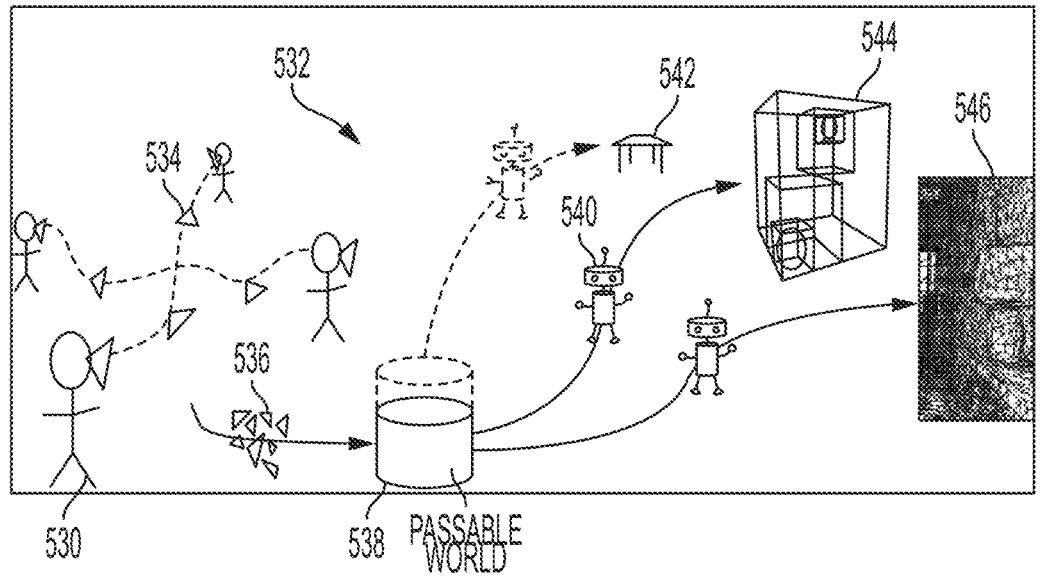
FIG. 34A is a schematic diagram illustrating a user wearing an AR display system rendering AR content as the user moves through a physical world environment, according to some embodiments.

FIG. 34A illustrates a user 530 wearing an AR display system rendering AR content as the user 530 moves through a physical world environment 532 (hereinafter referred to as "environment 532"). The user 530 positions the AR display system at positions 534, and the AR display system records ambient information of a passable world (e.g., a digital representation of the real objects in the physical world that can be stored and updated with changes to the real objects in the physical world) relative to the positions 534 such as pose relation to mapped features or directional audio inputs. The positions 534 are aggregated to data inputs 536 and processed at least by a passable world module 538, which may be implemented, for example, by processing on a remote processing module 572 of FIG. 33. In some embodiments, the passable world module 538 may include the world reconstruction component 516. FIG. 35B depicts component architecture of a PW, according to some embodiments.

The passable world module 538 determines, at least in part, where and how AR content 540 can be placed in the physical world as determined from the data inputs 536. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 542 (e.g., a table) from a reconstruction (e.g., the reconstruction 518) to determine the shape and position of the AR content 540. As an example, the fixed element may be a table and the virtual content may be positioned such that it appears to be on that table. In some embodiments, the AR content may be placed within structures in a field of view 544, which may be a present field of view or an estimated future field of view. In some embodiments, the AR content may be persisted relative to a mapped (e.g. mesh) model 546 of the physical world.

As depicted, the fixed element 542 serves as a proxy (e.g. digital copy) for any fixed element within the physical world which may be stored in the passable world module 538 so that the user 530 can perceive content on the fixed element 542 without the system having to map to the fixed element 542 each time the user 530 sees it. The fixed element 542 may, therefore, be a mapped mesh model from a previous modeling session or determined from a separate user but nonetheless stored on the passable world module 538 for future reference by a plurality of users. Therefore, the passable world module 538 may recognize the environment 532 from a previously mapped environment and display AR content without a device of the user 530 mapping all or part of the environment 532 first, saving computation process and cycles and avoiding latency of any rendered AR content.

The mapped mesh model 546 of the physical world may be created by the AR display system and appropriate surfaces and metrics for interacting and displaying the AR content 540 can be mapped and stored in the passable world module 538 for future retrieval by the user 530 or other users without the need to completely or partially re-map or model. In some embodiments, the data inputs 536 are inputs such as geolocation, user identification, and current activity to indicate to the passable world module 538 which fixed element 542 of one or more fixed elements are available, which AR content 540 has last been placed on the fixed element 542, and whether to display that same content (such AR content being "persistent" content regardless of user viewing a particular passable world model).

Even in embodiments in which objects are considered to be fixed (e.g. kitchen table), the passable world module 538 may be updated from time to time to account for the possibility of changes in the physical world. The model of fixed objects may be updated with a very low frequency. Other objects in the physical world may be moving or otherwise not regarded as fixed (e.g. kitchen chairs). To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 34B:
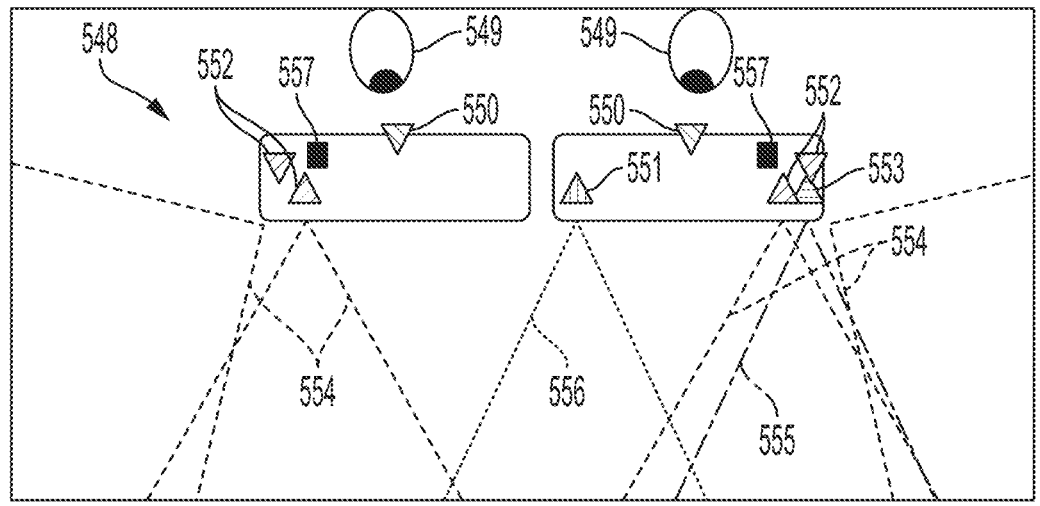
FIG. 34B is a schematic diagram illustrating a viewing optics assembly and attendant components, according to some embodiments.

FIG. 34B is a schematic illustration of a viewing optics assembly 548 and attendant components. In some embodiments, two eye tracking cameras 550, directed toward user eyes 549, detect metrics of the user eyes 549, such as eye shape, eyelid occlusion, pupil direction and glint on the user eyes 549. In some embodiments, one of the sensors may be a depth sensor 551, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 552 record a greater-than-peripheral view to map the environment 532 and detect inputs that may affect AR content. In some embodiments, the world camera 552 and/or camera 553 may be grayscale and/or color image sensors, which may output grayscale and/or color image frames at fixed time intervals. Camera 553 may further capture physical world images within a field of view of the user at a specific time. Pixels of a frame-based image sensor may be sampled repetitively even if their values are unchanged. Each of the world cameras 552, the camera 553 and the depth sensor 551 have respective fields of view of 554, 555, and 556 to collect data from and record a physical world scene, such as the physical world environment 532 depicted in FIG. 34A.

Inertial measurement units 557 may determine movement and orientation of the viewing optics assembly 548. In some embodiments, each component is operatively coupled to at least one other component. For example, the depth sensor 551 is operatively coupled to the eye tracking cameras 550 as a confirmation of measured accommodation against actual distance the user eyes 549 are looking at.

It should be appreciated that a viewing optics assembly 548 may include some of the components illustrated in FIG. 34B and may include components instead of or in addition to the components illustrated. In some embodiments, for example, a viewing optics assembly 548 may include two world camera 552 instead of four. Alternatively or additionally, cameras 552 and 553 need not capture a visible light image of their full field of view. A viewing optics assembly 548 may include other types of components. In some embodiments, a viewing optics assembly 548 may include one or more dynamic vision sensor (DVS), whose pixels may respond asynchronously to relative changes in light intensity exceeding a threshold.

In some embodiments, a viewing optics assembly 548 may not include the depth sensor 551 based on time of flight information. In some embodiments, for example, a viewing optics assembly 548 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 551.

It also should be appreciated that the configuration of the components in FIG. 34B is illustrated as an example. A viewing optics assembly 548 may include components with any suitable configuration, which may be set to provide the user with the largest field of view practical for a particular set of components. For example, if a viewing optics assembly 548 has one world camera 552, the world camera may be placed in a center region of the viewing optics assembly instead of at a side.

Information from the sensors in viewing optics assembly 548 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface. Regardless of how content is presented to a user, a model of the physical world is required so that characteristics of the virtual objects, which can be impacted by physical objects, including the shape, position, motion and visibility of the virtual object, can be correctly computed. In some embodiments, the model may include the reconstruction of a physical world, for example, the reconstruction 518.

That model may be created from data collected from sensors on a wearable device of the user. Though, in some embodiments, the model may be created from data collected by multiple users, which may be aggregated in a computing device remote from all of the users (and which may be "in the cloud").

Figure 35A:
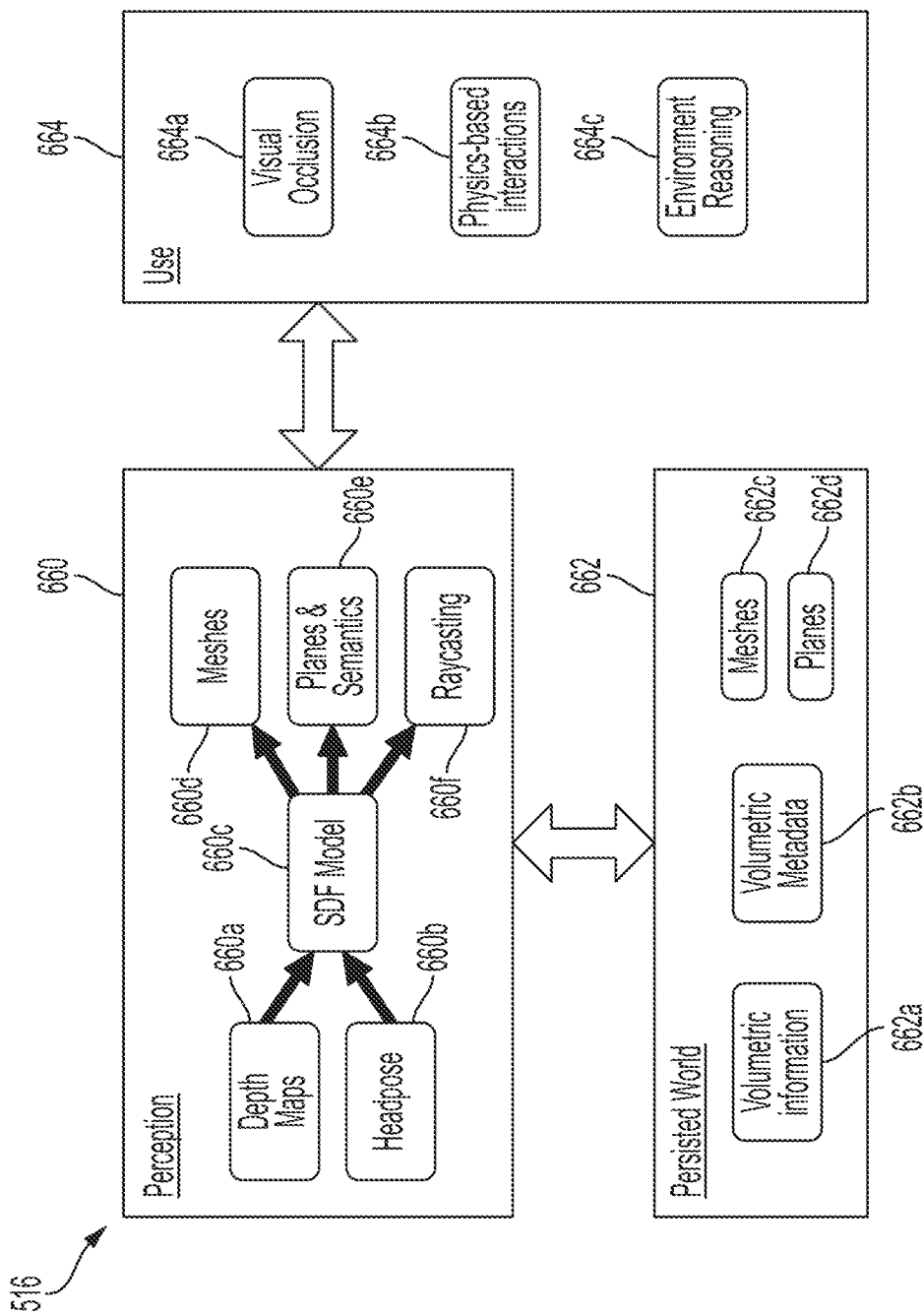
FIG. 35A is a schematic diagram illustrating an AR system using a world reconstruction system, according to some embodiments.
Figure 35B:
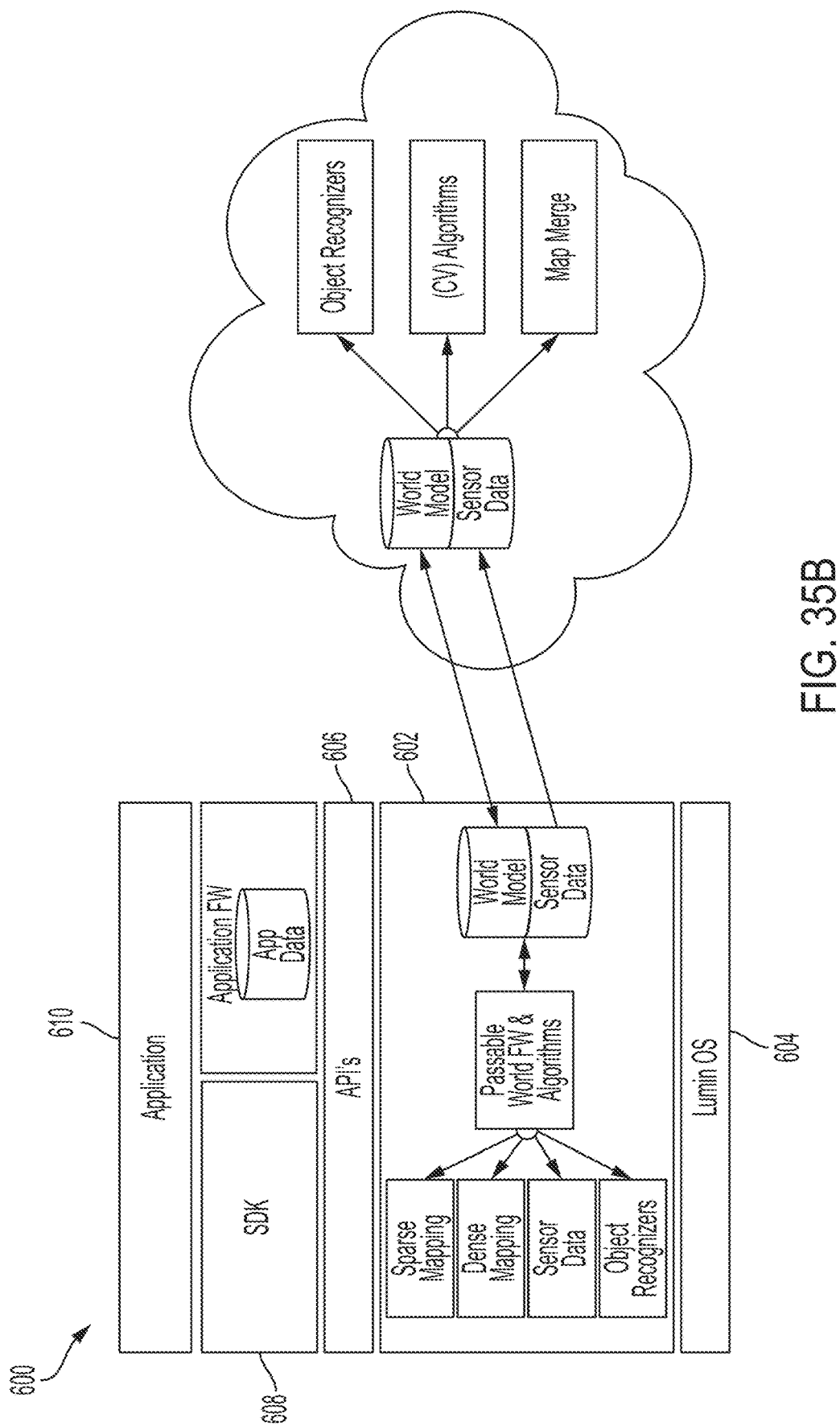
FIG. 35B is a schematic diagram illustrating a passable world, according to some embodiments.

The model may be created, at least in part, by a world reconstruction system, for example, the world reconstruction component 516 of FIG. 32 depicted in more detail in FIG. 35A. The world reconstruction component 516 may include a perception module 660 that may generate, update, and store representations for a portion of the physical world. In some embodiments, the perception module 660 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown.

In addition to generating information for a persisted world representation, the perception module 660 may identify and output indications of changes in a region around a user of an AR system. Indications of such changes may trigger updates to volumetric data stored as part of the persisted world, or trigger other functions, such as triggering components 604 that generate AR content to update the AR content.

In some embodiments, the perception module 660 may identify changes based on a signed distance function (SDF) model. The perception module 660 may be configured to receive sensor data such as, for example, depth maps 660a and headposes 660b, and then fuse the sensor data into a SDF model 660c. Depth maps 660a may provide SDF information directly, and images may be processed to arrive at SDF information. The SDF information represents distance from the sensors used to capture that information. As those sensors may be part of a wearable unit, the SDF information may represent the physical world from the perspective of wearable unit and therefore the perspective of the user. The headposes 660b may enable the SDF information to be related to a voxel in the physical world.

In some embodiments, the perception module 660 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may operate reliably over a range of distances, creating the observation range of the sensor, which may be from a few centimeters or tens of centimeters to a few meters.

The world reconstruction component 516 may include additional modules that may interact with the perception module 660. In some embodiments, a persisted world module 662 may receive representations for the physical world based on data acquired by the perception module 660. The persisted world module 662 also may include various formats of representations of the physical world. In some embodiments, representations of the physical world may be images, features from images, descriptors of features, key frames/keyrigs, persistent poses, PCFs, and/or global feature strings. For example, volumetric metadata 662b such as voxels may be stored as well as meshes 662c and planes 662d. In some embodiments, other information, such as depth maps could be saved.

In some embodiments, the perception module 660 may include modules that generate representations for the physical world in various formats including, for example, meshes 660d, planes and semantics 660e. These modules may generate representations based on data within the perception range of one or more sensors at the time the representation is generated as well as data captured at prior times and information in the persisted world module 662. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 660 detects a change in the physical world in that subregion. Such a change, for example, may be detected by detecting a new surface in the SDF model 660c or other criteria, such as changing the value of a sufficient number of voxels representing the subregion.

The world reconstruction component 516 may include components 664 that may receive representations of the physical world from the perception module 660. Information about the physical world may be pulled by these components according to, for example, a use request from an application. In some embodiments, information may be pushed to the use components, such as via an indication of a change in a pre-identified region or a change of the physical world representation within the perception range. The components 664, may include, for example, game programs and other components that perform processing for visual occlusion, physics-based interactions, and environment reasoning.

Responding to the queries from the components 664, the perception module 660 may send representations for the physical world in one or more formats. For example, when the component 664 indicates that the use is for visual occlusion or physics-based interactions, the perception module 660 may send a representation of surfaces. When the component 664 indicates that the use is for environmental reasoning, the perception module 660 may send meshes, planes and semantics of the physical world.

In some embodiments, the perception module 660 may include components that format information to provide the component 664. An example of such a component may be raycasting component 660f. A use component (e.g., component 664), for example, may query for information about the physical world from a particular point of view. Raycasting component 660f may select from one or more representations of the physical world data within a field of view from that point of view.

As should be appreciated from the foregoing description, the perception module 660, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification.

A world reconstruction system may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction. The reconstruction may be more complete and less noisy than the original sensor data by using spatial and temporal averaging (i.e. averaging data from multiple viewpoints over time), or any other suitable method.

The reconstruction may contain data of different levels of sophistication including, for example, raw data such as live depth data, fused volumetric data such as voxels, and computed data such as meshes.

A passable world (PW) (e.g., PW 538) may include environment maps created based, at least in part, on data reconstructed by world reconstruction systems of AR devices worn by multiple users. During a session of an AR experience, individual AR devices (such as wearable devices described above in connection with FIG. 33) may create tracking maps (TMs). In some embodiments, a tracking map may include a sparse map of headposes of the AR device scanning an environment as well as information about objects detected within that environment. The AR device may send the tracking map to a cloud to, for example, merge with environment maps selected from environment maps stored in the cloud. In some embodiments, the selected environment maps may be sent from the cloud to the AR device for merging.

Figure 36:
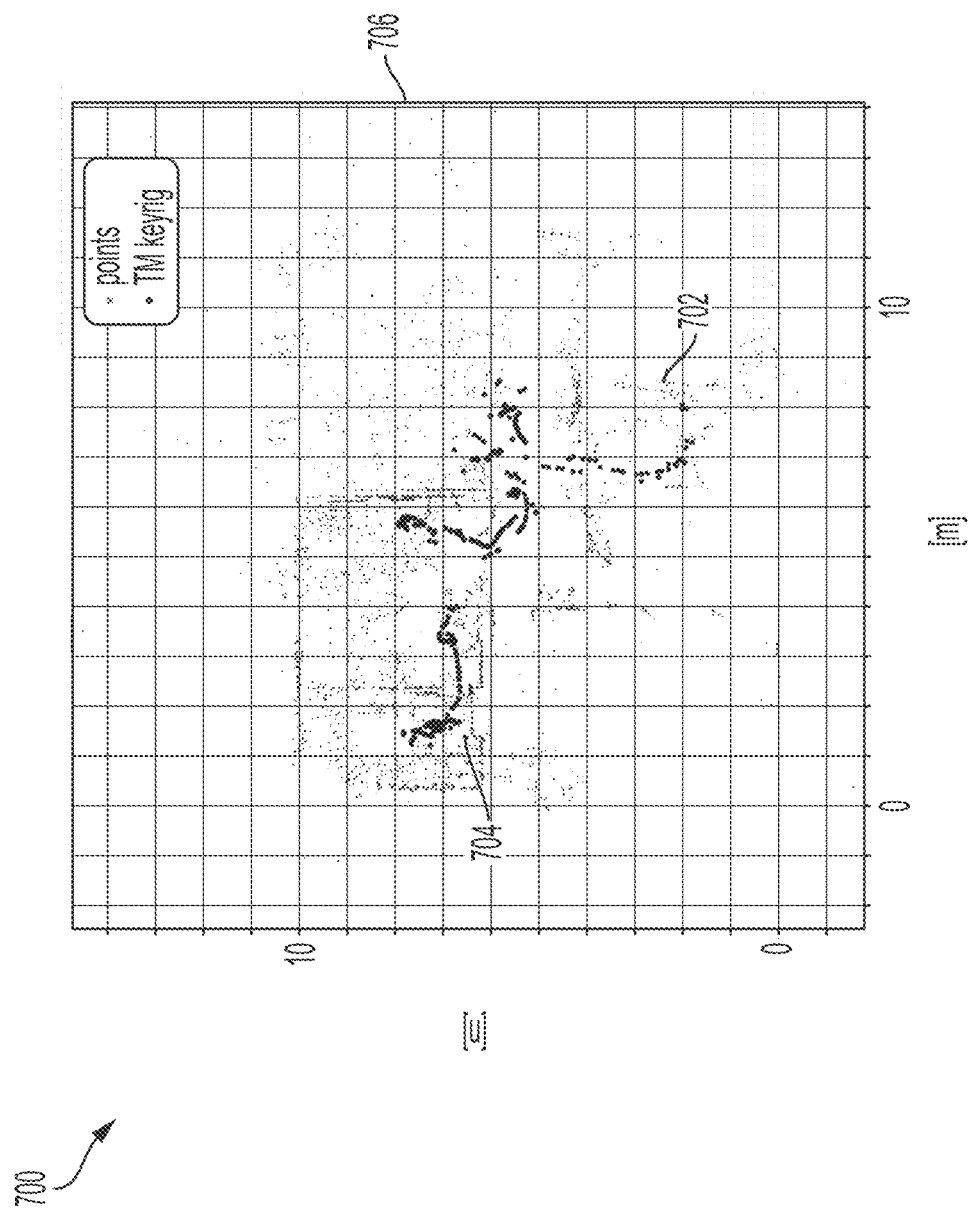
FIG. 36 is an exemplary environment map, according to some embodiments.

The environment maps may provide information about the portions of the physical world represented by the reconstruction data processed to create respective maps. FIG. 36 depicts an exemplary environment map 700, according to some embodiments. The environment map 700 may include a floor plan 706 of reconstructed physical objects in a corresponding physical world, represented by points 702. The environment map 700 may also include tracking routes 710, along which a device collecting data on points 702 traveled. The tracking routes 710 may include keyrigs 704, which may represent a location where an AR device uploaded reconstruction data and associated metadata, such as headposes and/or image data. In some embodiments, a keyrig may also be called a key frame. In the illustrated example, the environment map includes two tracking routes 710a and 710b, which may indicate that the environment map 700 is created by merging two tracking maps: one is created along the tracking route 710a; the other is created along the tracking route 710b. In some embodiments, the two tracking maps may be created by two different AR devices at the same time, two different AR devices at different times, or the same AR device at different times. In some embodiments, the two tracking maps may be created by one AR device and uploaded to the cloud through two network access points, each of which may be accessible within a designated area range.

The environment maps may have any of multiple formats depending on, for example, the storage locations of an environment map including, for example, local storage of AR devices and remote storage. For example, a map in remote storage may have higher resolution than a map in local storage. To send a higher resolution map from remote storage to local storage, the map may be down sampled or otherwise converted to an appropriate format. In some embodiments, a slice or portion of a high resolution map from remote storage is sent to local storage, where the slice or portion is not down sampled.

A database of the environment maps may be updated when a new tracking map is created. To determine which of a potentially very large number of environment maps in a database is to be updated, updating may include efficiently selecting one or more environment maps stored in the database relevant to the new tracking map. The selected one or more environment maps may be ranked by relevance and one or more of the highest ranking maps may be selected for processing to merge higher ranked selected environment maps with the new tracking map to create one or more updated environment maps.

Figure 37:
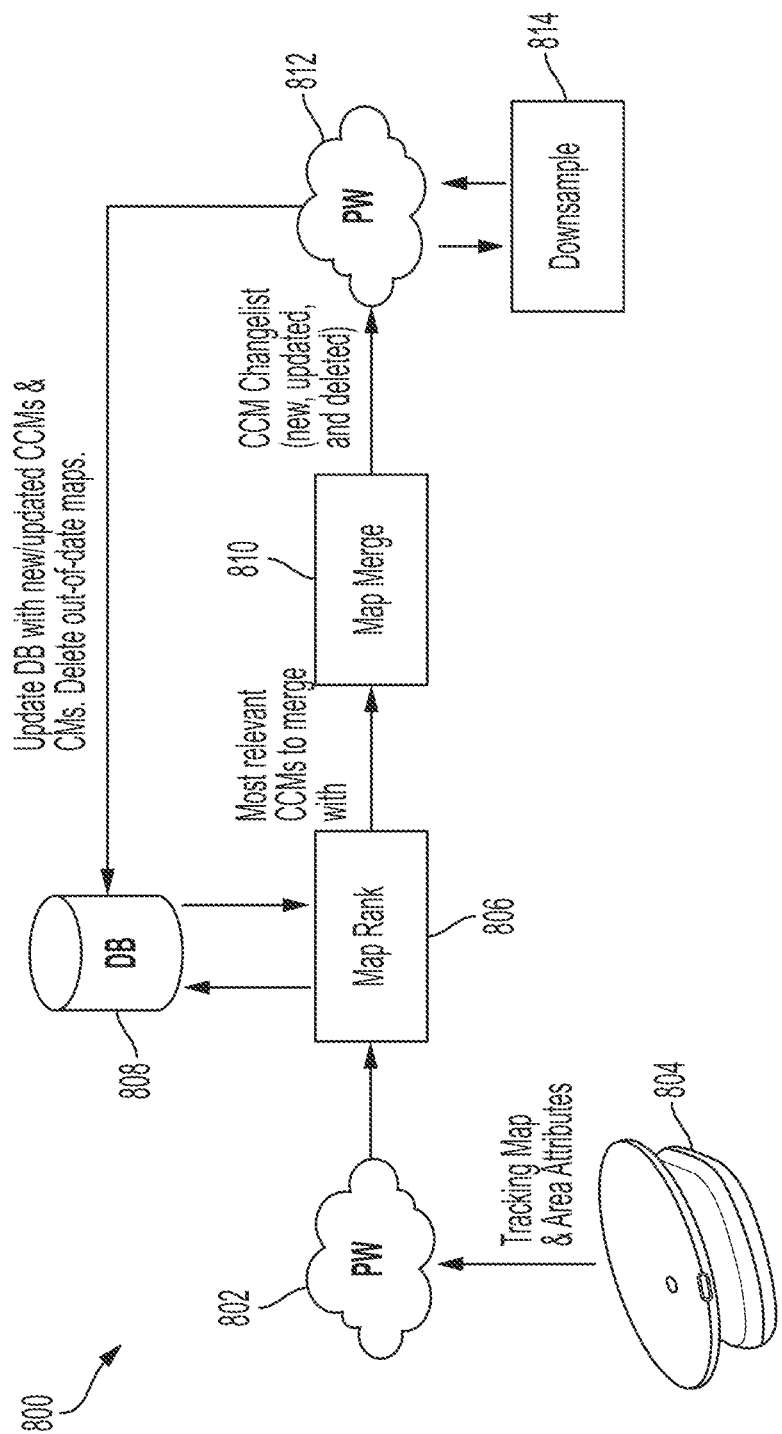
FIG. 37 is a schematic diagram illustrating an AR system configured to rank and merge a plurality of environment maps, according to some embodiments.

FIG. 37 depicts an AR system 800 configured to rank and merge one or more environment maps, according to some embodiments. The AR system may include a passable world model 802 of an AR device. Information to populate the passable world model 802 may come from sensors on the AR device, which may include computer executable instructions stored in a processor 804 (e.g., a local data processing module 570), which may perform some or all of the processing to convert sensor data into a map. Such a map may be a tracking map, as it can be built as sensor data is collected as the AR device operates in a region. Along with that tracking map, area attributes may be supplied so as to indicate area that the tracking map represents. These area attributes may be a geographic location identifier, such as coordinates presented as latitude and longitude or an ID used by the AR system to represent a location. Alternatively or additionally, the area attributes may be measured characteristics that have a high likelihood of being unique for that area. The area attributes, for example, may be derived from parameters of wireless networks detected in the area. In some embodiments, the area attribute may be associated with a unique address of an access-point the AR system is nearby and/or connected to. For example, the area attribute may be associated with a MAC address or basic service set identifiers (BSSIDs) of a 5G base station/router, a Wi-Fi router, and the like.

In the example of FIG. 37, the tracking maps may be merged with other maps of the environment. A map rank portion 806 receives tracking maps from the device PW 802 and communicates with a map database 808 to select and rank environment maps selected from the map database 808. Higher ranked, selected maps are sent to a map merge portion 810.

The map merge portion 810 may perform merge processing on the maps sent from the map rank portion 806. Merge processing may entail merging the tracking map with some or all of the ranked maps and transmitting the new, merged maps to a passable world model 812. Passable world model 812 may be a cloud model, which may be shared by multiple AR devices. Passable world model 812 may store or otherwise have access to those environment maps in map database 808. In some embodiments, when a previously computed environment map is updated, the prior version of that map may be deleted so as to remove out of date maps from the database. In some embodiments, when a previously computed environment map is updated, the prior version of that map may be archived enabling retrieving/viewing prior versions of an environment. In some embodiments, permissions may be set such that only AR systems having certain read/write access may trigger prior versions of maps being deleted/archived.

These environment maps created from tracking maps supplied by one or more AR devices/systems may be accessed by AR devices in the AR system. The map rank portion 806 also may be used in supplying environment maps to an AR device. The AR device may send a message requesting an environment map for its current location, and map rank portion 806 may be used to select and rank environment maps relevant to the requesting device.

In some embodiments, the AR system 800 may include a downsample portion 814 configured to receive the merged maps from the cloud PW 812. The received merged maps from the cloud PW 812 may be in a storage format for the cloud, which may include dense information. The downsample portion 814 may be configured to downsample the cloud format maps to a format suitable for storage on AR devices. The device format maps may be sparse to accommodate the limited local computing power and storage space of AR devices.

U.S. provisional patent application No. 62/812,935 entitled "Merging a Plurality of Individually Mapped Environments" describes exemplary methods and apparatus of merging environment maps. A copy of the filed version of U.S. App. No. 62/812,935 is attached as an appendix and is hereby incorporated by reference in its entirety for all purposes. Techniques as described in that application may be used for merging environment maps.

Figure 38:
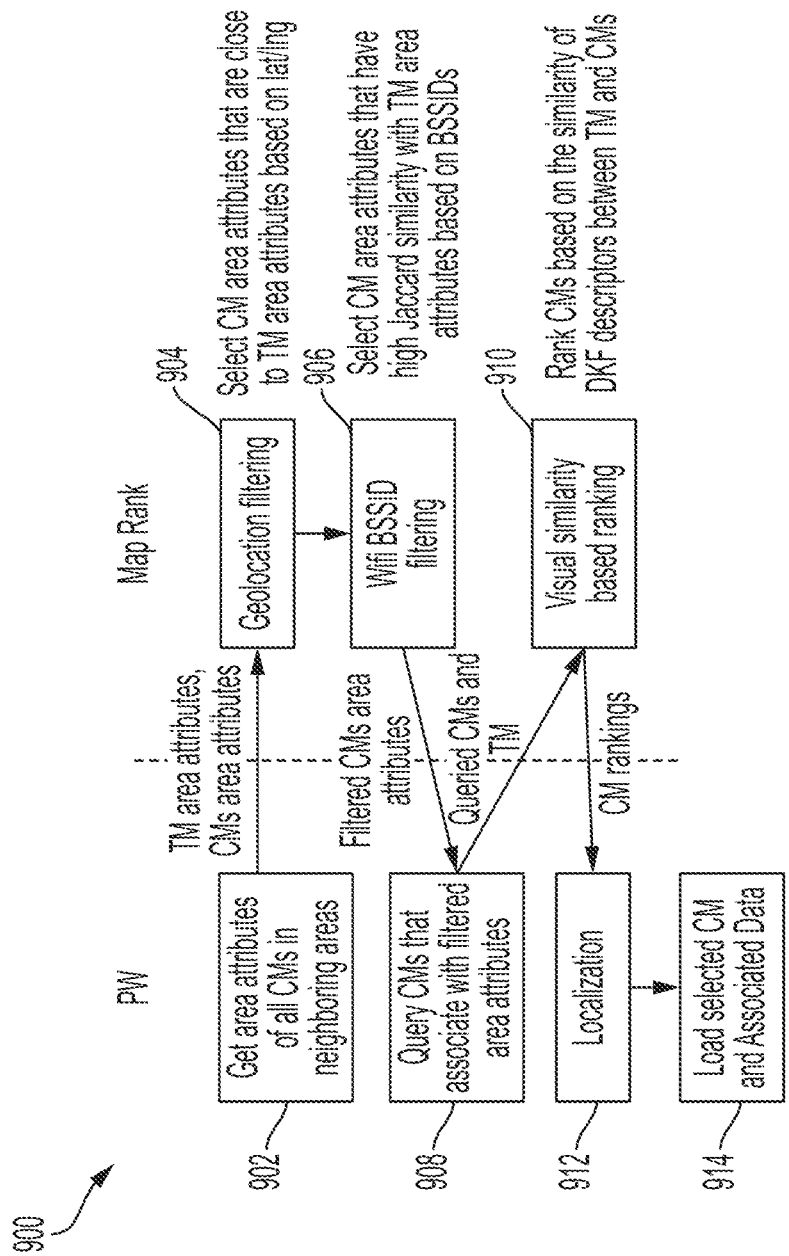
FIG. 38 is flow chart illustrating a method of selecting a plurality of ranked environment maps, according to some embodiments.

FIG. 38 is flow chart illustrating a method 900 of selecting one or more ranked environment maps, according to some embodiments. In the illustrated embodiment, the ranking is performed for a user's AR device that is creating a tracking map. Accordingly, the tracking map is available for use in ranking environment maps. In embodiments in which the tracking map is not available, some or all of portions of the selection and ranking of environment maps that do not expressly rely on the tracking map may be used.

The method 900 may start at Act 902, where a set of maps from a database of environment maps (sometimes referred to as canonical maps) that are in the neighborhood of the location where the tracking map was formed may be accessed and then filtered for ranking. Additionally, at Act 902, at least one area attribute for the area in which the user's AR device is operating is determined. In scenarios in which the user's AR device is constructing a tracking map, the area attributes may correspond to the area over which the tracking map was created. As a specific example, the area attributes may be computed based on received signals from access points to computer networks while the AR device was computing the tracking map.

Figure 39:
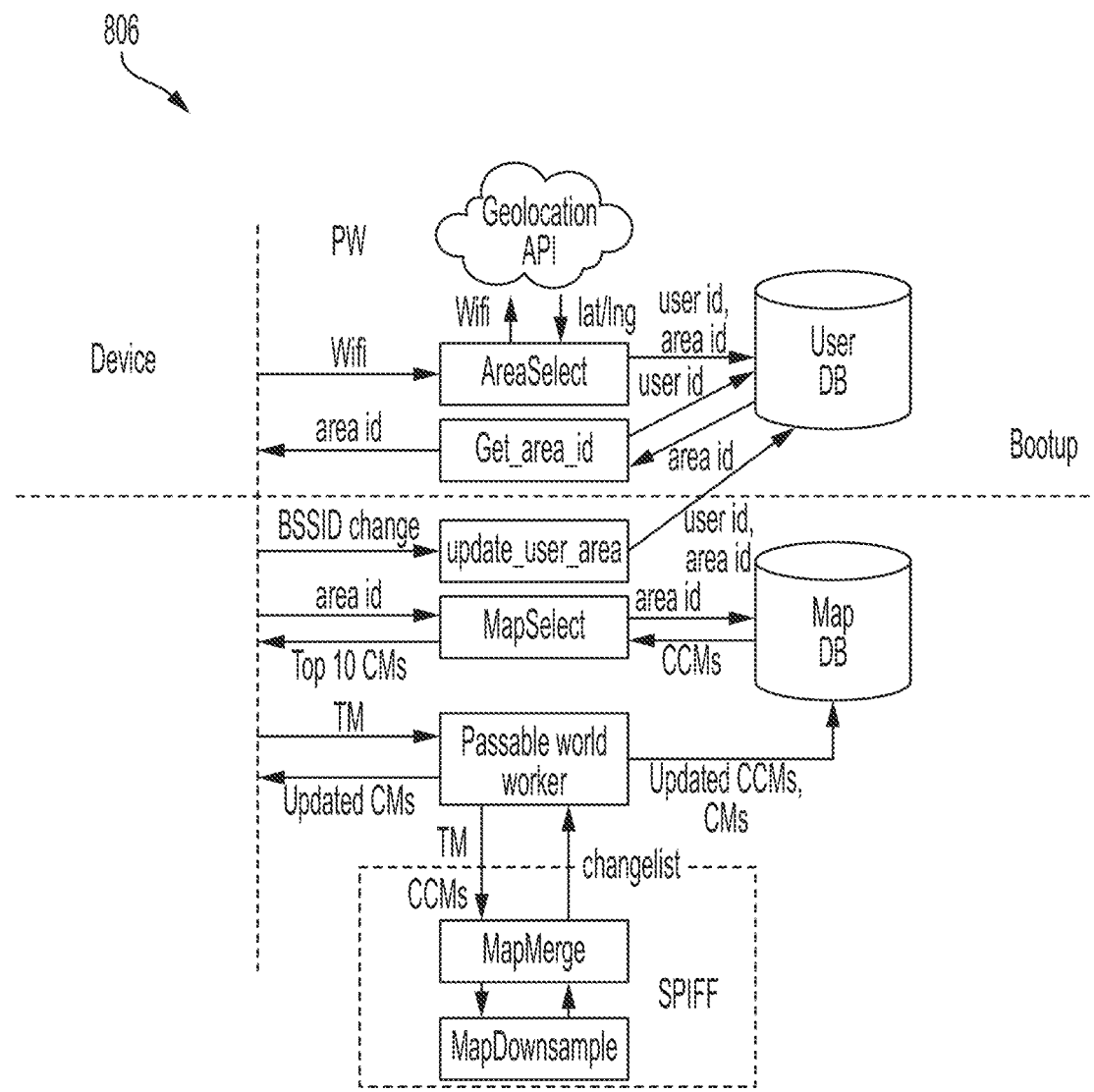
FIG. 39 is a schematic diagram illustrating an exemplary map rank portion of the AR system of FIG. 37, according to some embodiments.

FIG. 39 depicts an exemplary map rank portion 806 of the AR system 800, according to some embodiments. The map rank portion 806 may be a cloud computing environment, as it may include portions of AR devices and portions of a remote computing system such as a cloud. The map rank portion 806 may be configured to perform at least a portion of the method 900.

Figure 40B:
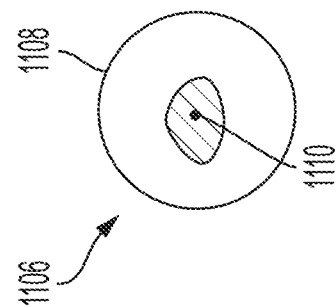
FIG. 40B is a schematic diagram illustrating an example of determining a geographic location of a tracking map (TM) for geolocation filtering of FIG. 38, according to some embodiments.
Figure 40A:
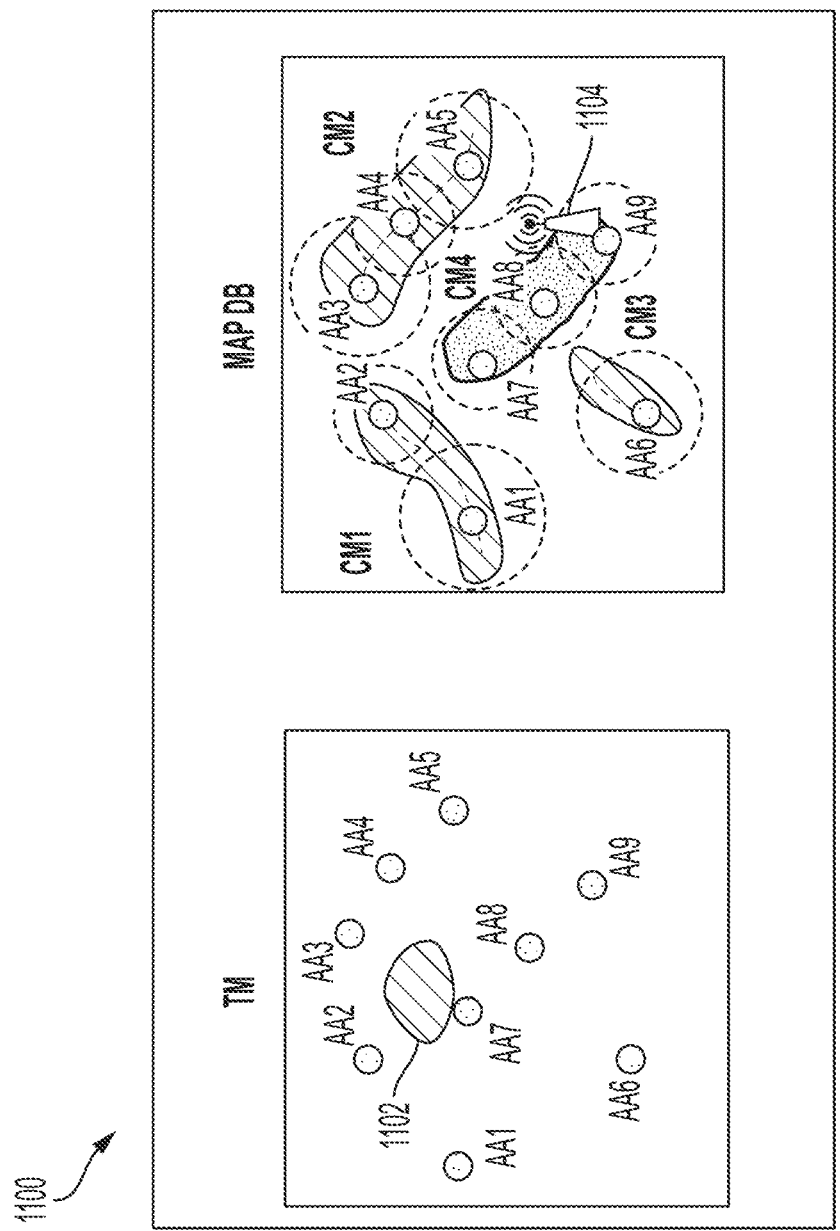
FIG. 40A is a schematic diagram illustrating an example of area attributes of a tracking map (TM) and environment maps in a database, according to some embodiments.

FIG. 40A depicts an example of area attributes AA1-AA8 of a tracking map (TM) 1102 and environment maps CM1-CM4 in a database, according to some embodiments. As illustrated, an environment map may be associated to multiple area attributes. The area attributes AA1-AA8 may include parameters of wireless networks detected by the AR device computing the tracking map 1102, for example, basic service set identifiers (BSSIDs) of networks to which the AR device are connected and/or the strength of the received signals of the access points to the wireless networks through, for example, a network tower 1104. The parameters of the wireless networks may comply with protocols including Wi-Fi and 5G NR. In the example illustrated in FIG. 9, the area attributes are a fingerprint of the area in which the user AR device collected sensor data to form the tracking map.

FIG. 40B depicts an example of the determined geographic location 1106 of the tracking map 1102, according to some embodiments. In the illustrated example, the determined geographic location 1106 includes a centroid point 1110 and an area 1108 circling around the centroid point. It should be appreciated that the determination of a geographic location of the present application is not limited to the illustrated format. A determined geographic location may have any suitable formats including, for example, different area shapes. In this example, the geographic location is determined from area attributes using a database relating area attributes to geographic locations. Databases are commercially available, for example, databases that relate Wi-Fi fingerprints to locations expressed as latitude and longitude and may be used for this operation.

In the embodiment of FIG. 38, a map database, containing environment maps may also include location data for those maps, including latitude and longitude covered by the maps. Processing at Act 902 may entail selecting from that database a set of environment maps that covers the same latitude and longitude determined for the area attributes of the tracking map.

Act 904 is a first filtering of the set of environment maps accessed in Act 902. In Act 902, environment maps are retained in the set based on proximity to the geolocation of the tracking map. This filtering step may be performed by comparing the latitude and longitude associated with the tracking map and the environment maps in the set.

Figure 41:
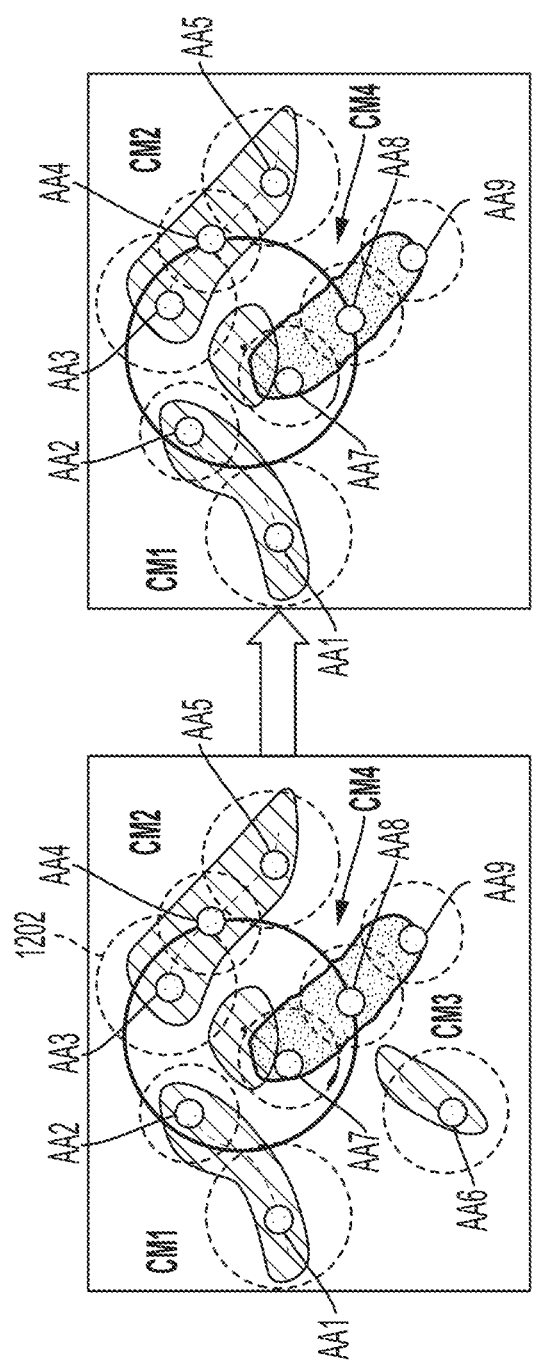
FIG. 41 is a schematic diagram illustrating an example of geolocation filtering of FIG. 38, according to some embodiments.

FIG. 41 depicts an example of Act 904, according to some embodiments. Each area attribute may have a corresponding geographic location 1202. The set of environment maps may include the environment maps with at least one area attribute that has a geographic location overlapping with the determined geographic location of the tracking map. In the illustrated example, the set of identified environment maps includes environment maps CM1, CM2, and CM4, each of which has at least one area attribute that has a geographic location overlapping with the determined geographic location of the tracking map 1102. The environment map CM3 associated with the area attribute AA6 is not included in the set because it is outside the determined geographic location of the tracking map.

Other filtering steps may also be performed on the set of environment maps to reduce/rank the number of environment maps in the set that is ultimately processed (such as for map merge or to provide passable world information to a user device). The method 900 may include filtering (Act 906) the set of environment maps based on similarity of one or more identifiers of network access points associated with the tracking map and the environment maps of the set of environment maps. During the formation of a map, a device collecting sensor data to generate the map may be connected to a network through a network access point, such as through Wi-Fi or similar wireless communication protocol. The access points may be identified by BSSID. The user device may connect to multiple different access points as it moves through an area collecting data to form a map. Likewise, when multiple devices supply information to form a map, the devices may have connected through different access points, so there may be multiple access points used in forming the map for that reason too. Accordingly, there may be multiple access points associated with a map, and the set of access points may be an indication of location of the map.

Figure 42:
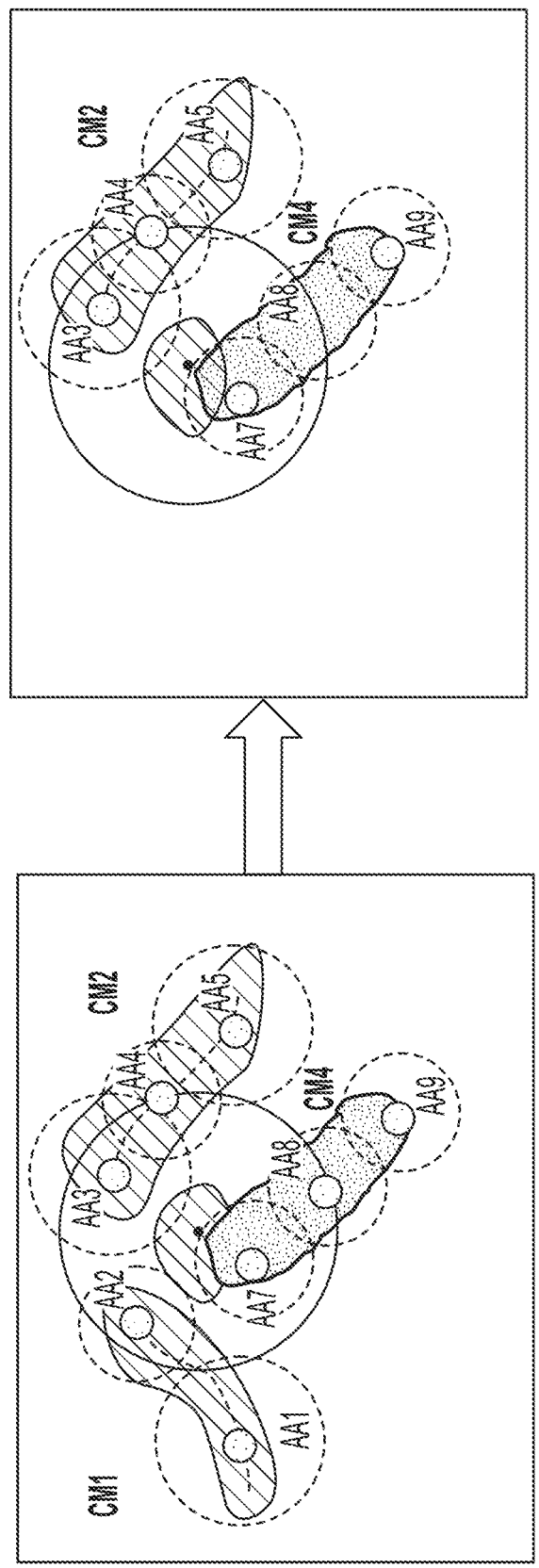
FIG. 42 is a schematic diagram illustrating an example of Wi-Fi BSSID filtering of FIG. 38, according to some embodiments.

In some embodiments, filtering the set of environment maps based on similarity of the one or more identifiers of the network access points may include retaining in the set of environment maps environment maps with the highest Jaccard similarity to the at least one area attribute of the tracking map based on the one or more identifiers of network access points. FIG. 42 depicts an example of Act 906, according to some embodiments. In the illustrated example, a network identifier associated with the area attribute AA7 may be determined as the identifier for the tracking map 1102. The set of environment maps after Act 906 includes environment map CM2, which may have area attributes within higher Jaccard similarity to AA7, and environment map CM4, which also include the area attributes AA7. The environment map CM1 is not included in the set because it has the lowest Jaccard similarity to AA7.

Processing at Acts 902-906 may be performed based on metadata associated with maps and without actually accessing the content of the maps stored in a map database. Other processing may involve accessing the content of the maps. Act 908 indicates accessing the environment maps remaining in the subset after filtering based on metadata. It should be appreciated that this act may be performed either earlier or later in the process, if subsequent operations can be performed with accessed content.

The method 900 may include filtering (Act 910) the set of environment maps based on similarity of metrics representing content of the tracking map and the environment maps of the set of environment maps. The metrics representing content of the tracking map and the environment maps may include vectors of values computed from the contents of the maps. The metrics may be computed from the maps retrieved at Act 908 or may be pre-computed and stored as metadata associated with those maps. In some embodiments, filtering the set of environment maps based on similarity of metrics representing content of the tracking map and the environment maps of the set of environment maps, may include retaining in the set of environment maps environment maps with the smallest vector distance between a vector of characteristics of the tracking map and vectors representing environment maps in the set of environment maps.

The method 900 may include further filtering (Act 912) the set of environment maps based on degree of match between a portion of the tracking map and portions of the environment maps of the set of environment maps. The degree of match may be determined as a part of a localization process. As a non-limiting example, localization may be performed by identifying critical points in the tracking map and the environment map that are sufficiently similar as they could represent the same portion of the physical world. In some embodiments, the critical points may be features, feature descriptors, key frames/key rigs, persistent poses, and/or PCFs. The set of critical points in the tracking map might then be aligned to produce a best fit with the set of critical points in the environment map. A mean square distance between the corresponding critical points might be computed and, if below a threshold for a particular region of the tracking map, used as an indication that the tracking map and the environment map represent the same region of the physical world.

Figure 43:
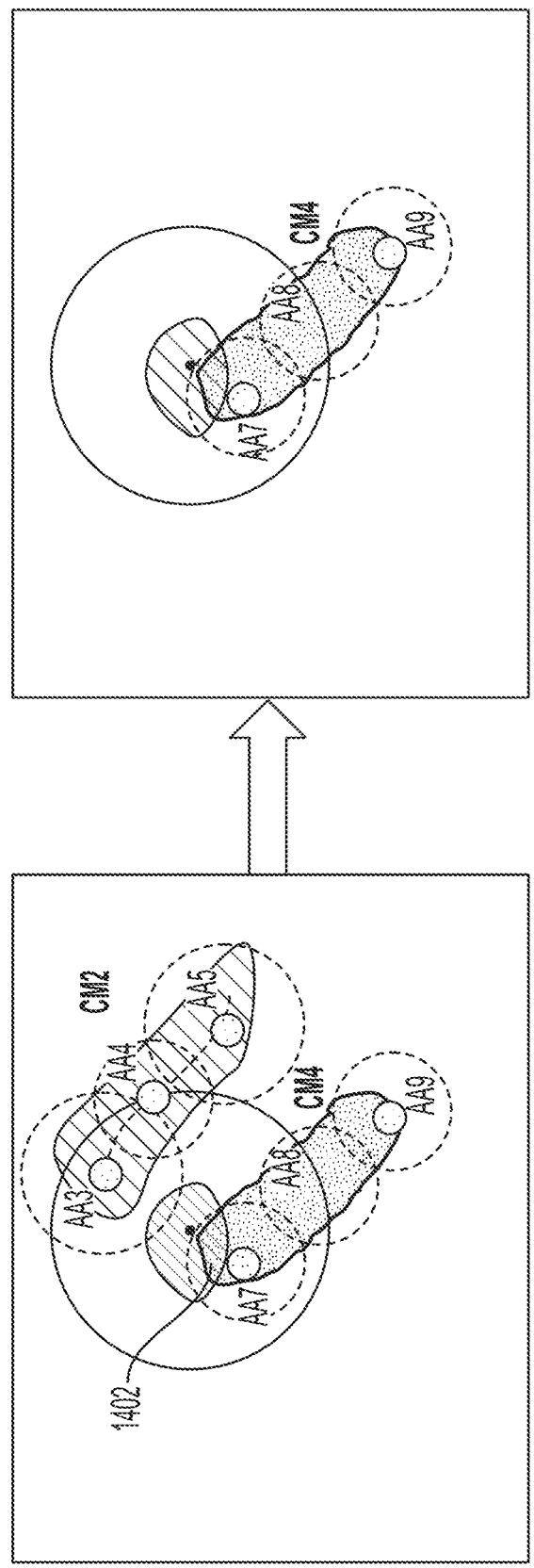
FIG. 43 is a schematic diagram illustrating an example of localization of FIG. 38, according to some embodiments.

In some embodiments, filtering the set of environment maps based on degree of match between a portion of the tracking map and portions of the environment maps of the set of environment maps may include computing a volume of a physical world represented by the tracking map that is also represented in an environment map of the set of environment maps, and retaining in the set of environment maps environment maps with a larger computed volume than environment maps filtered out of the set. FIG. 43 depicts an example of Act 912, according to some embodiments. In the illustrated example, the set of environment maps after Act 912 includes environment map CM4, which has an area 1402 matched with an area of the tracking map 1102. The environment map CM1 is not included in the set because it has no area matched with an area of the tracking map 1102.

In some embodiments, the set of environment maps may be filtered in the order of Act 906, Act 910, and Act 912. In some embodiments, the set of environment maps may be filtered based on Act 906, Act 910, and Act 912, which may be performed in an order based on processing required to perform the filtering, from lowest to highest.

The method 900 may include loading (Act 914) the set of environment maps and data.

In the illustrated example, a user database stores area identities indicating areas that AR devices were used in. The area identities may be area attributes, which may include parameters of wireless networks detected by the AR devices when in use. A map database stores multiple environment maps constructed from data supplied by the AR devices and associated metadata. The associated metadata may include area identities derived from the area identities of the AR devices that supplied data from which the environment maps were constructed. An AR device may send a message to a PW module indicating new tracking map is created or being created. The PW module computes area identifiers for the AR device and updates the user database based on the received parameters and/or the computed area identifiers. The PW module may also determine area identifiers associated with the AR device requesting the environment maps, identify sets of environment maps from the map database based on the area identifiers, filter the sets of environment maps, and transmit the filtered sets of environment maps to the AR devices. In some embodiments, the PW module may filter the sets of environment maps based on one or more criteria including, for example, a geographic location of the tracking map, similarity of one or more identifiers of network access points associated with the tracking map and the environment maps of the set of environment maps, similarity of metrics representing contents of the tracking map and the environment maps of the set of environment maps, and degree of match between a portion of the tracking map and portions of the environment maps of the set of environment maps.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Further, FIG. 38 provides examples of criteria that may be used to filter candidate maps to yield a set of high ranking maps. Other criteria may be used instead of or in addition to the described criteria. For example, if multiple candidate maps have similar values of a metric used for filtering out less desirable maps, characteristics of the candidate maps may be used to determine which maps are retained as candidate maps or filtered out. For example, larger or more dense candidate maps may be prioritized over smaller candidate maps. In some embodiments, FIGS. 27-28 may describe all or part of the systems and methods described in FIGS. 37-39.

Figure 51:
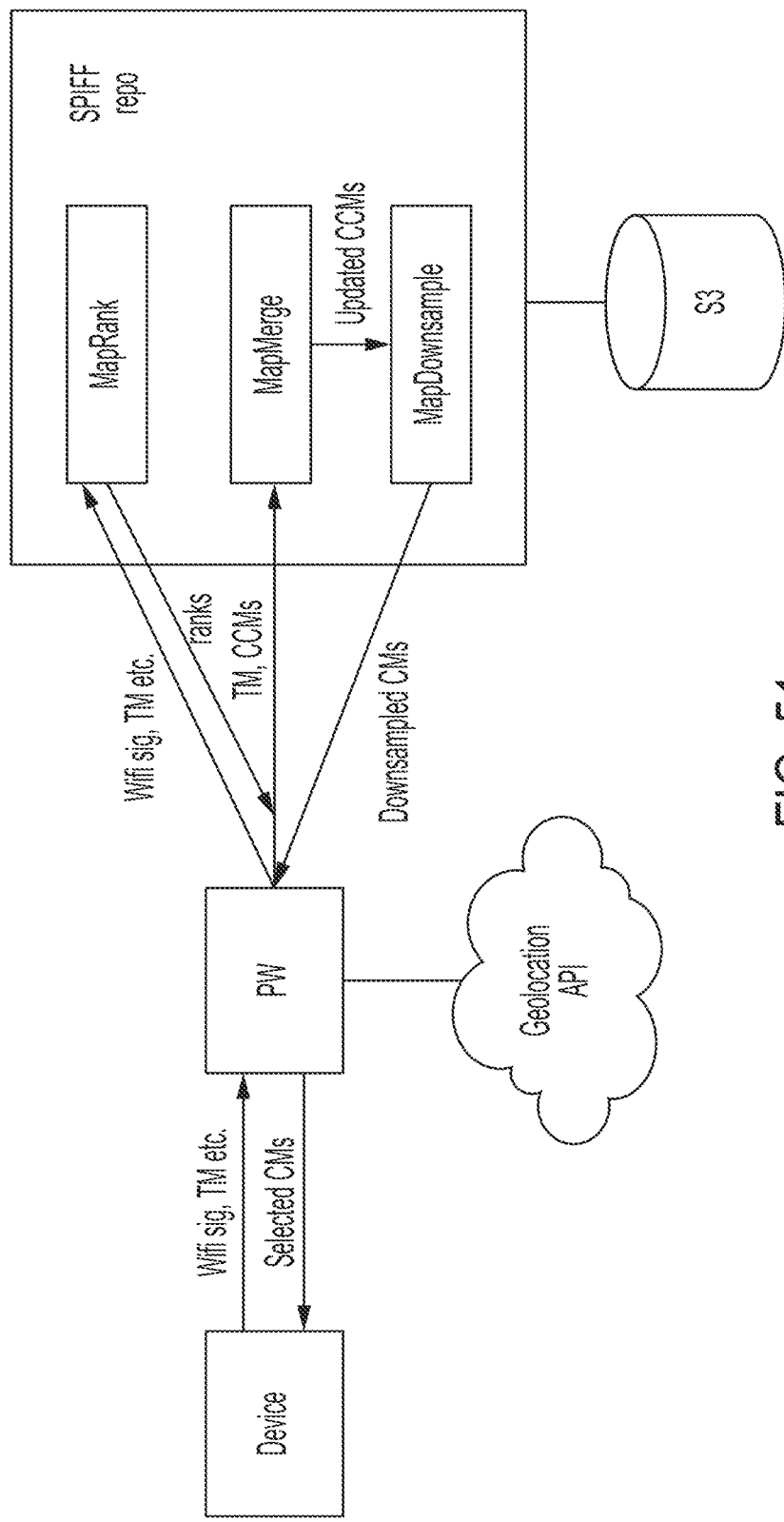
FIGS. 51-53 are block diagrams illustrating examples of determining a map to be used based at least partly on deep keyframe (DKF) analysis, according to some embodiments.
Figure 52:
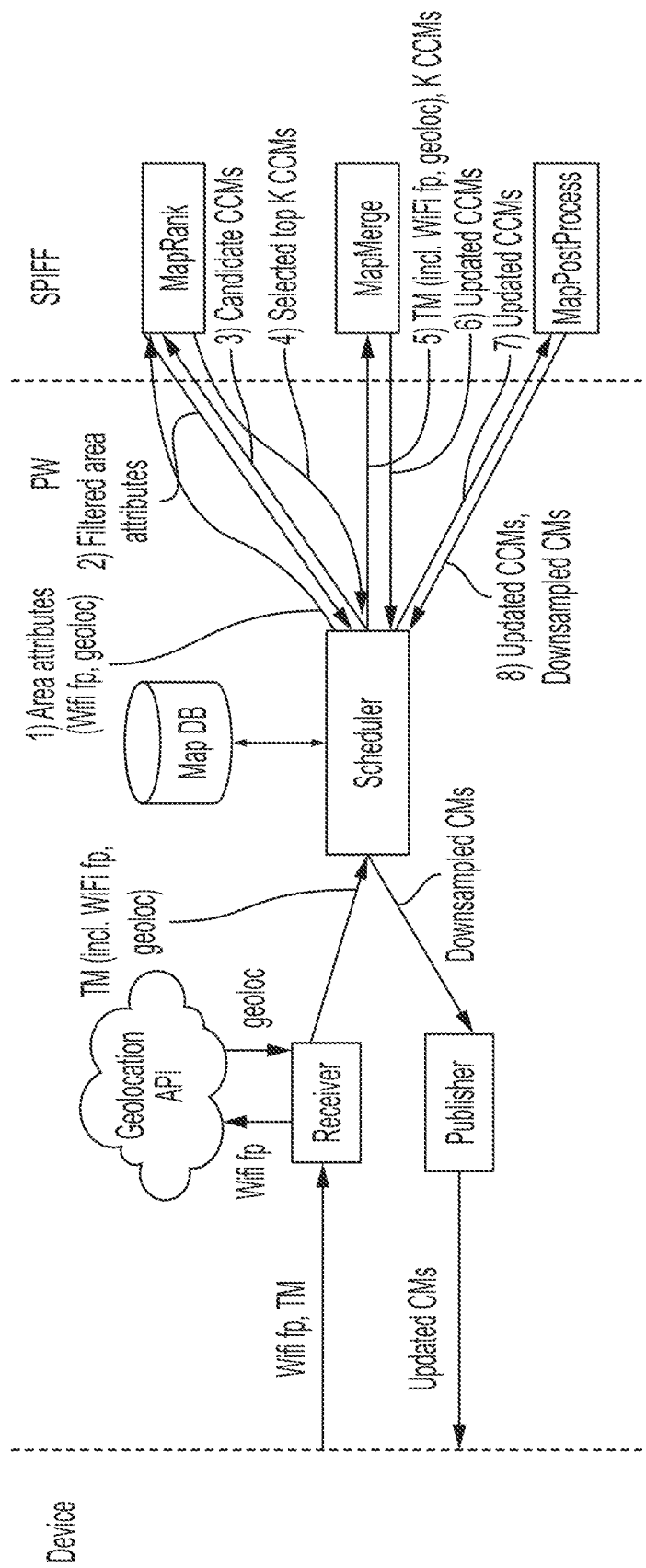
Figure 53:
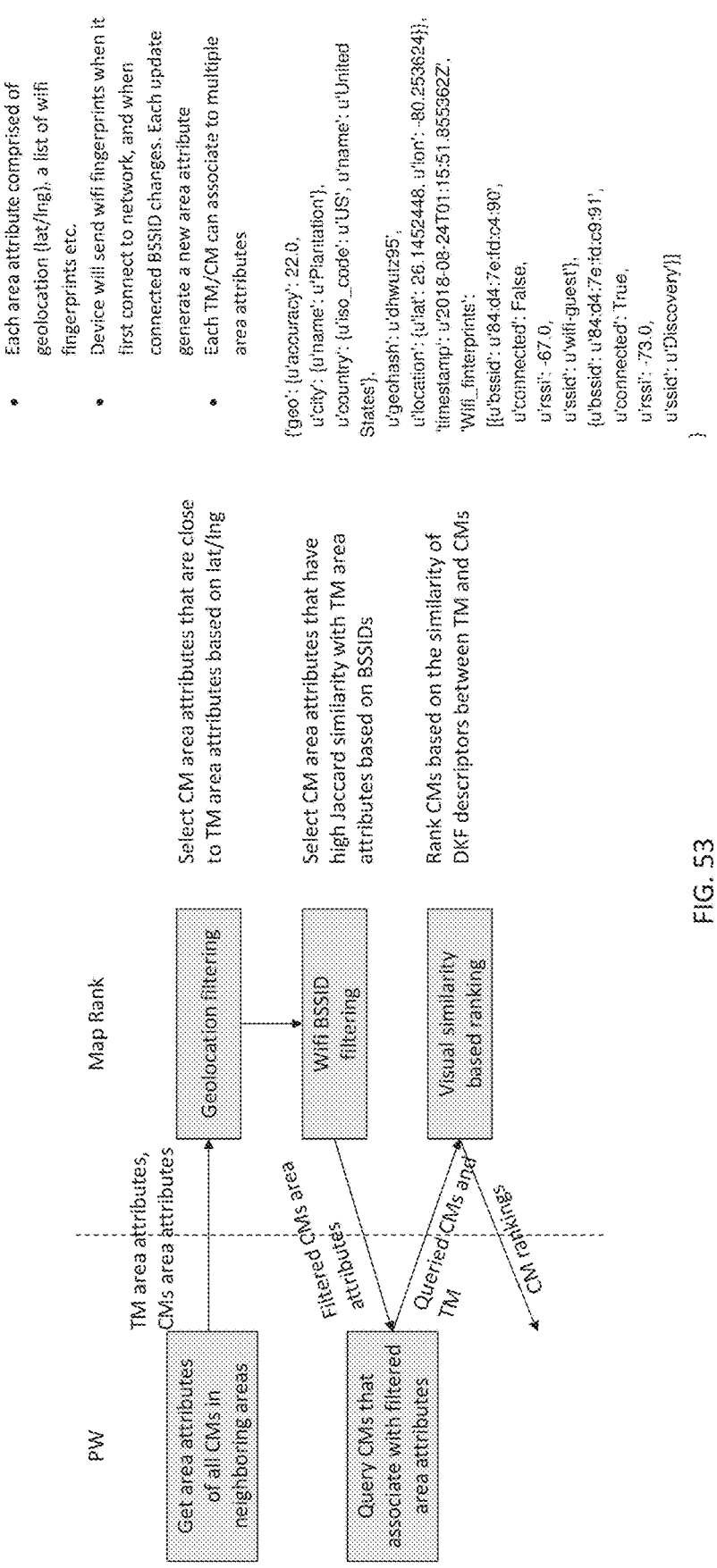

FIGS. 51-53 describe examples of determining a map to be used based at least partly on deep keyframe (DKF) analysis, according to some embodiments. The DKF analysis may be part of the process to determine an environment map to be used by the XR device and/or to determine a current headpose for the user (e.g., the position and/or orientation of the user's head) based on a TM generated by the XR device. In some embodiments, DKF analysis employs suitable deep learning technique(s) to predict or otherwise determine a suitable environment map to be used, by providing keyframe(s) of the TM as input to a deep learning architecture, such as a neural network. In some embodiments, the DKF analysis is used as part of the process to rank environment maps, also referred to as canonical maps (CMs). For example, CMs can be ranked based on the degree of similarity of DKF descriptors between a TM and each CM being analyzed as a candidate. As shown in the example of FIG. 53, the DKF analysis can be part of a hierarchical (e.g., multi-level) analysis to select a CM, in which geolocation filtering is performed (e.g., first) as a top level analysis, Wi-Fi BSSID filtering is performed as a next level, and DKF analysis is performed as a third (e.g., final) level to rank CMs. A highest ranked CM, or set of CMs, may be provided to the XR device to be used and/or further analyzed. The ranking analysis may be performed in the cloud (e.g., using the SPIFF analysis module(s) as shown in the example of FIGS. 51-53). At each level, the set of candidate CMs can be filtered (e.g., reduced) until a single map (or subset of maps) remains after the bottom-level analysis based on DKFs. The MapRank module shown in FIG. 51 may perform the ranking, and pass the results to the MapMerge module which is described above.

U.S. patent application Ser. No. 16/520,582 and U.S. Provisional Patent Application No. 62/702,829 are incorporated by reference herein and describe further details to map sharing based on map quality, co-visibility graphical map sanitation and creating localizable maps from camera images.

Head Pose Tracking Recovery and Reset

Figure 49:
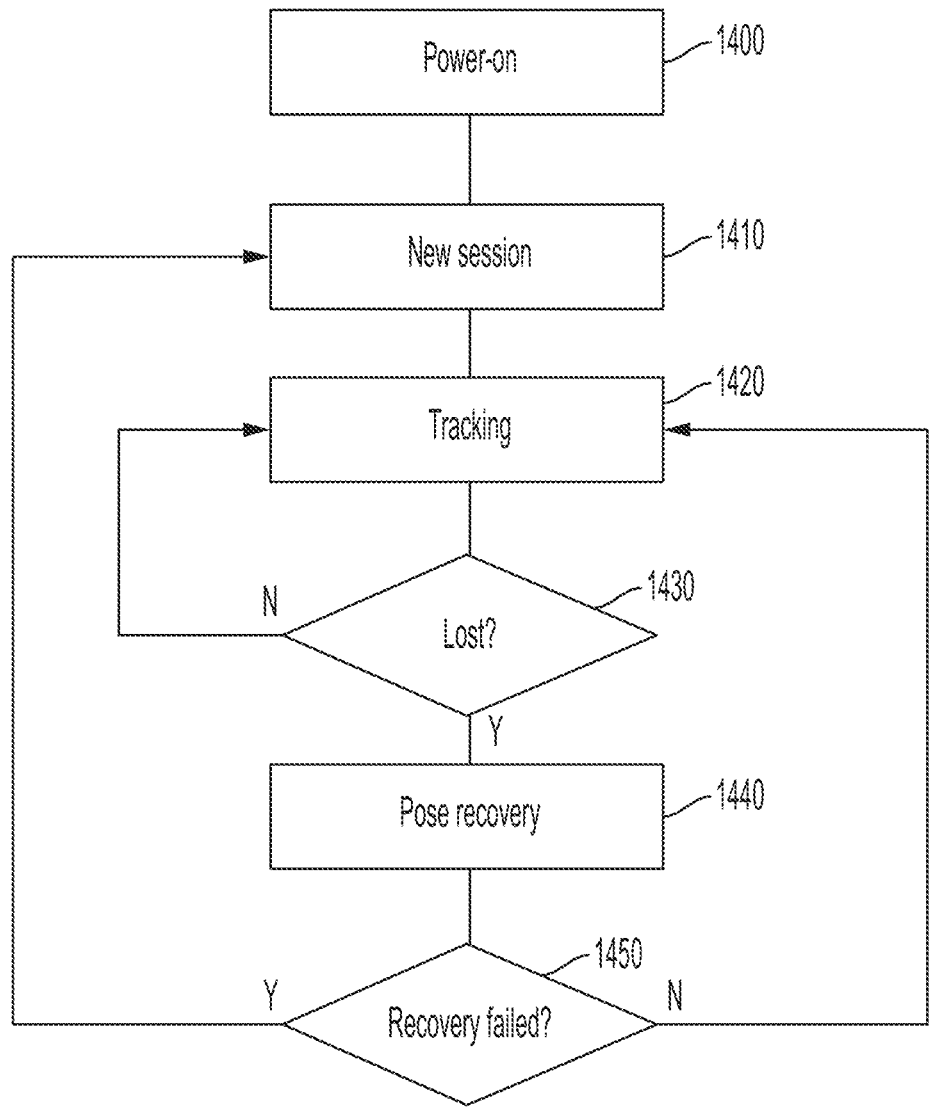
FIG. 49 is a flow chart illustrating a method of recovering and resetting a head pose, according to some embodiments.

FIG. 49 illustrates aspects of a viewing method to recover and/or reset head pose, according to some embodiments. In the illustrated example, at Act 1400, the viewing device is powered on. At Act 1410, in response to being powered on, a new session is initiated. In some embodiments, a new session may include establishing head pose. One or more capture devices on a head-mounted frame secured to a head of a user capture surfaces of an environment by first capturing images of the environment and then determining the surfaces from the images. Surface data is also combined with a data from a gravitational sensor to establish head pose.

At Act 1420, a processor of the viewing device enters a routine for tracking of head pose. The capture devices continue to capture surfaces of the environment as the user moves their head to determine an orientation of the head-mounted frame relative to the surfaces.

At Act 1430, the processor determines whether head pose has been lost. Head pose may become lost due to "edge" cases, such as too many reflective surfaces, low light, blank walls, being outdoor, etc. that may result in low feature acquisition, or because of dynamic cases such as a crowd that moves and forms part of the map. The routine at 1430 allows for a certain amount of time, for example 10 seconds, to pass to allow enough time to determine whether head pose has been lost. If head pose has not been lost, then the processor returns to 1420 and again enters tracking of head pose.

If head pose has been lost at Act 1430, the processor enters a routine at 1440 to recover head pose. If head pose is lost due to low light, then a message such as the following message is displayed to the user through a display of the viewing device:

THE SYSTEM IS DETECTING A LOW LIGHT CONDITION. PLEASE MOVE TO AN AREA WHERE THERE IS MORE LIGHT.

The system will continue to monitor whether there is sufficient light available and whether head pose can be recovered. The system may alternatively determine that low texture of surfaces is causing head pose to be lost, in which case the user is given the following prompt in the display as a suggestion to improve capturing of surfaces:

THE SYSTEM CANNOT DETECT ENOUGH SURFACES WITH FINE TEXTURES. PLEASE MOVE TO AN AREA WHERE THE SURFACES ARE LESS ROUGH IN TEXTURE AND MORE REFINED IN TEXTURE.

At Act 1450, the processor enters a routine to determine whether head pose recovery has failed. If head pose recovery has not failed (i.e. head pose recovery has succeeded), then the processor returns to Act 1420 by again entering tracking of head pose. If head pose recovery has failed, the processor returns to Act 1410 to establish a new session. As part of the new session, all cached data is invalidated, whereafter head pose is established anew.

Figure 50:
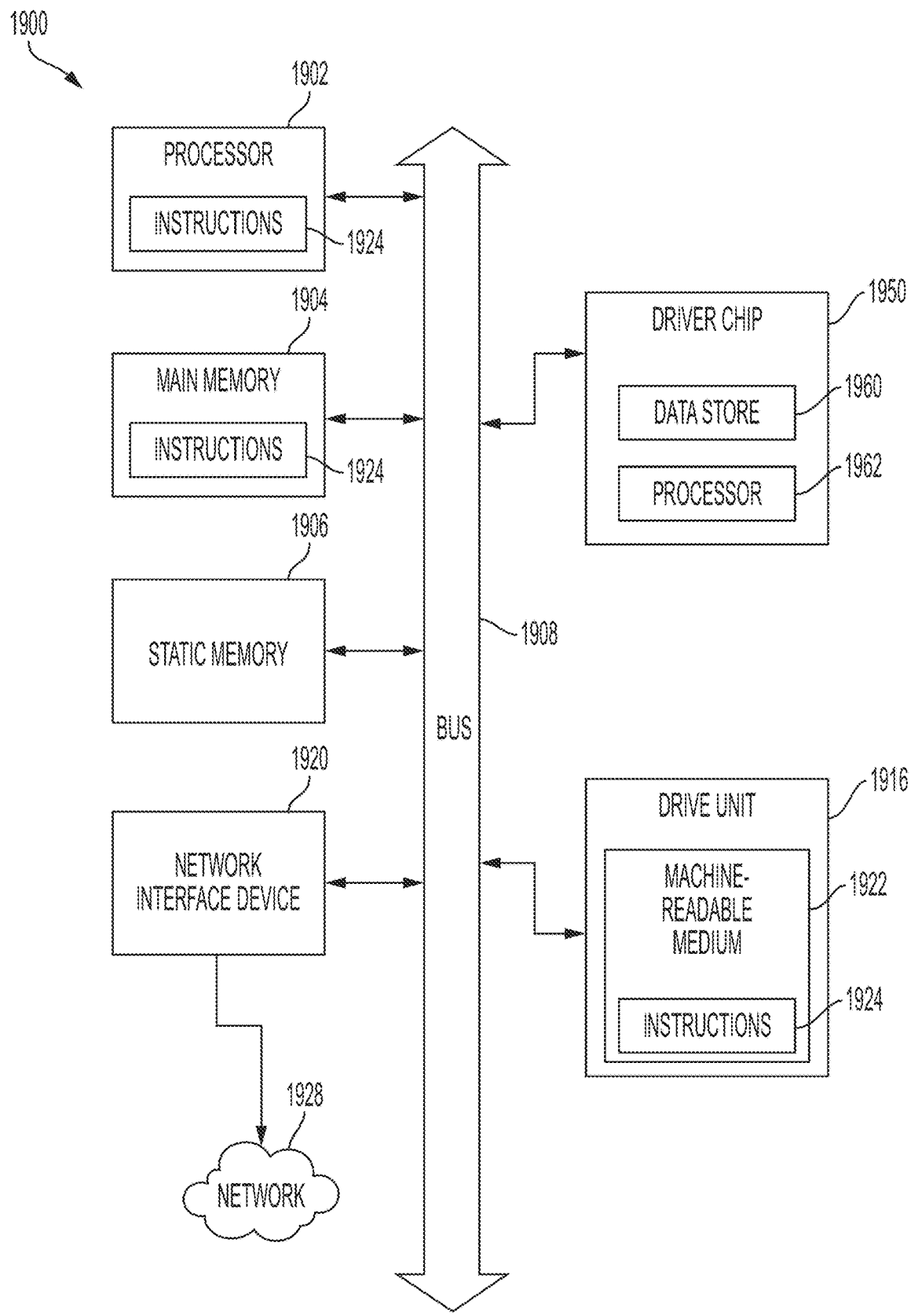
FIG. 50 is a block diagram of a machine in the form of a computer that can find application in the present invention system, according to some embodiments.

FIG. 50 shows a diagrammatic representation of a machine in the exemplary form of a computer system 1900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 1900 includes a processor 1902 (e.g., a central processing unit (CPU), a graphics processing unit (GPU) or both), a main memory 1904 (e.g., read only memory (ROM), flash memory, dynamic random access memory (DRAM) such as synchronous DRAM (SDRAM) or Rambus DRAM (RDRAM), etc.), and a static memory 1906 (e.g., flash memory, static random access memory (SRAM), etc.), which communicate with each other via a bus 1908.

The computer system 1900 may further include a disk drive unit 1916, and a network interface device 1920.

The disk drive unit 1916 includes a machine-readable medium 1922 on which is stored one or more sets of instructions 1924 (e.g., software) embodying any one or more of the methodologies or functions described herein. The software may also reside, completely or at least partially, within the main memory 1904 and/or within the processor 1902 during execution thereof by the computer system 1900, the main memory 1904 and the processor 1902 also constituting machine-readable media.

The software may further be transmitted or received over a network 18 via the network interface device 1920.

The computer system 1900 includes a driver chip 1950 that is used to drive projectors to generate light. The driver chip 1950 includes its own data store 1960 and its own processor 1962.

While the machine-readable medium 1922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

Further, FIG. 38 provides examples of criteria that may be used to filter candidate maps to yield a set of high ranking maps. Other criteria may be used instead of or in addition to the described criteria. For example, if multiple candidate maps have similar values of a metric used for filtering out less desirable maps, characteristics of the candidate maps may be used to determine which maps are retained as candidate maps or filtered out. For example, larger or more dense candidate maps may be prioritized over smaller candidate maps.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An electronic system comprising:
   an electronic device that includes:
      a processor;
      a computer-readable medium connected to the processor, the computer-readable medium comprising a first coordinate frame and a second coordinate frame different from the first coordinate frame;
      a data channel to receive data representing virtual content, wherein the processor is configured to execute a coordinate frame transformer to transform a positioning of the virtual content from the first coordinate frame to the second coordinate frame; and
      a display system adapted to display the virtual content based, at least in part, on the positioning of the virtual content in the second coordinate frame.

2. The electronic system of claim 1, wherein the electronic device further includes:
   an object detection device that detects positioning of an object, wherein the processor is further configured to execute:
      a world surface determining routine to identify positioning of at least one point on a surface of the object;
      a world frame determining routine to compute a world coordinate frame based on the at least one point; and
      a world frame storing instruction to store the world coordinate frame on the computer-readable medium.

3. The electronic system of claim 2, wherein the electronic device further includes:
   a head-mountable frame, wherein the processor is further configured to execute:
      a head frame determining routine to compute a head coordinate frame that changes upon movement of the head-mountable frame; and
      a head frame storing instruction to store the head coordinate frame on the computer-readable medium.

4. The electronic system of claim 3, wherein the coordinate frame transformer is configured to transform the world coordinate frame to the head coordinate frame.

5. The electronic system of claim 3, wherein the electronic device further includes:
   an inertial measurement unit secured to the head-mountable frame that detects movement of the head-mountable frame, wherein the head frame determining routine computes the head coordinate frame based on a measurement of the inertial measurement unit.

6. The electronic system of claim 3, wherein:
   the electronic device further includes a movement tracking camera secured to the head-mountable frame,
   the movement tracking camera detects movement of the head-mountable frame, and
   the head frame determining routine computes the head coordinate frame based on images captured by the movement tracking camera.

7. The electronic system of claim 1, wherein:
   the computer-readable medium further includes a camera coordinate frame including a plurality of eye positions of an eye that moves relative to the head-mountable frame, wherein the camera coordinate frame is the second coordinate frame, and
   the coordinate frame transformer comprises transforming the head coordinate frame to the camera coordinate frame.

8. An electronic system comprising:
   a device comprising one or more sensors configured to capture data about one or more objects in a scene, the data being in a first coordinate frame; and
   a computer-readable medium comprising computer executable instructions for specifying a location of virtual content in the scene based at least in part on information derived from the data in the first coordinate frame, wherein the location of the virtual content is specified in a second coordinate frame different from the first coordinate frame.

9. The electronic system of claim 8, wherein:
   the first coordinate frame is a first pose of the electronic system when the electronic system is powered on for capturing the data.

10. The electronic system of claim 8, wherein:
    the first coordinate frame has an origin determined based, at least in part, on dimensions of the electronic system and one or more poses of the one or more sensors of the electronic system when capturing the data.

11. The electronic system of claim 8, comprising:
    at least one processor configured to execute additional computer executable instructions to provide the virtual content, wherein the additional computer executable instructions comprise instructions for:
       determining the first coordinate frame based, at least in part, on the one or more objects in the scene; and
       transforming the specified location of the virtual content in the second coordinate frame to the first coordinate frame.

12. The electronic system of claim 11, wherein the first coordinate frame is determined based, at least in part, on one or more nodes on an outer surface of a bounding box that encloses the virtual content.

13. The electronic system of claim 11, wherein specifying a location of the virtual content in the scene based at least in part on information derived from the data in the first coordinate frame comprises determining a location of the device in a coordinate frame used by an application.

14. An electronic system comprising:
a portable device comprising a display and one or more sensors configured to capture data, with respect to a device coordinate frame, about a 3D environment; and
a computer-readable medium comprising computer executable instructions for:
obtaining a location of a virtual object in a stored map of the 3D environment with respect to a stored coordinate frame of the 3D environment,
computing a transformation between the device coordinate frame and the stored coordinate frame, and
rendering the virtual object on the display at a location determined, at least in part, based on the transformation and the obtained location of the virtual object.

15. The electronic system of claim 14, wherein the computer executable instructions further comprise instructions for:
identifying a plurality of features in the data about the 3D environment,
generating a plurality of key frames based, at least in part, on the plurality of features, and
generating a plurality of persistent coordinate frames (PCFs) based, at least in part, on the plurality of key frames.

16. The electronic system of claim 15, wherein
the computer executable instructions further comprise instructions for:
converting each of the identified plurality of features to a descriptor, and
each key frame comprises one or more descriptors.

17. The electronic system of claim 15, wherein a new PCF is generated when the portable device moves for a predetermined distance after the last PCF is generated.

18. The electronic system of claim 15, wherein
the transformation between the device coordinate frame and the stored coordinate frame is computed based, at least in part, on the generated PCFs and PCFs in the stored map of the 3D environment.

19. The electronic system of claim 15, wherein
the computer executable instructions further comprise instructions for:
generating a plurality of persistent poses, each persistent pose corresponding to one or more of the plurality of key frames, and
the plurality of PCFs are generated based, at least in part, on the plurality of persistent poses.

20. The electronic system of claim 19, wherein a new persistent pose is generated when the portable device moves for a predetermined distance after the last persistent pose is generated.

* * * * *

EX PARTE REEXAMINATION CERTIFICATE (12934th)

United States Patent
Miranda et al.

(10) Number: US 11,386,629 C1
(45) Certificate Issued: Jun. 6, 2025

(54) CROSS REALITY SYSTEM

(71) Applicant: Magic Leap, Inc., Plantation, FL (US)

(72) Inventors: Jeremy Dwayne Miranda, Miramar, FL (US); Rafael Domingos Torres, Boca Raton, FL (US); Daniel Olshansky, Mountain View, CA (US); Anush Mohan, Mountain View, CA (US); Robert Blake Taylor, Porter Ranch, CA (US); Samuel A. Miller, Hollywood, FL (US); Jehangir Tajik, Fort Lauderdale, FL (US); Ashwin Swaminathan, Dublin, CA (US); Lomesh Agarwal, Fremont, CA (US); Ali Shahrokni, San Jose, CA (US); Prateek Singhal, Mountain View, CA (US); Joel David Holder, Austin, TX (US); Xuan Zhao, San Jose, CA (US); Siddharth Choudhary, San Jose, CA (US); Helder Toshiro Suzuki, Mountain View, CA (US); Hirai Honar Barot, Plantation, FL (US); Eran Guendelman, Tel Aviv (IL); Michael Harold Liebenow, Loxahatchee, FL (US); Christian Ivan Robert Moore, Cupertino, CA (US)

(73) Assignee: MAGIC LEAP, INC., Plantation, FL (US)

Reexamination Request:
No. 90/019,485, Apr. 16, 2024

Reexamination Certificate for:
Patent No.: 11,386,629
Issued: Jul. 12, 2022
Appl. No.: 17/208,844
Filed: Mar. 22, 2021

Related U.S. Application Data

(63) Continuation of application No. 16/538,759, filed on Aug. 12, 2019, now Pat. No. 10,957,112.

(60) Provisional application No. 62/884,109, filed on Aug. 7, 2019, provisional application No. 62/870,954, filed on Jul. 5, 2019, provisional application No. 62/868,786, filed on Jun. 28, 2019, provisional application No. 62/815,955, filed on Mar. 8, 2019, (Continued)

(51) Int. Cl.
G06T 19/00 (2011.01)
G02B 27/00 (2006.01)
G02B 27/01 (2006.01)
G06F 3/01 (2006.01)
G06T 19/20 (2011.01)
G06V 20/20 (2022.01)

(52) U.S. Cl.
CPC ........ *G06T 19/006* (2013.01); *G02B 27/0093* (2013.01); *G02B 27/017* (2013.01); *G06F 3/011* (2013.01); *G06T 19/20* (2013.01); *G06V 20/20* (2022.01)

(58) Field of Classification Search
None
See application file for complete search history.

(56) References Cited

To view the complete listing of prior art documents cited during the proceeding for Reexamination Control Number 90/019,485, please refer to the USPTO's Patent Electronic System.

*Primary Examiner* — Angela M Lie

(57) ABSTRACT

An augmented reality viewing system is described. A local coordinate frame of local content is transformed to a world coordinate frame. A further transformation is made to a head coordinate frame and a further transformation is made to a camera coordinate frame that includes all pupil positions of an eye. One or more users may interact in separate sessions with a viewing system. If a canonical map is available, the earlier map is downloaded onto a viewing device of a user. The viewing device then generates another map and localizes the subsequent map to the canonical map.

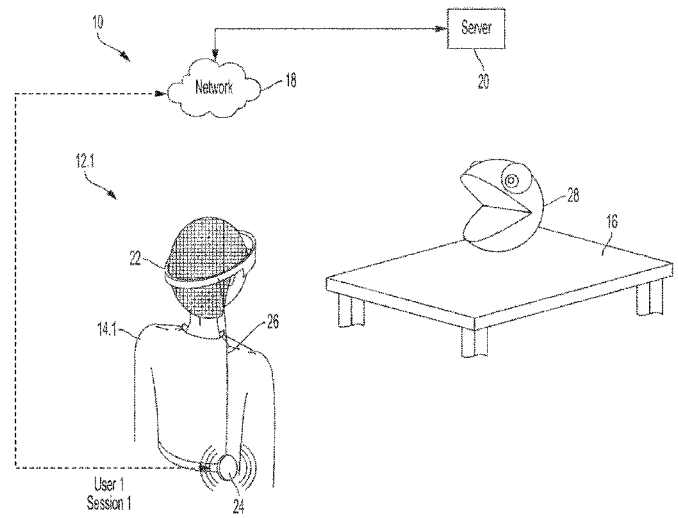

Related U.S. Application Data provisional application No. 62/812,935, filed on Mar. 1, 2019, provisional application No. 62/742,237, filed on Oct. 5, 2018, provisional application No. 62/718,357, filed on Aug. 13, 2018.

US 11,386,629 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 7-14 are determined to be patentable as amended.

Claims 2-4, 6 and 15-20, dependent on an amended claim, are determined to be patentable.

New claims 21-28 are added and determined to be patentable.

1. An electronic system comprising:
   an electronic device that includes:
   a processor;
   a computer-readable medium connected to the processor, the computer-readable medium comprising a first coordinate frame and a second coordinate frame different from the first coordinate frame, *wherein the first coordinate frame and the second coordinate frame are stored on the computer-readable medium of the electronic device*;
   a data channel to receive data representing virtual content, wherein the processor is configured to execute a coordinate frame transformer to transform a positioning of the virtual content from the first coordinate frame to the second coordinate frame; and
   a display system adapted to display the virtual content based, at least in part, on the positioning of the virtual content in the second coordinate frame.

5. The electronic system of claim 3, wherein:
   the electronic device further includes [:] an inertial measurement unit secured to the head-mountable frame that detects movement of the head-mountable frame, [wherein] *and*
   the head frame determining routine computes the head coordinate frame based on a measurement of the inertial measurement unit.

7. The electronic system of claim [1] *3*, wherein:
   the computer-readable medium further includes a camera coordinate frame including a plurality of eye positions of an eye that moves relative to the head-mountable frame, wherein the camera coordinate frame is the second coordinate frame, and
   the coordinate frame transformer comprises transforming the head coordinate frame to the camera coordinate frame.

8. An electronic [system] *device* comprising:
   [a device comprising] one or more sensors configured to capture data about one or more objects in a scene, the data being in a first coordinate frame; and
   a computer-readable medium comprising computer executable instructions for specifying a location of virtual content in the scene based at least in part on information derived from the data in the first coordinate frame, wherein:
   the location of the virtual content is specified in a second coordinate frame different from the first coordinate frame; *and*
   *the first coordinate frame and the second coordinate frame are stored on the computer-readable medium.*

9. The electronic [system] *device* of claim 8, wherein:
   the first coordinate frame is a first pose of the electronic [system] *device* when the electronic [system] *device* is powered on for capturing the data.

10. The electronic [system] *device* of claim 8, wherein:
    the first coordinate frame has an origin determined based, at least in part, on dimensions of the electronic [system] *device* and one or more poses of the one or more sensors of the electronic [system] *device* when capturing the data.

11. The electronic [system] *device* of claim 8, comprising:
    at least one processor configured to execute additional computer executable instructions to provide the virtual content, wherein the additional computer executable instructions comprise instructions for:
    determining the first coordinate frame based, at least in part, on the one or more objects in the scene; and
    transforming the specified location of the virtual content in the second coordinate frame to the first coordinate frame.

12. The electronic [system] *device* of claim 11, wherein the [first] *second* coordinate frame is determined based, at least in part, on one or more nodes on an outer surface of a bounding box that encloses the virtual content.

13. The electronic [system] *device* of claim 11, wherein specifying a location of the virtual content in the scene based at least in part on information derived from the data in the first coordinate frame comprises determining a location of the device in a coordinate frame used by an application.

14. An electronic system comprising:
    a portable device comprising a display and one or more sensors configured to capture data, with respect to a device coordinate frame, about a 3D environment; and
    a computer-readable medium comprising computer executable instructions for:
    *generate a persistent coordinate frame (PCF) based on data captured with the one or more sensors;*
    obtaining a location of a virtual object in a stored map of the 3D environment with respect to a stored coordinate frame of the 3D environment,
    computing a transformation between the device coordinate frame and the stored coordinate frame,
    *determining, based at least in part on the transformation, the location of the virtual object with respect to the PCF,* and
    rendering *the virtual object with respect to the PCF such that* the virtual object *is rendered* on the display at a location determined, at least in part, based on the transformation and the obtained location of the virtual object, *wherein:*
    *the PCF comprises a plurality of anchors; and*
    *the location of the virtual object with respect to the PCF is determined relative to an anchor of the plurality of anchors.*

*21. The electronic systems of claim 2, wherein executing, by the processor, the world frame determining routine to compute the world coordinate frame based on the at least one point comprises:*
   *determining a pose of the electronic device in response to the electronic device being powered on; and*
   *computing the world coordinate frame using the pose as a world origin of the world coordinate frame.*

22. The electronic systems of claim 3, wherein executing, by the processor, the head frame determining routine to compute the head coordinate frame that changes upon movement of the head-mountable frame comprises:
    determining a pose of the head-mountable frame in response to the head-mountable frame capturing an image; and
    computing the head coordinate frame using the pose as a head origin of the head coordinate frame.

23. The electronic system of claim 7, wherein the processor is further configured to execute:
    a local frame determining routine to compute the first coordinate frame based on the received data representing the virtual content; and
    a local frame storing instruction to store the first coordinate frame on the computer-readable medium.

24. The electronic system of claim 23, wherein:
    the coordinate frame transformer is configured to transform the first coordinate frame to the world coordinate frame, and the world coordinate frame to the head coordinate frame.

25. The electronic device of claim 11, wherein transforming the specified location of the virtual content in the second coordinate frame to the first coordinate frame comprises:
    transforming the specified location of the virtual content in the second coordinate frame to a world coordinate frame, the world coordinate frame being a pose of the device determined in response to the device being powered on.

26. The electronic device of claim 25, wherein transforming the specified location of the virtual content in the second coordinate frame to the first coordinate frame comprises:
    transforming the world coordinate frame to a head coordinate frame, the head coordinate frame being a pose of the device determined in response to the one or more sensors capturing data.

27. The electronic device of claim 26, wherein transforming the specified location of the virtual content in the second coordinate frame to the first coordinate frame comprises:
    transforming the head coordinate frame to the first coordinate frame.

28. The electronic device of claim 27, wherein:
    the first coordinate frame encompasses all pupil positions such that the virtual content can be displayed consistently regardless of pupil positions.

\* \* \* \* \*